United States Patent
Nomura et al.

(10) Patent No.: US 7,613,390 B2
(45) Date of Patent: Nov. 3, 2009

(54) FLEXIBLE PRINTED WIRING BOARD ARRANGEMENT OF AN IMAGING DEVICE

(75) Inventors: Hiroshi Nomura, Saitama (JP); Shinya Suzuka, Saitama (JP); Ken Endo, Saitama (JP)

(73) Assignee: Hoya Corporation, Tokyo (JP)

(*) Notice: Subject to any disclaimer, the term of this patent is extended or adjusted under 35 U.S.C. 154(b) by 347 days.

(21) Appl. No.: 11/477,697

(22) Filed: Jun. 30, 2006

(65) Prior Publication Data

US 2007/0002546 A1    Jan. 4, 2007

(30) Foreign Application Priority Data

| Jun. 30, 2005 | (JP) | ............................. 2005-192554 |
| Oct. 20, 2005 | (JP) | ............................. 2005-306323 |
| Jan. 31, 2006 | (JP) | ............................. 2006-023217 |

(51) Int. Cl.
*G03B 17/00* (2006.01)
*H04N 5/228* (2006.01)
*G02B 27/64* (2006.01)

(52) U.S. Cl. ...................... 396/542; 396/55; 348/208.7; 359/557

(58) Field of Classification Search ............... 396/52, 396/55, 75, 542, 462; 348/340, 208.7, 375; 359/811, 813, 557; 250/201.2
See application file for complete search history.

(56) References Cited

U.S. PATENT DOCUMENTS

| 4,711,548 | A | | 12/1987 | Arakawa et al. | ............. 396/542 |
| 5,172,276 | A | * | 12/1992 | Ueyama et al. | ............. 359/813 |
| 5,416,558 | A | | 5/1995 | Katayama et al. | ............. 396/52 |
| 5,614,974 | A | | 3/1997 | Soshi et al. | ............. 396/55 |
| 5,680,251 | A | * | 10/1997 | Kato et al. | ............. 359/557 |
| 5,734,931 | A | * | 3/1998 | Inoue et al. | ............. 396/52 |
| 5,745,800 | A | * | 4/1998 | Kanbara et al. | ............. 396/55 |
| 5,845,157 | A | | 12/1998 | Imura et al. | ............. 396/55 |
| 5,883,742 | A | | 3/1999 | Kamata | ............. 359/557 |
| 6,031,998 | A | | 2/2000 | Shono | ............. 396/75 |
| 6,225,613 | B1 | | 5/2001 | Tsukamoto et al. | ............. 250/201.2 |
| 6,366,323 | B1 | | 4/2002 | Shono | ............. 348/340 |

(Continued)

FOREIGN PATENT DOCUMENTS

GB             2404810            2/2005

(Continued)

OTHER PUBLICATIONS

U.S. Appl. No. 11/477,417 to Nomura et al., filed Jun. 30, 2006.

(Continued)

*Primary Examiner*—Melissa J Koval
(74) *Attorney, Agent, or Firm*—Greenblum & Bernstein, P.L.C.

(57) ABSTRACT

A flexible printed wiring board arrangement of an imaging device includes an image pickup device movable in a plane orthogonal to an optical axis, a flexible printed wiring board extending from the image pickup device, and a movable support member which is positioned behind the image pickup device in the optical axis direction to support the flexible printed wiring board. The movable support member moves with the image pickup device in directions orthogonal to the optical axis when the image pickup device is moved, and a part of the flexible printed wiring board is disposed along a front surface of the movable support member behind the image pickup device.

17 Claims, 41 Drawing Sheets

U.S. PATENT DOCUMENTS

| | | | |
|---|---|---|---|
| 6,978,089 B2 | 12/2005 | Nomura et al. | 396/75 |
| 2001/0030814 A1 | 10/2001 | Koyama et al. | 359/811 |
| 2003/0067544 A1 | 4/2003 | Wada | 348/208.7 |
| 2005/0052570 A1 | 3/2005 | Enomoto | 348/375 |

FOREIGN PATENT DOCUMENTS

| | | |
|---|---|---|
| GB | 2420927 | 6/2006 |
| JP | 6-046314 | 2/1994 |
| JP | 7-028114 | 1/1995 |
| JP | 7-294989 | 11/1995 |
| JP | 9-022039 | 1/1997 |
| JP | 10-339897 | 12/1998 |
| JP | 2001-285696 | 10/2001 |
| JP | 2003-110928 | 4/2003 |
| JP | 2003-111449 | 4/2003 |
| JP | 2004-048266 | 2/2004 |
| JP | 2005-250284 | 9/2005 |

OTHER PUBLICATIONS

U.S. Appl. No. 11/477,456 to Nomura et al., filed Jun. 30, 2006.
U.S. Appl. No. 11/477,499 to Nomura et al., filed Jun. 30, 2006.
U.S. Appl. No. 11/477,380 to Nomura et al., filed Jun. 30, 2006.
U.S. Appl. No. 11/477,475 to Nomura et al., filed Jun. 30, 2006.
English language Abstract of JP 7-028114.
English language Abstract of JP 9-022039.
English language Abstract of JP 10-339897.
English language Abstract of JP 2003-110928.
English language Abstract of JP 2003-111449.
English language Abstract of JP 2004-048266.
English language Abstract of JP 2005-250284.
English Language Abstract of JP 2001-285696.
English language Abstract of JP 7-294989, Nov. 10, 1995.

\* cited by examiner

FLEXIBLE PRINTED WIRING BOARD ARRANGEMENT OF AN IMAGING DEVICE

BACKGROUND OF THE INVENTION

1. Field of the Invention

The present invention relates to a flexible printed wiring board arrangement of an imaging device.

2. Description of the Related Art

An imaging device (e.g., a digital camera) in which an image pickup device (e.g., a CCD or CMOS image sensor) is driven in a plane orthogonal to an optical axis to counteract image shake of an object image focused on the image pickup device which is caused by vibration such as hand shake applied to the imaging device is known in the art. To provide smooth movements of such a movable image pickup device, it is desirable that electrical connections between the image pickup device and an image processing circuit be established by a flexible PWB (flexible printed wiring board). However, if the flexible PWB comes in contact with adjacent members such as a stationary member to thereby cause a resistance to movements of the flexible PWB while the image pickup device is driven, the load on a driving mechanism for the image pickup device increases, which may have a harmful effect on the driving accuracy of the image pickup device. To prevent this problem from occurring, in the support structure for the flexible PWB, the flexible PWB needs to be supported by a stationary member or members at one or more points sufficiently away from the image pickup device, which hinders miniaturization of the imaging device.

SUMMARY OF THE INVENTION

The present invention provides a flexible printed wiring board arrangement of an imaging device, wherein the imaging device incorporates a movable image pickup device which is driven in a plane orthogonal to an optical axis, and wherein the flexible printed wiring board arrangement prevents the aforementioned resistance to movements of the flexible PWB, which extends from the image pickup device, from occurring so that the image pickup device can be driven stably with a high degree of accuracy even though the flexible printed wiring board arrangement is compact in size.

According to an aspect of the present invention, a flexible printed wiring board arrangement of an imaging device is provided, including an image pickup device movable in a plane orthogonal to an optical axis; a flexible printed wiring board extending from the image pickup device; and a movable support member which is positioned behind the image pickup device in the optical axis direction to support the flexible printed wiring board, wherein the movable support member moves with the image pickup device in directions orthogonal to the optical axis when the image pickup device is moved, a part of the flexible printed wiring board being disposed along a front surface of the movable support member behind the image pickup device.

It is desirable for the movable support member to include a plate which is arranged substantially parallel to the plane in which the image pickup device is movable, and for the flexible printed wiring board to be in surface contact with the front surface of the movable support member.

It is desirable for the flexible printed wiring board arrangement to include a rear protection member positioned behind the movable support member in the optical axis direction to cover the back of the image pickup device.

It is desirable for a part of the flexible printed wiring board to be fixed to the rear protection member.

It is desirable for the rear protection member to include a plate provided substantially parallel to the plane in which the image pickup device is movable. The part of the flexible printed wiring board is fixed to a rear surface of the rear projection member, and the movable support member prevents the flexible printed wiring board, except the part thereof that is fixed to the rear protection member, from touching the rear protection member.

It is desirable for the rear protection member to be fixed to a body of the imaging device so as to be immovable with respect thereto.

It is desirable for the flexible printed wiring board arrangement to include an external display device positioned behind the rear protection member to be exposed to the outside of the imaging device; and a second flexible printed wiring board which extends from the external display device and provided separately from the flexible printed wiring board that extends from the image pickup device. The second flexible printed wiring board is positioned in a space between the external display device and the rear protection member.

It is desirable for the flexible printed wiring board arrangement to include an image pickup device fixing member to which the image pickup device is fixed; a holding member which holds the image pickup device fixing member and is supported to be movable along the plane orthogonal to the optical axis; and an inclination angle adjusting mechanism for changing an inclination angle of the image pickup device fixing member relative to the holding member. The movable support member is fixed to the holding member.

It is desirable for the inclination angle adjusting mechanism to include a plurality of screw holes provided on the holding member; a plurality of adjusting screws which pass through a plurality of through-holes formed in the image pickup device fixing member to be screwed into corresponding the screw holes, respectively; and a plurality of compression coil springs positioned between the holding member and the image pickup device fixing member in a compressed state.

It is desirable for the flexible printed wiring board arrangement to include a rear protection member positioned behind the movable support member in the optical axis direction to cover the back of the image pickup device, wherein a plurality of through-holes are formed in the rear protection member so that the adjusting screws are accessible from the rear of the rear protection member through the through-holes, respectively.

It is desirable for the imaging device to be a digital camera.

In an embodiment, a flexible printed wiring board arrangement of an imaging device is provided, including an image pickup device movable in a plane orthogonal to an optical axis; a flexible printed wiring board extending from the image pickup device; and a bending resistance device which is positioned behind the image pickup device in the optical axis direction so as to provide a bending-resistance property to the flexible printed wiring board, wherein the bending resistance device moves with the image pickup device in directions orthogonal to the optical axis when the image pickup device is moved.

It is desirable for the bending resistance device to include a plate lying in a plane substantially parallel to the plane orthogonal to the optical axis.

In an embodiment, a flexible printed wiring board arrangement is provided, including an image pickup device movable in a plane orthogonal to an optical axis, a stationary circuit board, and a flexible printed wiring board which is wired to connect the image pickup device to the stationary circuit board, the flexible printed wiring board arrangement including a rear protection member positioned behind the image pickup device in the optical axis direction to protect the back of the image pickup device, a part of the flexible printed wiring board being fixed to the rear protection member; and a movable support member which is positioned between the rear protection member and the image pickup device in the optical axis direction to support the flexible printed wiring board, wherein the movable support member moves with the image pickup device in directions orthogonal to the optical axis when the image pickup device is moved, a part of the flexible printed wiring board being disposed along a front surface of the movable support member behind the image pickup device.

It is desirable for the movable support member to include a plate which is arranged substantially parallel to the plane orthogonal to the optical axis, and for the rear protection member to include a plate which is arranged substantially parallel to the plane orthogonal to the optical axis.

According to the present invention, the flexible printed wiring board arrangement of an imaging device which is compact in size makes it possible to prevent a resistance to movements of the flexible PWB when the image pickup device is driven, thus making it possible to drive the image pickup device stably with a high degree of accuracy.

The present disclosure relates to subject matter contained in Japanese Patent Applications Nos. 2005-192554 (filed on Jun. 30, 2005), 2005-306323 (filed on Oct. 20, 2005) and 2006-23217 (filed on Jan. 31, 2006), which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
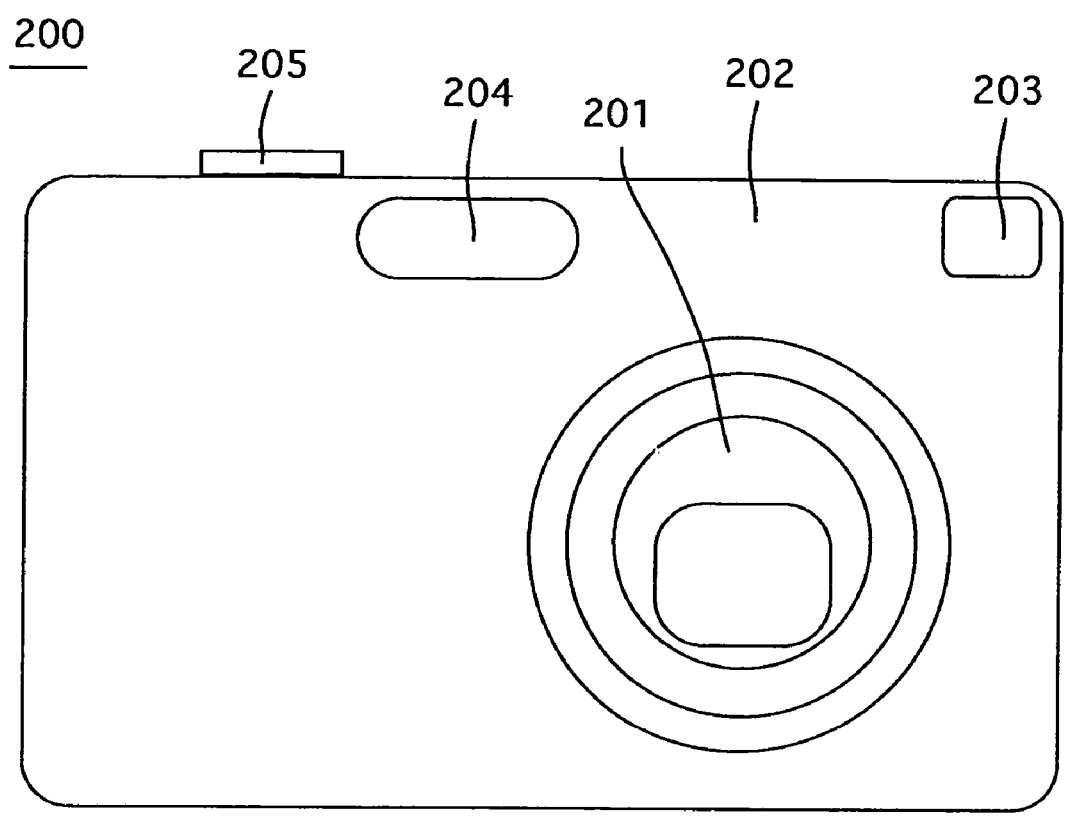
FIG. 1 is a front elevational view of an embodiment of a digital camera having a flexible printed wiring board arrangement according to the present invention.

FIG. 1 shows an outward appearance of a digital camera 200 which incorporates a flexible printed wiring board arrangement according to the present invention. The digital camera 200 is provided on the front of a camera body 202 thereof with a zoom lens (zoom lens barrel) 201, an optical viewfinder 203 and a flash 204, and is provided on the top of the camera body 202 with a shutter button 205.

Figure 2:
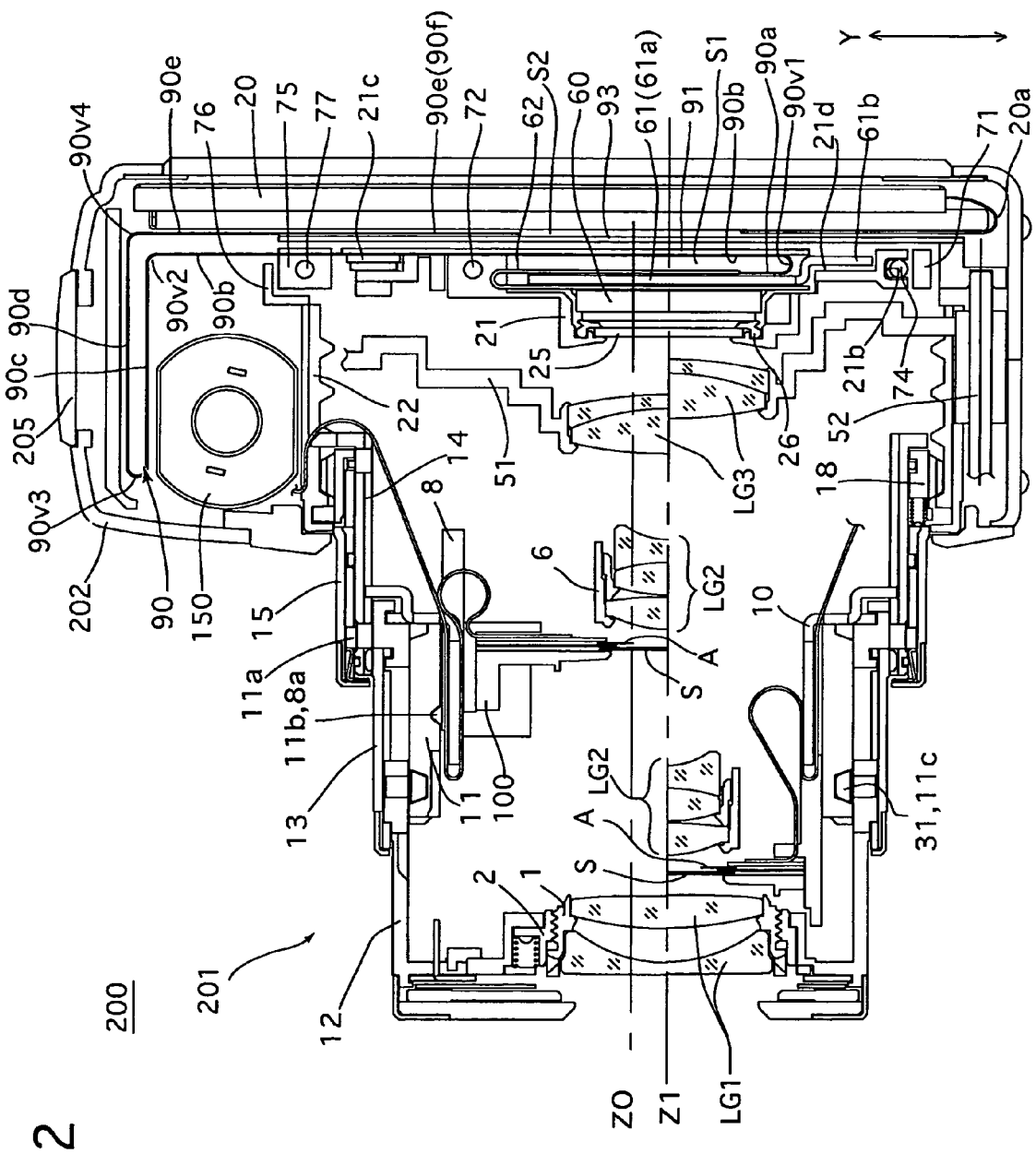
FIG. 2 is a longitudinal sectional view of the digital camera shown in FIG. 1 in a ready-to-photograph state of the zoom lens thereof.
Figure 3:
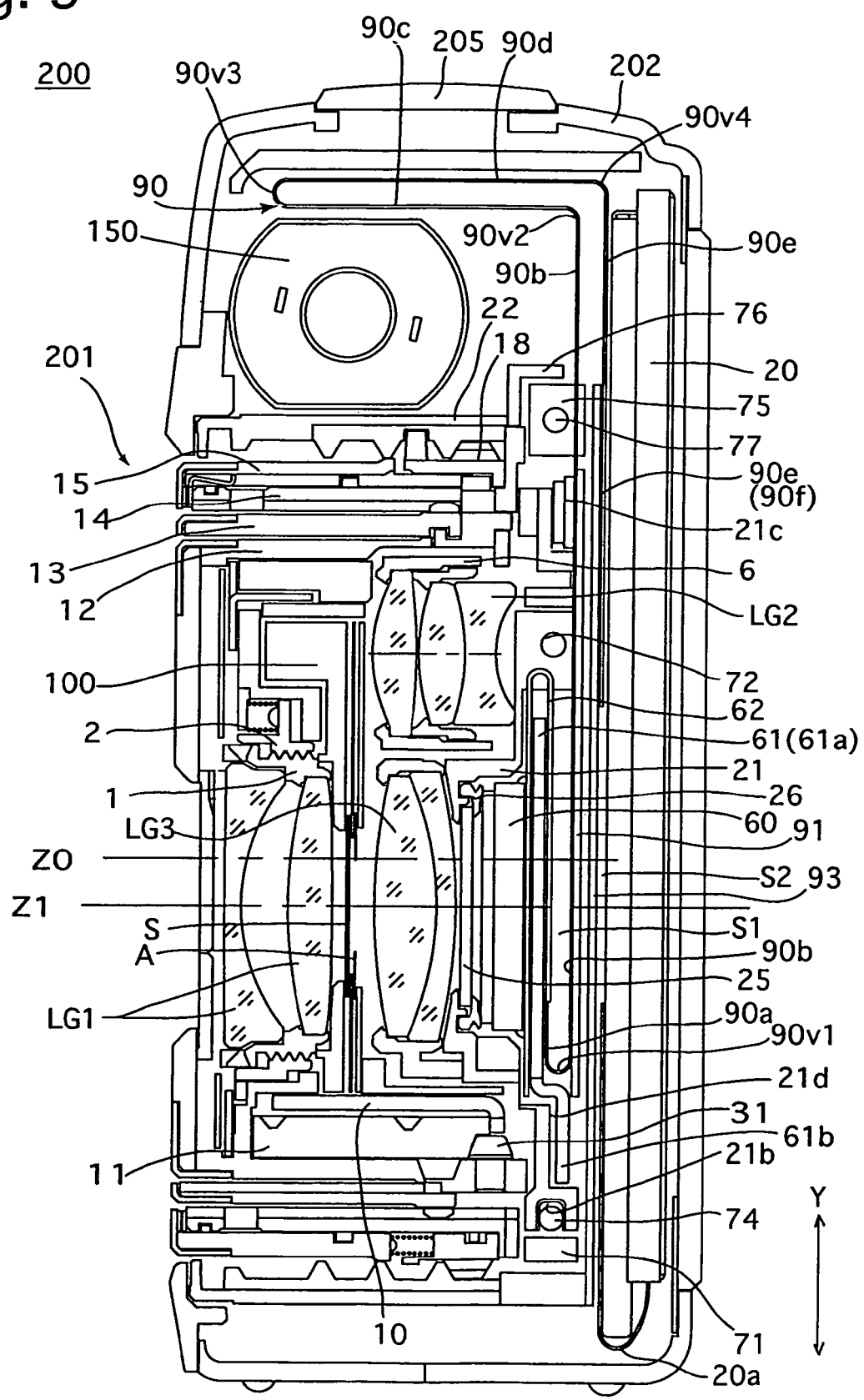
FIG. 3 is a longitudinal sectional view of the digital camera shown in FIG. 1 in the fully-retracted state of the zoom lens.
Figure 5:
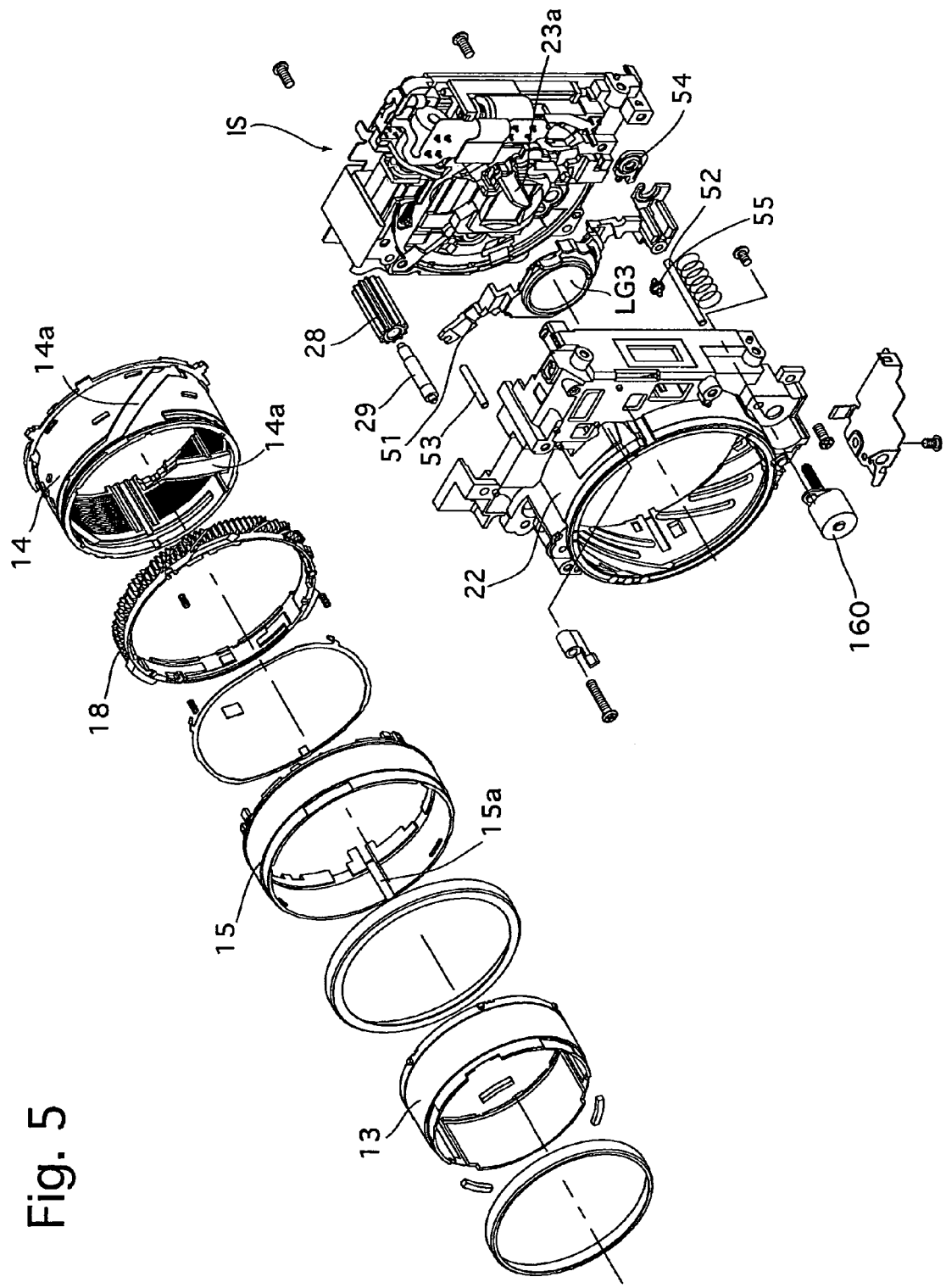
FIG. 5 is an exploded perspective view of a portion of the zoom lens shown in FIG. 4.
Figure 6:
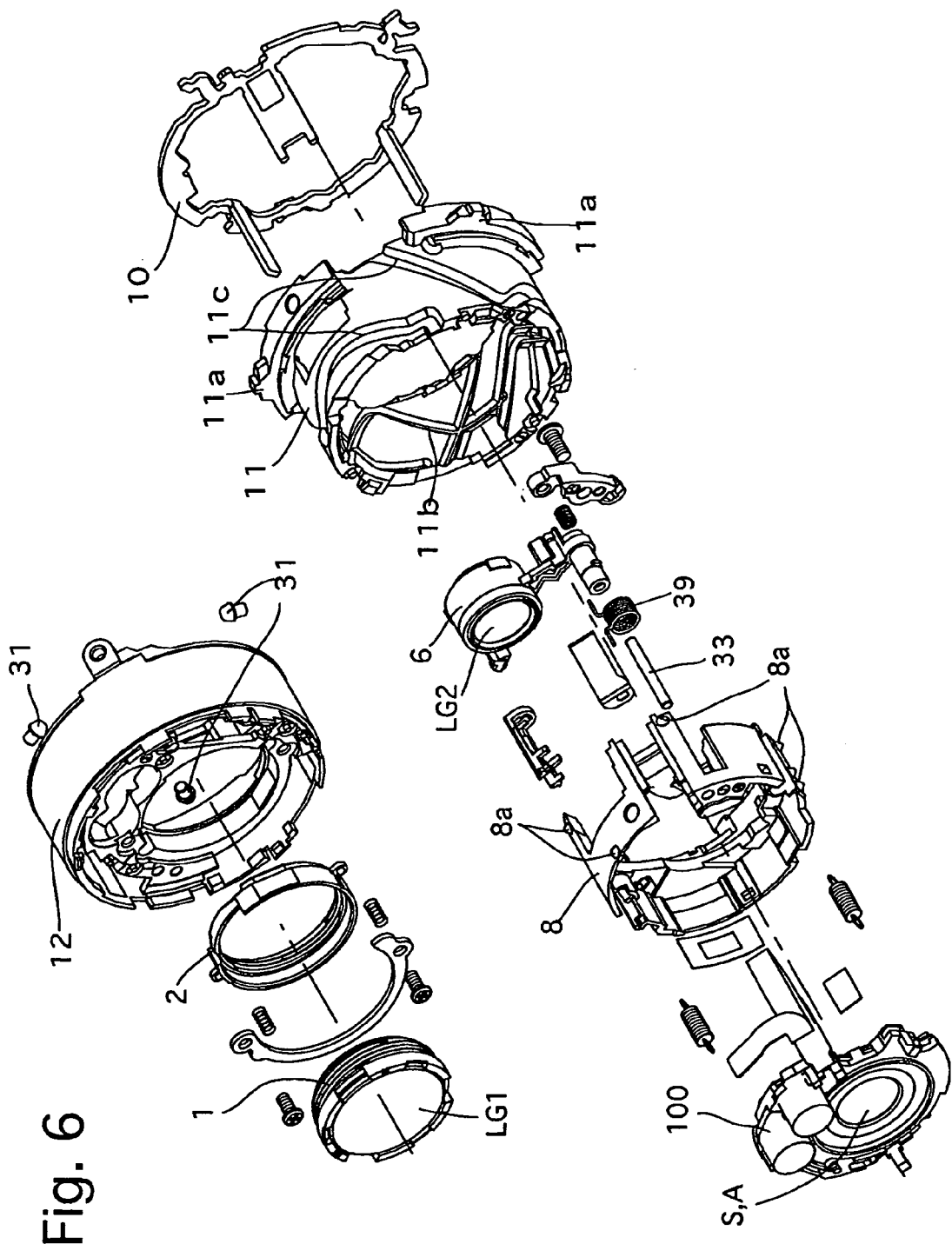
FIG. 6 is an exploded perspective view of another portion of the zoom lens shown in FIG. 4.

The zoom lens 201 of the digital camera 200, longitudinal sectional views of which are shown in FIGS. 2 and 3, is driven to advance toward the object side (leftward viewed in FIGS. 2 and 3) from the camera body 202 as shown in FIG. 2 during a photographing operation. When photography is no being carried out, the digital camera 200 moves from a ready-to-photograph state shown in FIG. 2 to a fully-retracted state shown in FIG. 3 in which the zoom lens 201 is accommodated (fully retracted) in the camera body 202 as shown in FIG. 3. In FIG. 2, the upper half and the lower half of the zoom lens 201 from a photographing optical axis Z1 show the ready-to-photograph state of the zoom lens 201 at the wide-angle extremity and the telephoto extremity, respectively. As shown in FIGS. 5 and 6, the zoom lens 201 is provided with a plurality of ring members (hollow-cylindrical members): a second linear guide ring 10, a cam ring 11, a third movable barrel 12, a second movable barrel 13, a first linear guide ring 14, a first movable barrel 15, a helicoid ring 18 and a stationary barrel 22 which are substantially concentrically arranged about a common axis that is shown as a lens barrel axis Z0 in FIGS. 2 and 3.

The zoom lens 201 is provided with a photographing optical system including of a first lens group LG1, a shutter S, an adjustable diaphragm A, a second lens group LG2, a third lens group LG3, a low-pass filter 25 and a CCD image sensor 60 that serves an image pickup device. Optical elements from the first lens group LG1 to the CCD image sensor 60 are positioned on the photographing optical axis (common optical axis) Z1 when the zoom lens 201 is in a ready-to-photograph state. The photographing optical axis Z1 is parallel to the lens barrel axis Z0 and positioned below the lens barrel axis Z0. The first lens group LG1 and the second lens group LG2 are moved along the photographing optical axis Z1 in a predetermined moving manner to perform a zooming operation, and the third lens group LG3 is moved along the photographing optical axis Z1 to perform a focusing operation. In the following description, the term "optical axis direction" refers to a direction parallel to the photographing optical axis Z1 and the terms "object side" and "image side" refer to forward and rearward of the digital camera 200, respectively. Additionally, in the following description, the vertical direction and the horizontal direction of the digital camera 200 in a plane orthogonal to the photographing optical axis Z1 refer are defined as a Y-axis direction and an X-axis direction, respectively.

The stationary barrel 22 is positioned in the camera body 202 and fixed thereto, while a stationary holder 23 is fixed to a rear portion of the stationary barrel 22. The CCD image sensor 60 and the low-pass filter 25 are supported by the stationary holder 23 via a Y-axis direction moving stage 71 and an X-axis direction moving stage 21 to be movable in the X-axis direction and the Y-axis direction. The digital camera 200 is provided behind the stationary holder 23 with an LCD panel (external display device) 20 which indicates visual images and various photographic information.

The zoom lens 201 is provided in the stationary barrel 22 with a third lens frame 51 which supports and holds the third lens group LG3. The zoom lens 201 is provided between the stationary holder 23 and the stationary barrel 22 with a pair of guide shafts 52 and 53 which extend parallel to the photographing optical axis Z1 to guide the third lens frame 51 in the optical axis direction without rotating the third lens frame 51 about the lens barrel axis Z0. The third lens frame 51 is biased forward by a third lens frame biasing spring (extension coil spring) 55. The digital camera 200 is provided with a focusing motor 160 having a rotary drive shaft which is threaded to serve as a feed screw, and the rotary drive shaft is screwed through a screw hole formed on an AF nut 54. If the AF nut 54 is moved rearward by a rotation of the rotary drive shaft of the focusing motor 160, the third lens frame 51 is pressed by the AF nut 54 to move rearward. Conversely, if the AF nut 54 is moved forward, the third lens frame 51 follows the AF nut 54 to move forward by the biasing force of the third lens frame biasing spring 55. Due to this structure, the third lens frame 51 can be moved forward and rearward in the optical axis direction.

Figure 4:
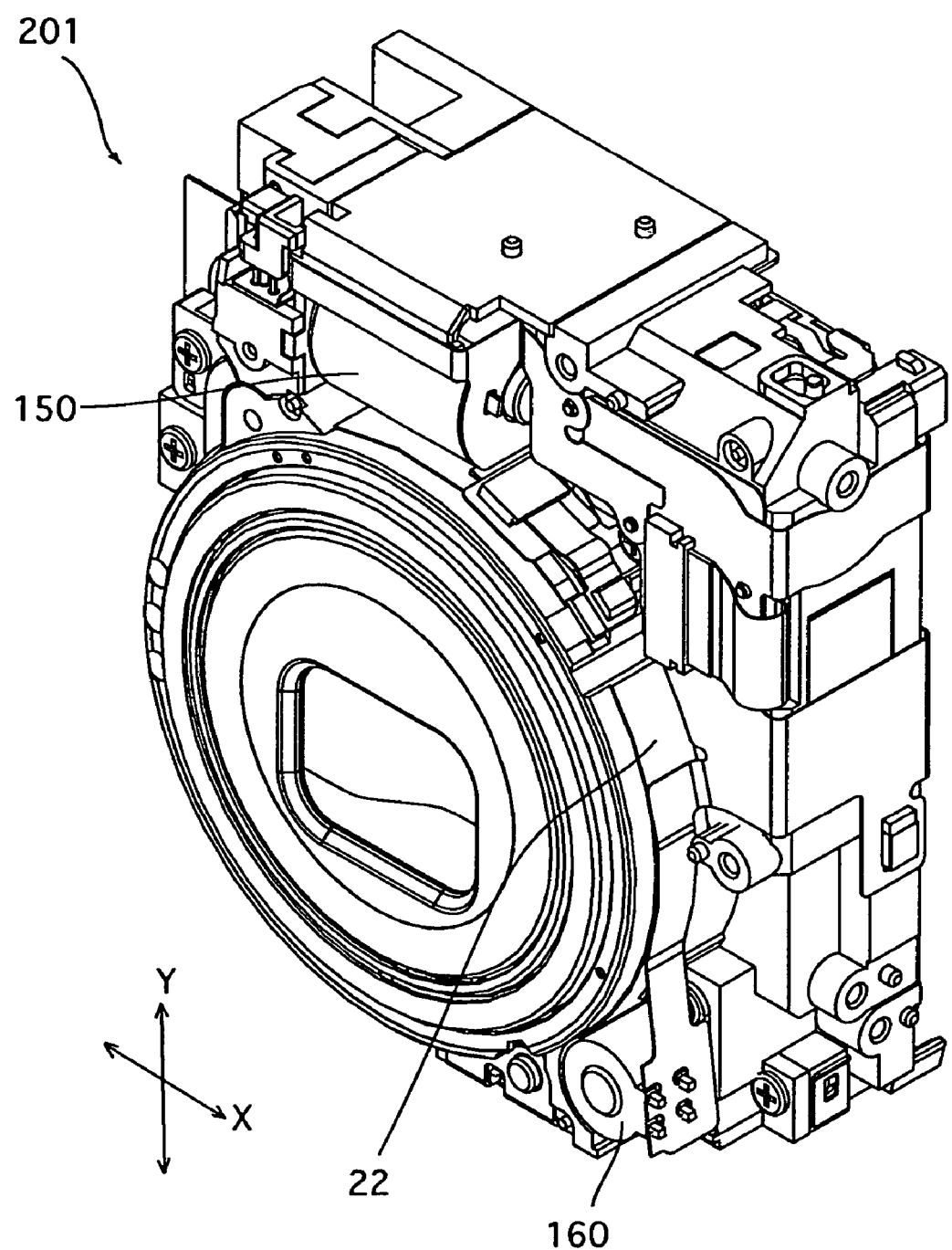
FIG. 4 is a perspective view of the zoom lens of the digital camera shown in FIG. 1 in the fully-retracted state of the zoom lens.

As shown in FIG. 4, the digital camera 200 is provided on the stationary barrel 22 with a zoom motor 150 which is supported by the stationary barrel 22. The driving force of the zoom motor 150 is transferred to a zoom gear 28 (see FIG. 5) via a reduction gear train (not shown). The zoom gear 28 is rotatably fitted on a zoom gear shaft 29 extending parallel to the photographing optical axis Z1. Front and rear ends of the zoom gear shaft 29 are fixed to the stationary barrel 22 and the stationary holder 23, respectively.

The helicoid ring 18 is positioned inside the stationary barrel 22 and supported thereby. The helicoid ring 18 is rotated by rotation of the zoom gear 28. The helicoid ring 18 is moved forward and rearward in the optical axis direction while being rotated about the lens barrel axis Z0 via a helicoid structure (provided between the helicoid ring 18 and the stationary barrel 22) within a predetermined range in the optical axis direction between the position in the fully-retracted state of the zoom lens 201 shown in FIG. 3 to the position in the state of the zoom lens 201 immediately before the zoom lens 201 is in the ready-to-photograph state thereof at the wide-angle extremity shown by the upper half of the zoom lens 201 in FIG. 2. In a ready-to-photograph state of the zoom lens 201 shown in FIG. 2 (between the wide-angle extremity and the telephoto extremity), the helicoid ring 18 is rotated at a fixed position without moving in the optical axis direction. The first movable barrel 15 is coupled to the helicoid ring 18 to be rotatable together with the helicoid ring 18 about the lens barrel axis Z0 and to be movable together with the helicoid ring 18 in the optical axis direction.

The first linear guide ring 14 is positioned inside the first movable barrel 15 and the helicoid ring 18 and supported thereby. The first linear guide ring 14 is guided linearly in the optical axis direction via linear guide grooves formed on the stationary barrel 22, and is engaged with the first movable barrel 15 and the helicoid ring 18 to be rotatable about the lens barrel axis Z0 relative to the first movable barrel 15 and the helicoid ring 18, and to be movable in the optical axis direction together with the first movable barrel 15 and the helicoid ring 18.

As shown in FIG. 5, the first linear guide ring 14 is provided with a set of three through-slots 14a (only two of which appear in FIG. 5) which radially penetrate the first linear guide ring 14. Each through-slot 14a includes a circumferential slot portion and an inclined lead slot portion which extends obliquely rearward from one end of the circumferential slot portion. The inclined lead slot portion is inclined with respect to the optical axis direction, while the circumferential slot portion extends circumferentially about the lens barrel axis Z0. A set of three followers 11a (only two of which appear in FIG. 6) which project radially outward from an outer peripheral surface of the cam ring 11 are engaged in the set of three through-slots 14a, respectively. The set of three followers 11a are further engaged in a set of three rotation transfer grooves 15a which are formed on an inner peripheral surface of the first movable barrel 15 and extend parallel to the photographing optical axis Z1 so that the cam ring 11 rotates with the first movable barrel 15. When the set of three followers 11a are engaged in the lead slot portions of the set of three through-slots 14a, respectively, the cam ring 11 is moved forward and rearward in the optical axis direction while being rotated about the lens barrel axis Z0 and guided by the set of three through-slots 14a. On the other hand, when the set of three followers 11a are engaged in the circumferential slot portions of the set of three through-slots 14a, respectively, the cam ring 11 is rotated at a fixed position without moving in the optical axis direction. Similar to the helicoid ring 18, the cam ring 11 is moved forward and rearward in the optical axis direction while being rotated about the lens barrel axis Z0 within a predetermined range in the optical axis direction between the position in the fully-retracted state of the zoom lens 201 shown in FIG. 3 to the position in the state of the zoom lens 201 immediately before the zoom lens 201 enters the ready-to-photograph state thereof at the wide-angle extremity (shown by the upper half of the zoom lens 201 in FIG. 2), and the cam ring 11 is rotated at a fixed position without moving in the optical axis direction in a ready-to-photograph state of the zoom lens 201 shown in FIG. 2 (between the wide-angle extremity and the telephoto extremity).

The first linear guide ring 14 guides the second linear guide ring 10 and the second movable ring 13 linearly in the optical axis direction by linear guide grooves which are formed on an inner peripheral surface of the first linear guide ring 14 to extend parallel to the photographing optical axis Z1. The second linear guide ring 10 guides a second lens group moving frame 8, which indirectly supports the second lens group LG2, linearly in the optical axis direction, while the second movable barrel 13 guides the third movable barrel 12, which indirectly supports the first lens group LG1, linearly in the optical axis direction. Each of the second linear guide ring 10 and the second movable barrel 13 is supported by the cam ring 11 to be rotatable relative to the cam ring 11 about the lens barrel axis Z0 and to be movable together with the cam ring 11 in the optical axis direction.

The cam ring 11 is provided on an inner peripheral surface thereof with a plurality of inner cam grooves 11b for moving the second lens group LG2, and the second lens group moving frame 8 is provided on an outer peripheral surface thereof with a plurality of cam followers 8a which are engaged in the plurality of inner cam grooves 11b, respectively. Since the second lens group moving frame 8 is guided linearly in the optical axis direction without rotating via the second linear guide ring 10, a rotation of the cam ring 11 causes the second lens group moving frame 8 to move in the optical axis direction in a predetermined moving manner in accordance with contours of the plurality of inner cam grooves 11b.

As shown in FIG. 6, the zoom lens 201 is provided inside the second lens group moving frame 8 with a second lens frame 6 which supports and holds the second lens group LG2. The second lens frame 6 is supported by the second lens group moving frame 8 to be rotatable (swingable) about a pivot shaft 33. The pivot shaft 33 extends parallel to the photographing optical axis Z1. The second lens frame 6 is swingable about the pivot shaft 33 between a photographing position (shown in FIG. 2) where the second lens group LG2 is positioned on the photographing optical axis Z1, and a radially retracted position (shown in FIG. 3) where the optical axis of the second lens group LG2 is retracted away from the photographing optical axis Z1 to be positioned above the photographing optical axis Z1. The second lens frame 6 is biased to rotate in a direction toward the aforementioned photographing position of the second lens frame 6 by a torsion spring 39. The stationary holder 23 is provided with a position-control cam bar (second lens frame removing device) 23a (see FIG. 5) which projects forward from the stationary holder 23 to be engageable with the second lens frame 6 so that the position-control cam bar 23a comes into pressing contact with the second lens frame 6 to rotate the second lens frame 6 to the radially retracted position thereof against the biasing force of the torsion spring 39 when the second lens group moving frame 8 moves rearward in a retracting direction to approach the stationary holder 23.

The second movable barrel 13, which is guided linearly in the optical axis direction without rotating by the second linear guide ring 10, guides the third movable barrel 12 linearly in the optical axis direction. The third movable barrel 12 is provided on an inner peripheral surface thereof with a set of three cam followers 31 (see FIG. 6) which project radially inwards, and the cam ring 11 is provided on an outer peripheral surface thereof with a set of three outer cam grooves 11c (cam grooves for moving the first lens group LG1; only two of them appear in FIG. 6) in which the set of three cam followers 31 are slidably engaged, respectively. The zoom lens 201 is provided inside the third movable barrel 12 with a first lens frame 1 which is supported by the third movable barrel 12 via a first lens group adjustment ring 2.

The zoom lens 201 is provided between the first and second lens groups LG1 and LG2 with a shutter unit 100 including the shutter S and the adjustable diaphragm A. The shutter unit 100 is positioned inside the second lens group moving frame 8 and fixed thereto.

Operations of the zoom lens 201 that has the above described structure will be discussed hereinafter. In the state shown in FIG. 3, in which the zoom lens 201 is in the fully-retracted state, the zoom lens 201 is fully accommodated in the camera body 202. Upon a main switch 101 (see FIG. 25) provided on an outer surface of the camera body 202 being turned ON in the fully-retracted state of the zoom lens 201 shown in FIG. 3, the zoom motor 150 is driven to rotate in a lens barrel advancing direction by control of a control circuit 102 (see FIG. 25) provided in the camera body 202. This rotation of the zoom motor 150 rotates the zoom gear 28. The rotation of the zoom gear 28 causes a combination of the first movable barrel 15 and the helicoid ring 18 to move forward while rotating about the lens barrel axis Z0 due to the aforementioned helicoid structure, and further causes the first linear guide ring 14 to move forward linearly together with the first movable barrel 15 and the helicoid ring 18. At this time, the cam ring 11 which rotates by rotation of the first movable barrel 15 moves forward in the optical axis direction by an amount of movement corresponding to the sum of the amount of the forward movement of the first linear guide ring 14 and the amount of the forward movement of the cam ring 11 by a leading structure between the first linear guide ring 14 and the cam ring 11, i.e., by the engagement of the inclined lead slot portions of the set of three through-slots 14a and the set of three followers 11a of the cam ring 11, respectively. Once the helicoid ring 18 and the cam ring 11 advance to respective predetermined points thereof, the functions of a rotating/advancing mechanism (the aforementioned helicoid structure) between the helicoid ring 18 and the stationary barrel 22) and another rotating/advancing mechanism (the aforementioned leading structure) between the cam ring 11 and the first linear guide ring 14 are canceled, so that each of the helicoid ring 18 and the cam ring 11 rotates about the lens barrel axis Z0 without moving in the optical axis direction.

A rotation of the cam ring 11 causes the second lens group moving frame 8, which is positioned inside the cam ring 11 and guided linearly in the optical axis direction via the second linear guide ring 10, to move in the optical axis direction with respect to the cam ring 11 in a predetermined moving manner due to the engagement of the set of three cam followers 8a with the set of three inner cam grooves 11b, respectively. In the state shown in FIG. 3, in which the zoom lens 201 is in the fully-retracted state, the second lens frame 6, which is positioned inside the second lens group moving frame 8, is held in the radially retracted position off the photographing optical axis Z1 by the action of the position-control cam bar 23a, which projects forward from the stationary holder 23. During the course of movement of the second lens group moving frame 8 from the retracted position to a position in the zooming range, the second lens frame 6 is disengaged from the position-control cam bar 23a to rotate about the pivot shaft 33 from the radially retracted position to the photographing position shown in FIG. 2, where the optical axis of the second lens group LG2 coincides with the photographing optical axis Z1, by the spring force of the torsion spring 39. Thereafter, the second lens frame 6 remains held in the photographing position until the zoom lens 201 is retracted into the camera body 201.

In addition, a rotation of the cam ring 11 causes the third movable barrel 12, which is positioned around the cam ring 11 and guided linearly in the optical axis direction via the second movable barrel 13, to move in the optical axis direction relative to the cam ring 11 in a predetermined moving manner due to the engagement of the set of three cam followers 31 with the set of three outer cam grooves 11c of the cam ring 11, respectively.

Accordingly, an axial position of the first lens group LG1 relative to a picture plane (imaging surface/light receiving surface of the CCD image sensor 60) when the first lens group LG1 is moved forward from the fully-retracted position is determined by the sum of the amount of forward movement of the cam ring 11 relative to the stationary barrel 22 and the amount of movement of the third external barrel 12 relative to the cam ring 11, while an axial position of the second lens group LG2 relative to the picture plane when the second lens group LG2 is moved forward from the fully-retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 on the photographing optical axis Z1 while changing the air distance therebetween. When the zoom lens 201 is driven to advance from the fully-retracted position shown in FIG. 3, the zoom lens 201 firstly moves to a position shown above the photographing lens axis Z1 in FIG. 2 in which the zoom lens 201 is at the wide-angle extremity. Subsequently, the zoom lens 201 moves a position state shown below the photographing lens axis Z1 in FIG. 2 in which the zoom lens 201 is at the telephoto extremity by a further rotation of the zoom motor 150 in a lens barrel advancing direction thereof. As can be seen from FIG. 2, the space between the first and second lens groups LG1 and LG2 when the zoom lens 201 is at the wide-angle extremity is greater than when the zoom lens 201 is at the telephoto extremity. When the zoom lens 201 is at the telephoto extremity as shown below the photographing lens axis Z1 in FIG. 2, the first and second lens groups LG1 and LG2 have moved to approach each other to have some space therebetween which is smaller than the space in the zoom lens 201 at the wide-angle extremity. This variation of the air distance between the first and second lens groups LG1 and LG2 for the zooming operation is achieved by contours of the plurality of inner cam grooves 11b (for moving the second lens group LG2) and the set of three outer cam grooves 11c (for moving the first lens group LG1) of the cam ring 11. In the zooming range between the wide-angle extremity and the telephoto extremity, the cam ring 11, the first movable barrel 15 and the helicoid ring 18 rotate at their respective axial fixed positions, i.e., without moving in the optical axis direction.

In a ready-to-photograph state of the zoom lens 201 between the wide-angle extremity and the telephoto extremity, a focusing operation is carried out by moving the third lens group LG3 (the third lens frame 51) along the photographing optical axis Z1 by driving the AF motor 160 in accordance with object distance information obtained by a distance measuring device of the digital camera 200.

Upon the main switch 101 being turned OFF, the zoom motor 150 is driven to rotate in a lens barrel retracting direction so that the zoom lens 201 operates in the reverse manner to the above described advancing operation to fully retract the zoom lens 201 into the camera body 202 as shown in FIG. 3. During the course of this retracting movement of the zoom lens 201, the second lens frame 6 rotates about the pivot shaft 33 to the radially retracted position by the position-control cam bar 23a while moving rearward together with the second lens group moving frame 8. When the zoom lens 201 is fully retracted into the camera body 202, the second lens group LG2 is retracted into the space radially outside the space in which the third lens group LG3, the low-pass filter LG4 and the CCD image sensor 60 are retracted as shown in FIG. 3, i.e., the second lens group LG2 is radially retracted into an axial range substantially identical to an axial range in the optical axis direction in which the third lens group LG3, the low-pass filter LG4 and the CCD image sensor 60 are positioned. This structure of the digital camera 200 for retracting the second lens group LG2 in this manner reduces the length of the zoom lens 201 when the zoom lens 201 is fully retracted, thus making it possible to reduce the thickness of the camera body 202 in the optical axis direction, i.e., in the horizontal direction as viewed in FIG. 3.

Figure 7:
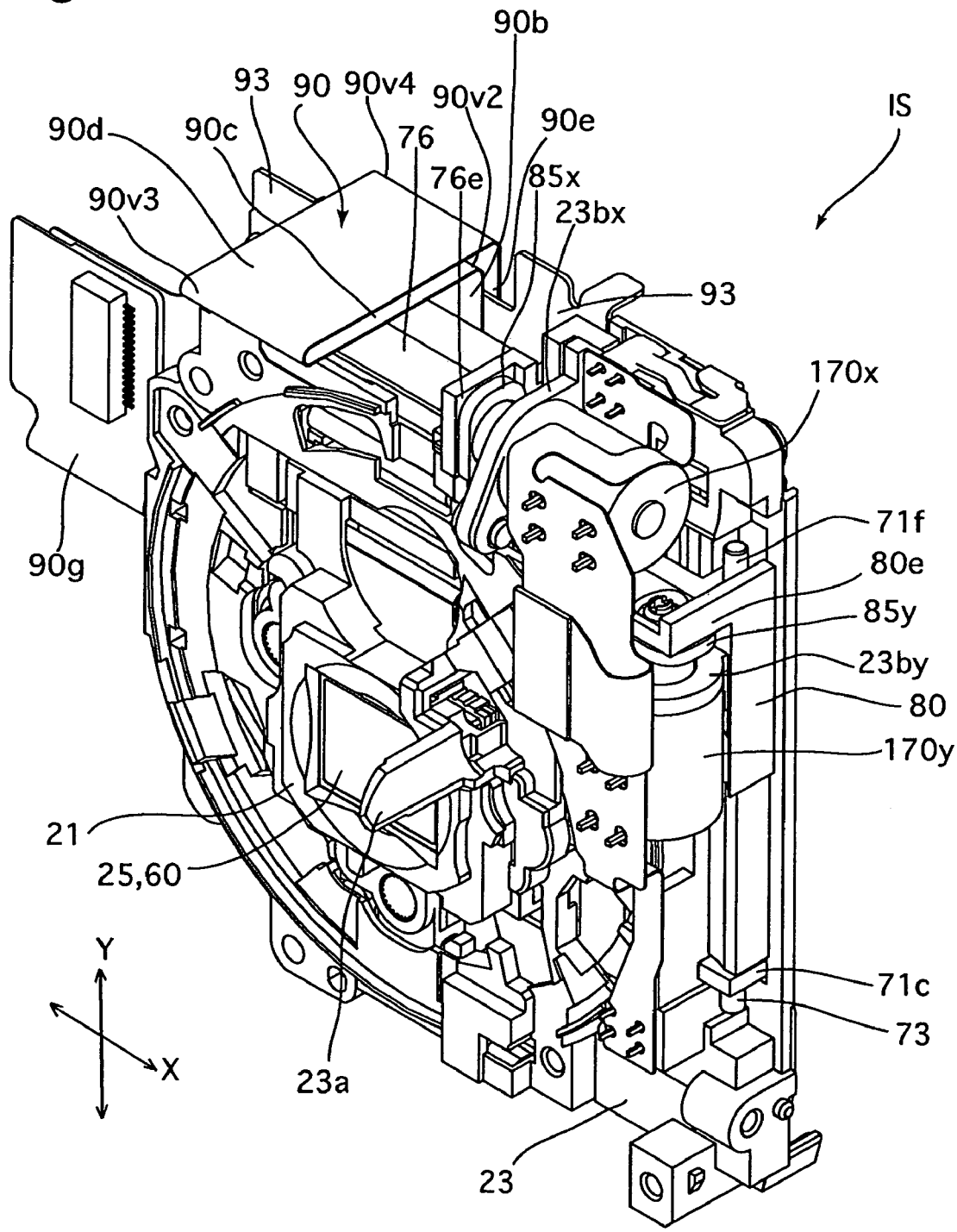
FIG. 7 is a front perspective view of an image stabilizing unit (image stabilizing mechanism) shown in FIG. 5.
Figure 8:
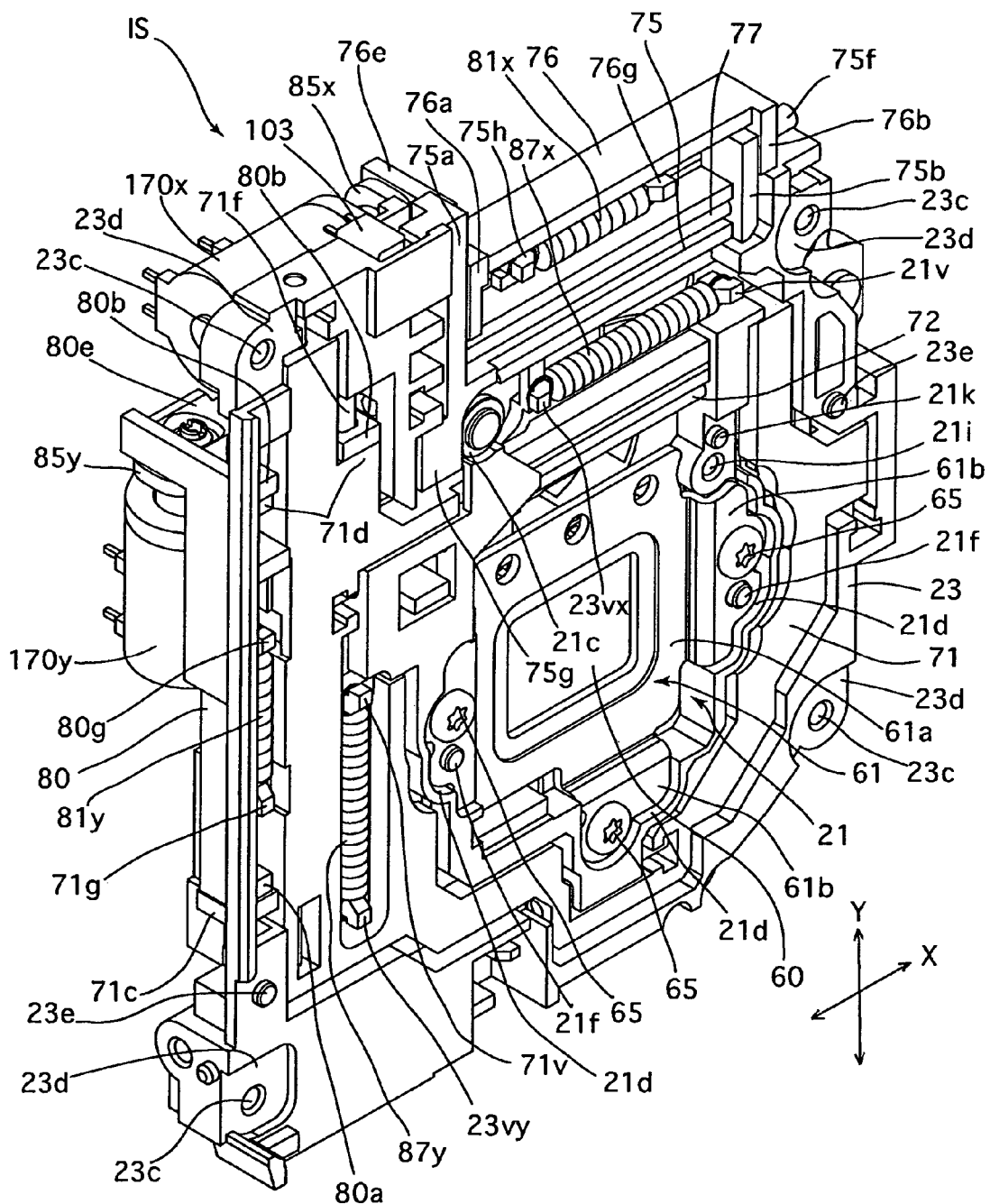
FIG. 8 is a rear perspective view of the image stabilizing unit shown in FIG. 5 from which a movable plate and a stationary cover are removed.
Figure 9:
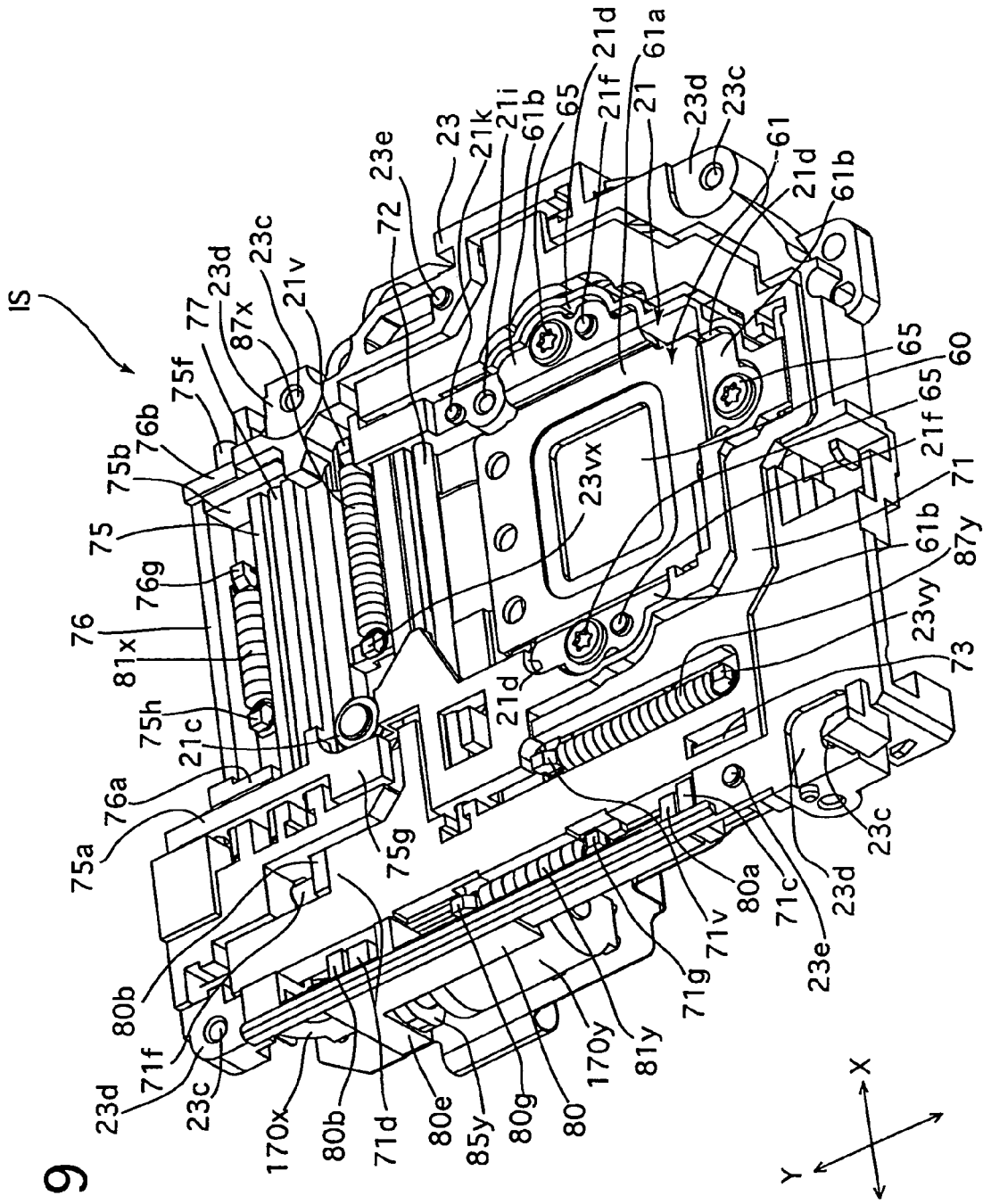
FIG. 9 is a rear perspective view of the image stabilizing unit shown in FIG. 5, viewed from an angle different from the angle of FIG. 8.
Figure 10:
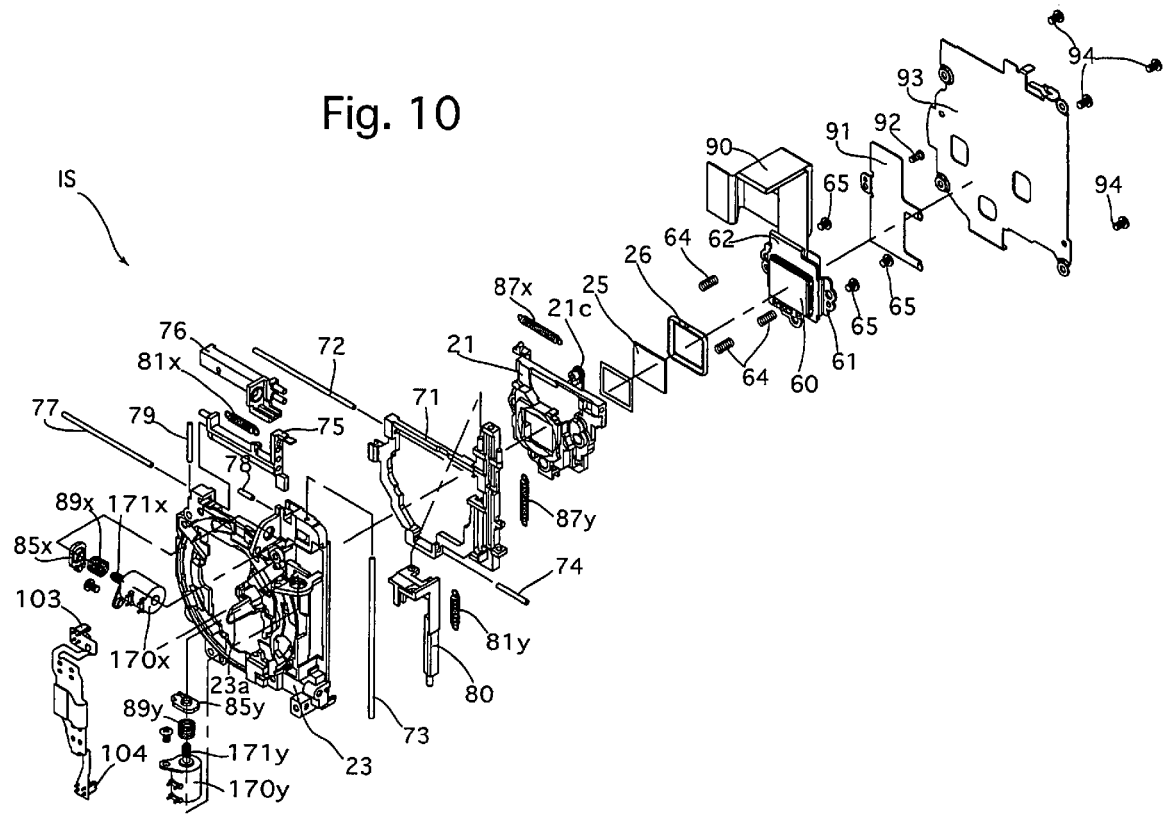
FIG. 10 is an exploded perspective view of the image stabilizing unit.
Figure 25:
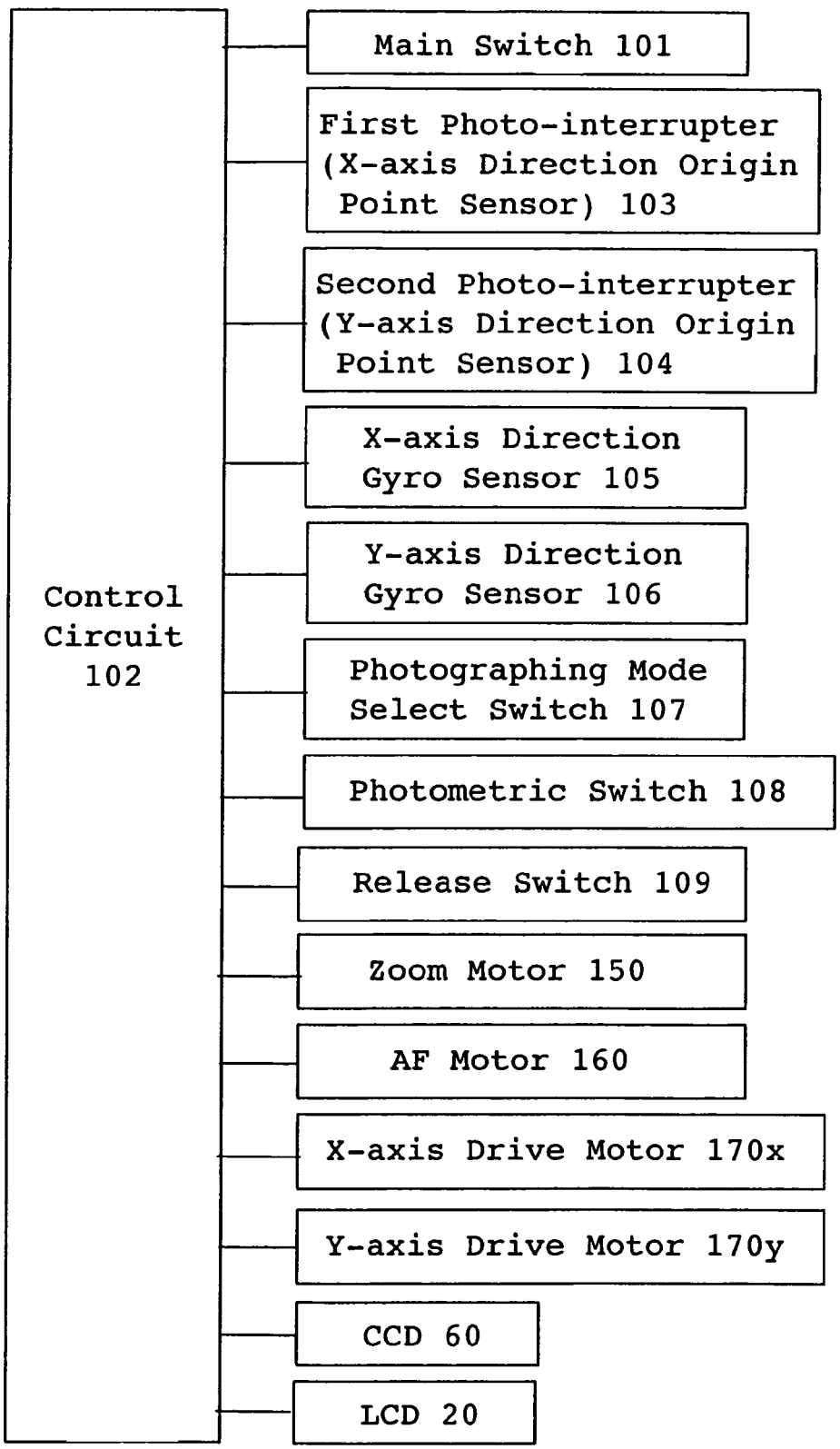
FIG. 25 is a block diagram illustrating a configuration of electrical circuits of the digital camera shown in FIGS. 1 through 3.

The digital camera 200 is provided with an image stabilizer (optical image stabilizer). This image stabilizer moves the CCD image sensor 60 in a plane orthogonal to the photographing optical axis Z1 to counteract image shake of an object image captured by the CCD image sensor 60 in accordance with the direction and the magnitude of vibration (hand shake) applied to the digital camera 200. This control is performed by the control circuit 102 (FIG. 25). FIGS. 7 through 9 show an image stabilizing unit IS including the CCD image sensor 60. FIG. 10 is an exploded perspective view of the entire image stabilizing unit IS and FIGS. 11 through 23 are perspective views or exploded perspective views of various portions of the image stabilizing unit IS.

The stationary holder 23 is provided with a pair of Y-axis direction guide rods 73 and 79 which extend in the Y-axis direction (the vertical direction of the digital camera 200). The Y-axis direction moving stage 71 is provided with a guide hole 71a and a guide groove 71b (see FIG. 16) in which the pair of Y-axis direction guide rods 73 and 79 are engaged so that the Y-axis direction moving stage 71 is supported by the pair of Y-axis direction guide rods 73 and 79 to be freely slidable thereon, respectively. A pair of X-axis direction guide rods 72 and 74 are fixed to the Y-axis direction moving stage 71 to extend in the X-axis direction (the horizontal direction of the digital camera 200) that is perpendicular to the Y-axis direction. The X-axis direction stage 21 is provided with a guide hole 21a and a guide groove 21b (see FIGS. 12 and 13) in which the pair of X-axis direction guide rods 72 and 74 are engaged so that the X-axis direction moving stage 21 is freely slidable thereon, respectively. Accordingly, the CCD image sensor 60 is supported by the stationary holder 23 via the Y-axis direction moving stage 71 and the X-axis direction moving stage 21 to be movable in two axial directions orthogonal to each other in a plane orthogonal to the photographing optical axis Z1. The range of movement of the X-axis direction stage 21 is defined by inner peripheral surfaces of the Y-axis direction moving stage 71, while the range of movement of the Y-axis direction moving stage 71 is defined by inner peripheral surfaces of the stationary holder 23.

The image stabilizing unit IS is provided with an X-axis direction stage biasing spring 87x which is extended and installed between a spring hook 21v formed on the X-axis direction moving stage 21 and a spring hook 23vx formed on the stationary holder 23. The X-axis direction stage biasing spring 87x is an extension coil spring and biases the X-axis direction moving stage 21 rightward as viewed from the front of the zoom lens 201 (leftward as viewed from the rear of the zoom lens 201). The image stabilizing unit IS is provided with a Y-axis direction stage biasing spring 87y which is extended and installed between a spring hook 71v formed on the Y-axis direction moving stage 71 and a spring hook 23vy formed on the stationary holder 23. The Y-axis direction stage biasing spring 87y is an extension coil spring and biases the Y-axis direction moving stage 71 downward.

Figure 16:
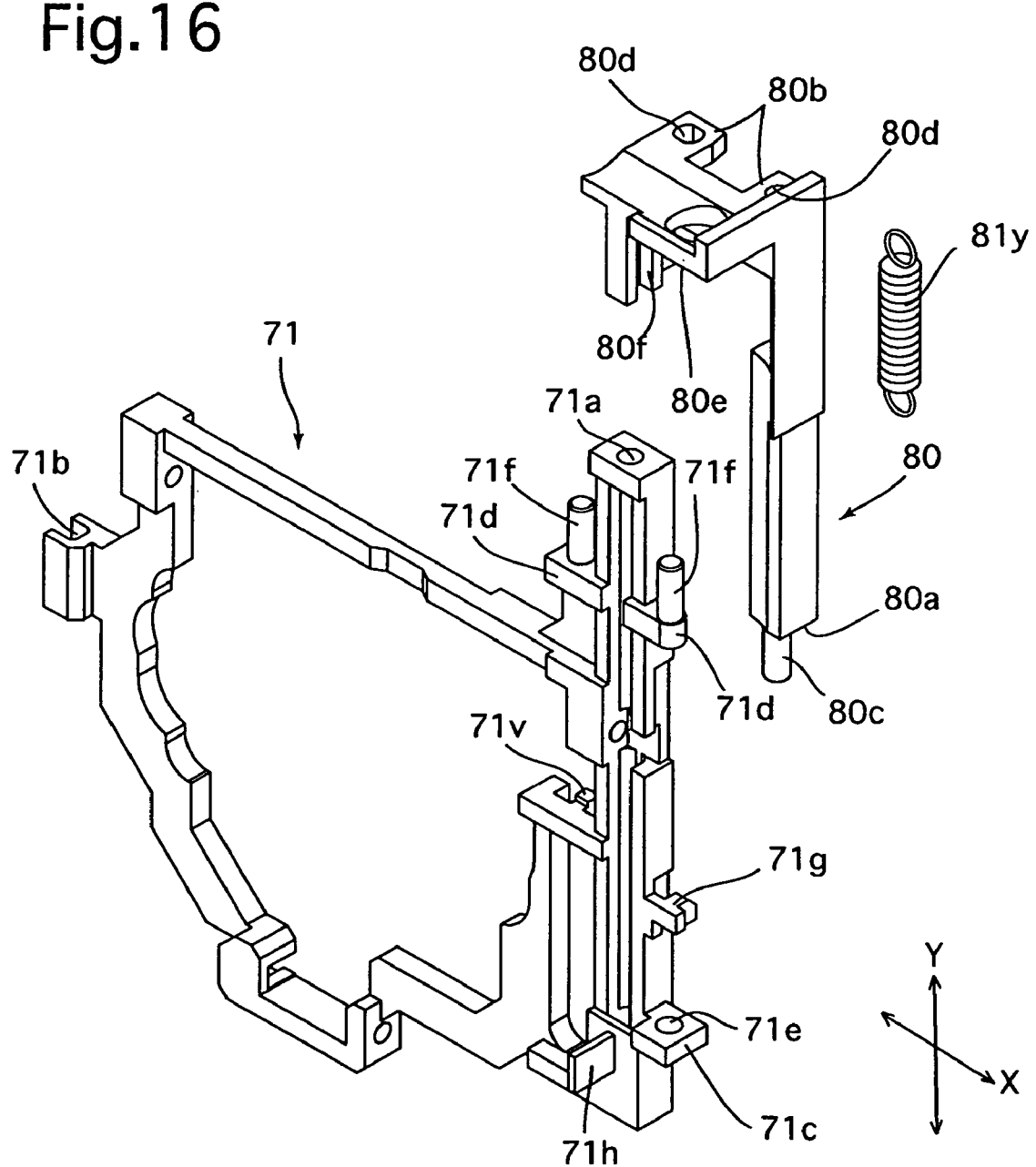
FIG. 16 is an exploded perspective view of a Y-axis direction moving member, a Y-axis direction moving stage and an associated extension joining spring of the image stabilizing unit.
Figure 17:
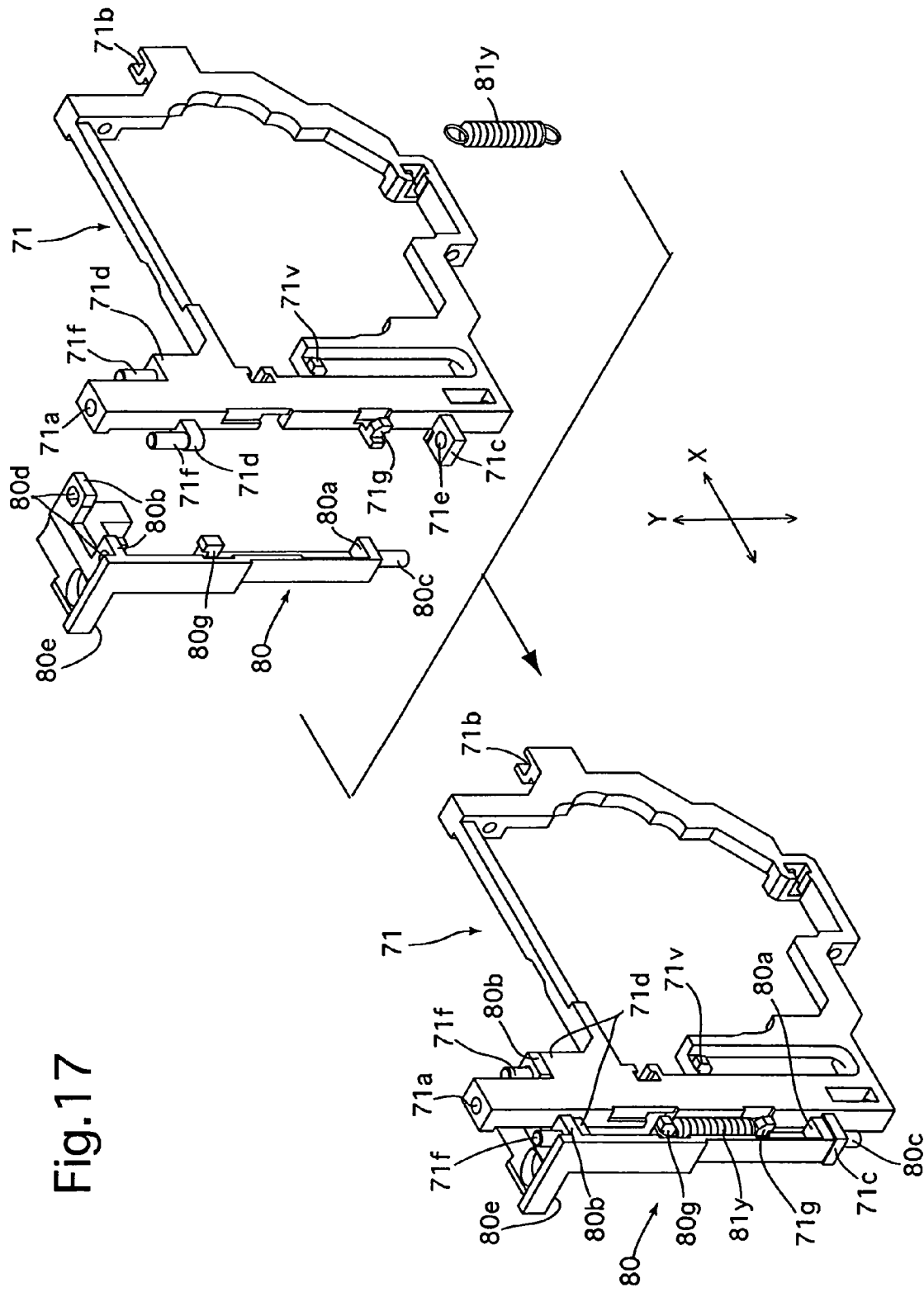
FIG. 17 is a rear perspective view of the Y-axis direction moving member, the Y-axis direction moving stage and the associated extension joining spring that are shown in FIG. 16, showing an exploded state and an assembled state thereof.

As shown in FIGS. 16 and 17, the image stabilizing unit IS is provided on one side of the Y-axis direction moving stage 71 with a Y-axis direction moving member 80 which is supported by the Y-axis direction moving stage 71. The Y-axis direction moving member 80 is elongated in the Y-axis direction and provided in the vicinity of upper and lower ends of the Y-axis direction moving member 80 with a movement limit lug 80a and a movement limit lug 80b, respectively. The Y-axis direction moving member 80 is provided at a lower end thereof with a guide pin 80c which extends downward from the movement limit lug 80a. The movement limit lug 80b is provided with a pair of guide holes 80d. The Y-axis direction moving member 80 is further provided in the vicinity of the pair of guide holes 80d with a nut contacting portion 80e and a linear groove 80f (see FIG. 16), and is further provided, on a vertically straight portion of the Y-axis direction moving member 80 between the movement limit lug 80a and the movement limit lug 80b, with a spring hook 80g (see FIG. 17). The linear groove 80f is elongated in the Y-axis direction.

The Y-axis direction moving stage 71 is provided with a movement limit lug 71c and a movement limit lug 71d which face the movement limit lug 80a and the movement limit lug 80b of the Y-axis direction moving member 80, respectively. The movement limit lug 71c is provided with a guide hole 71e in which the guide pin 80c is slidably engaged, while the movement limit lug 71d is provided with a pair of guide pins 71f which extend upward to be slidably engaged in the pair of guide holes 80d, respectively. The Y-axis direction moving stage 71 is provided on a vertically straight portion thereof between the movement limit lug 71c and a movement limit lug 71d, with a spring hook 71g.

The Y-axis direction moving stage 71 and the Y-axis direction moving member 80 are guided to be movable relative to each other in the Y-axis direction by the engagement of the guide hole 71e with the guide pin 80c and the engagement of the pair of guide pins 71f with the pair of guide holes 80d. The image stabilizing unit IS is provided with an extension joining spring 81y which is extended and installed between the spring hook 71g of the Y-axis direction moving stage 71 and the spring hook 80g of the Y-axis direction moving member 80. The extension joining spring 81y biases the Y-axis direction moving stage 71 and the Y-axis direction moving member 80 in opposite directions to bring the movement limit lug 80a the movement limit lug 71c into contact with each other and to bring the movement limit lug 80b the movement limit lug 71d into contact with each other, i.e., in opposite directions to move the Y-axis direction moving stage 71 and the Y-axis direction moving member 80 upward and downward, respectively.

Figure 14:
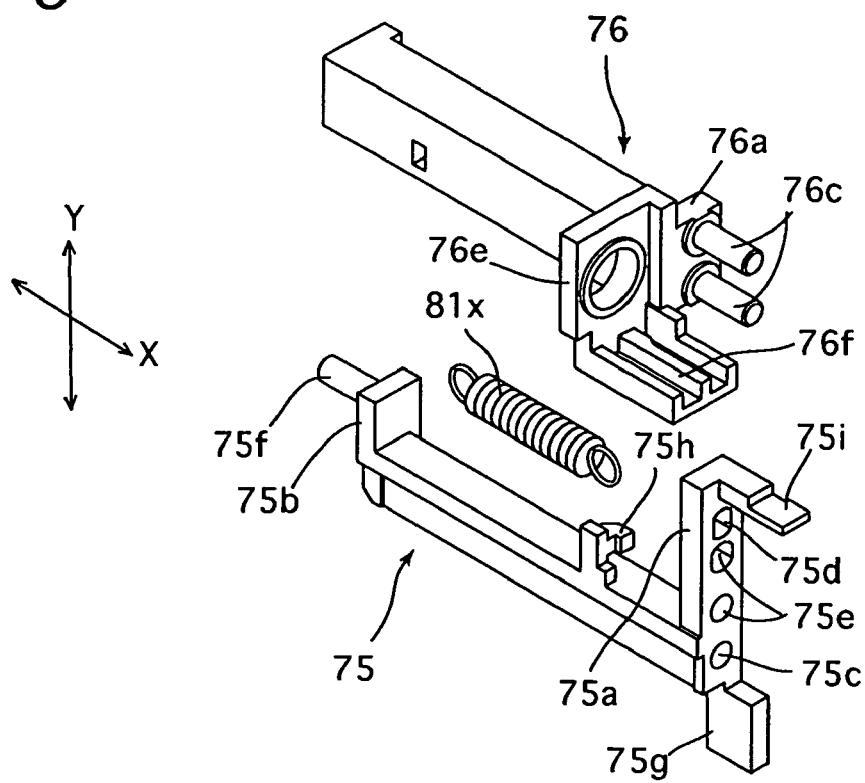
FIG. 14 is a front perspective view of a first X-axis direction moving member, a second X-axis direction moving member and an associated extension joining spring of the image stabilizing unit, showing an exploded state thereof.
Figure 15:
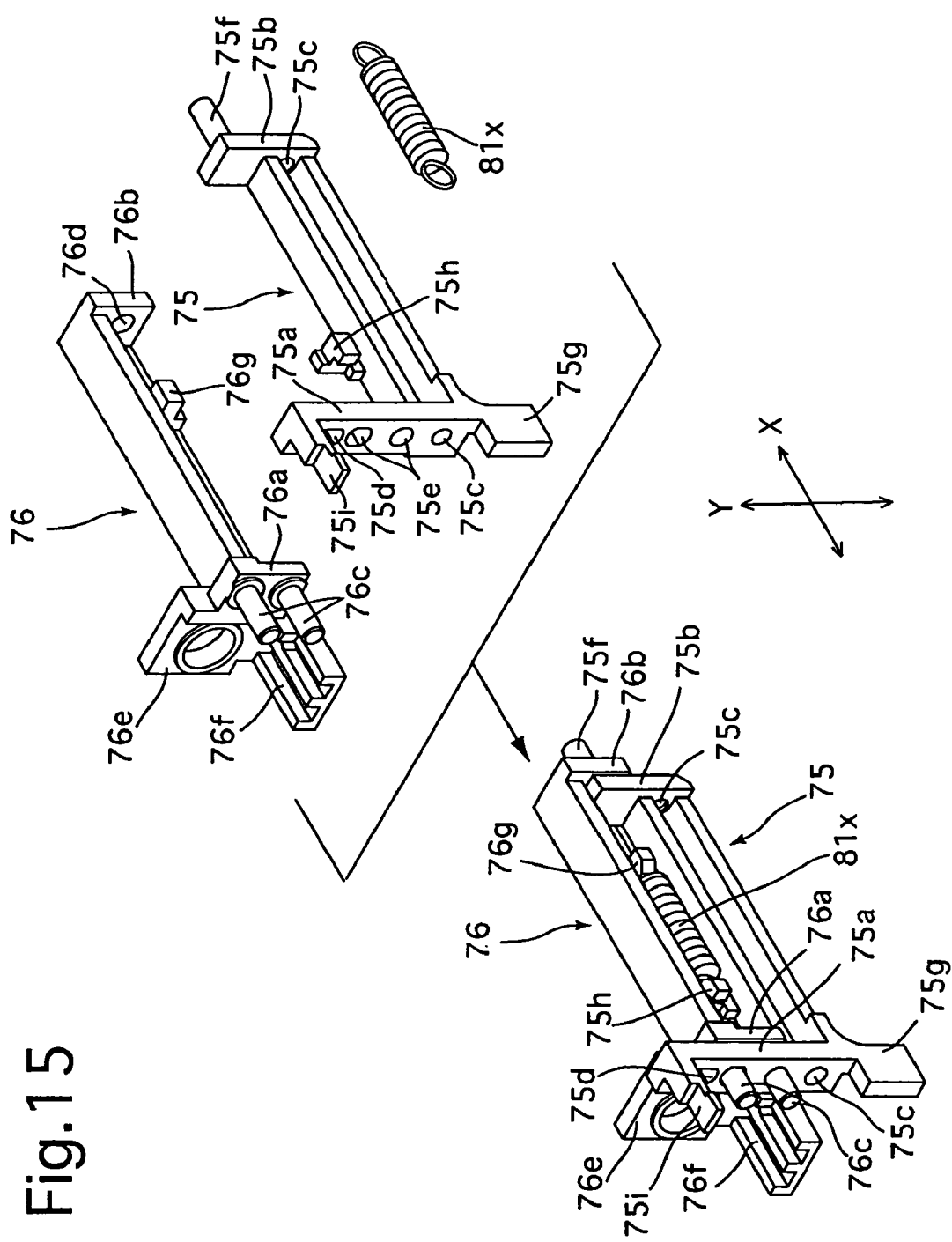
FIG. 15 is a rear perspective view of the first X-axis direction moving member, the second X-axis direction moving member and the associated extension joining spring that are shown in FIG. 14, showing an exploded state and an assembled state thereof.

Another pair of X-axis direction guide rods 77 and 78 that are different from the pair of X-axis direction guide rods 72 and 74 are fixed to the stationary holder 23 to extend in the X-axis direction. The image stabilizing unit IS is provided with a first X-axis direction moving member 75 which is supported by the stationary holder 23 via the pair of X-axis direction guide rods 77 and 78 to be freely slidable thereon. As shown in FIGS. 14 and 15, the first X-axis direction moving member 75 is elongated in the X-axis direction, and is provided, in the vicinity of opposite ends of the first X-axis direction moving member 75 in the X-axis direction, with a movement limit lug 75a and a movement limit lug 75b, respectively. A pair of guide holes 75c in which the X-axis direction guide rod 77 is inserted are formed on the movement limit lugs 75a and 75b, respectively, to be aligned in the X-axis direction. A guide hole 75d in which the X-axis direction guide rod 78 is inserted is formed on the movement limit lug 75a. No guide hole corresponding to the guide hole 75d is formed on the movement limit lug 75b. The movement limit lug 75a is provided between the associated guide hole 75c and the guide hole 75d with a pair of guide holes 75e. The movement limit lug 75b is provided, above the associated guide hole 75c in the Y-axis direction (see FIG. 15), with a guide pin 75f which extends in the X-axis direction in a direction away from the movement limit lug 75a. The first X-axis direction moving member 75 is further provided at the bottom of the movement limit lug 75a with a linkage projection 75g, and is further provided, on a horizontally straight portion of the first X-axis direction moving member 75 between the movement limit lug 75a and a movement limit lug 75b, with a spring hook 75h.

The image stabilizing unit IS is provided on the first X-axis direction moving member 75 with a second X-axis direction moving member 76. The second X-axis direction moving member 76 is provided with a movement limit lug 76a and a movement limit lug 76b which are separate from each other in the X-axis direction. The movement limit lug 76a is provided with a pair of guide pins 76c which extend in the X-axis direction to be slidably engaged in the pair of guide holes 75e of the first X-axis direction moving member 75, respectively, and the movement limit lug 76b is provided with a guide hole 76d in which the guide pin 75f of the first X-axis direction moving member 75 is slidably engaged. The second X-axis direction moving member 76 is further provided in the vicinity of the movement limit lug 76a with a nut contacting portion 76e and a linear groove 76f (see FIG. 15), and is further provided, on a horizontally straight portion of the second X-axis direction moving member 76 between the movement limit lug 76a and the movement limit lug 76b, with a spring hook 76g. The linear groove 76f is elongated in the Y-axis direction.

The first X-axis direction moving member 75 and the second X-axis direction moving member 76 are guided to be movable relative to each other in the X-axis direction by the engagement of the pair of guide pins 76c with the pair of guide holes 75e and the engagement of the guide pin 75f with the guide hole 76d. The image stabilizing unit IS is provided with an extension joining spring 81x which is extended and installed between the spring hook 75h of the first X-axis direction moving member 75 and the spring hook 76g of the second X-axis direction moving member 76. The extension joining spring 81x biases the first X-axis direction moving member 75 and the second X-axis direction moving member 76 in opposite directions to bring the movement limit lug 75a and the movement limit lug 76a into contact with each other and to bring the movement limit lug 75b and the movement limit lug 76b into contact with each other.

The linkage projection 75g of the first X-axis direction moving member 75 is in contact with a transfer roller 21c (see FIGS. 12, 13 and 24) mounted to the X-axis direction stage 21 so that a moving force in the X-axis direction is transferred from the first X-axis direction moving member 75 to the X-axis direction stage 21 via the contacting engagement between the linkage projection 75g and the transfer roller 21c. The transfer roller 21c is supported by a rotation pin parallel to the photographing optical axis Z1 so as to be freely rotatable on the rotation pin. When the X-axis direction stage 21 moves with the Y-axis direction moving stage 71 in the Y-axis direction, the transfer roller 21c rolls on a contacting surface of the linkage projection 75g. This contacting surface of the linkage projection 75g is a flat surface elongated in the Y-axis direction, and accordingly, allows the transfer roller 21c to roll on the contacting surface of the linkage projection 75g makes it possible for the X-axis direction stage 21 to move in the Y-axis direction without exerting any driving force in the Y-axis direction to the first X-axis direction moving member 75.

Figure 11:
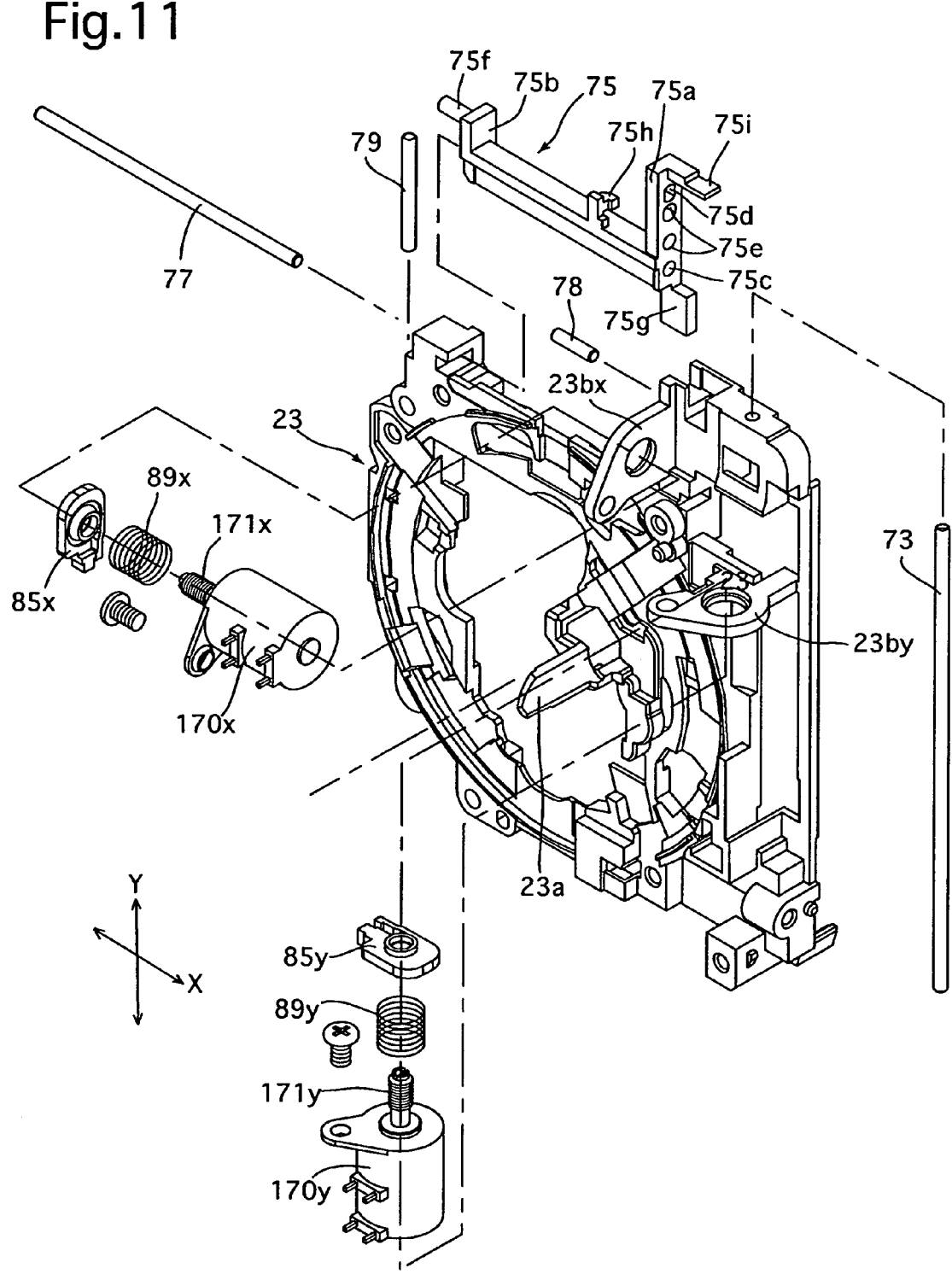
FIG. 11 is an exploded perspective view of a portion of the image stabilizing unit in the vicinity of a stationary holder thereof.
Figure 12:
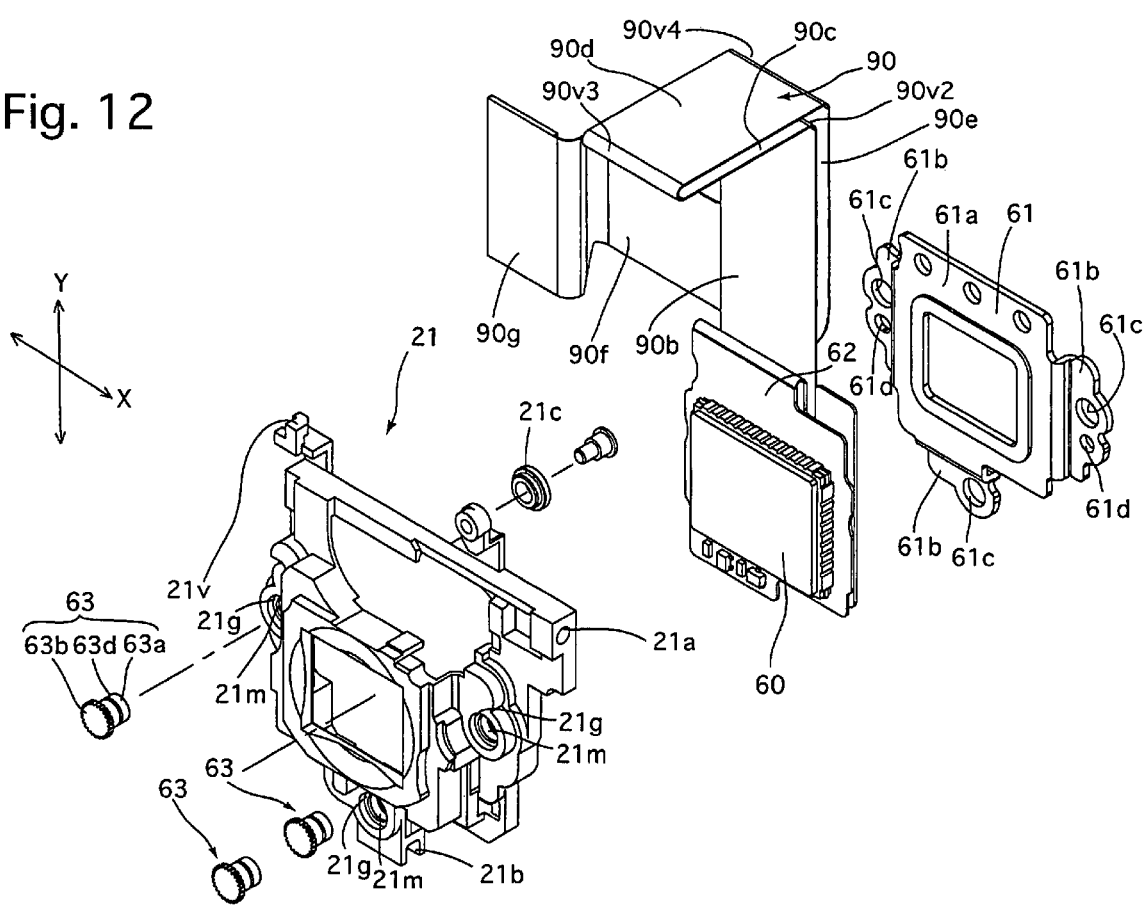
FIG. 12 is an exploded front perspective view of an X-axis direction moving stage, a CCD image sensor, a CCD retaining plate and associated elements shown in FIG. 10.
Figure 13:
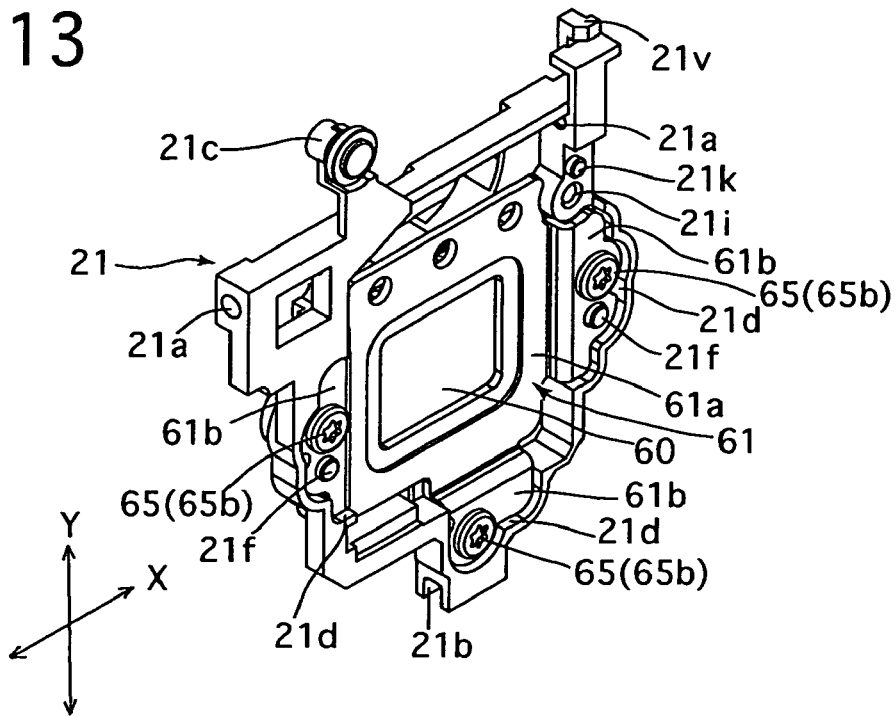
FIG. 13 is a rear perspective view of the X-axis direction moving stage shown in FIG. 12 from which the flexible printed wiring board and the movable plate that are shown in FIG. 10 are removed.

As shown in FIG. 11, the image stabilizing unit IS is provided with an X-axis drive motor 170x serving as a drive source for driving the CCD image sensor 60 in the X-axis direction and a Y-axis drive motor 170y serving as a drive source for driving the CCD image sensor 60 in the Y-axis direction. The X-axis drive motor 170x and the Y-axis drive motor 170y are fixed to a motor bracket 23bx and a motor bracket 23by, respectively, which are integrally formed on the stationary holder 23. Each of the X-axis drive motor 170x and the Y-axis drive motor 170y is a stepping motor. A drive shaft (rotary shaft) of the X-axis drive motor 170x is threaded to serve as a feed screw 171x, and a drive shaft (rotary shaft) of the Y-axis drive motor 170y is threaded to serve as a feed screw 171y. The feed screw 171x is screwed into a female screw hole of an X-axis direction driven nut member 85x and the feed screw 171y is screwed into a female screw hole of a Y-axis direction driven nut member 85y. The X-axis direction driven nut member 85x is guided linearly in the X-axis direction by the linear groove 76f, and is in contact with the nut contacting portion 76e. The Y-axis direction driven nut member 85y is guided linearly in the Y-axis direction by the linear groove 80f, and is in contact with the nut contacting portion 80e. The X-axis direction driven nut member 85x can be screw-disengaged from either end of the feed screw 171x, and the Y-axis direction driven nut member 85y can be screw-disengaged from either end of the feed screw 171y.

A nut-member biasing spring 89x is positioned between the X-axis direction driven nut member 85x and the X-axis drive motor 170x, and a nut-member biasing spring 89y is positioned between the Y-axis direction driven nut member 85x and the X-axis drive motor 170y. Each of the nut-member biasing springs 89x and 89y is a compression coil spring which is loosely fitted on the associated feed screw 171x and 171y, respectively, in a compressed state. The nut-member biasing spring 89x biases the X-axis direction driven nut member 85x in a direction to bring the X-axis direction driven nut member 85x back into screw engagement with the X-axis drive motor 170x in the case where the X-axis direction driven nut member 85x is disengaged from the X-axis drive motor 170x toward the X-axis drive motor 170x side. Likewise, the nut-member biasing spring 89y biases the Y-axis direction driven nut member 85y in a direction to bring the Y-axis direction driven nut member 85y back into screw engagement with the Y-axis drive motor 170y in the case where the Y-axis direction driven nut member 85y is disengaged from the Y-axis drive motor 170y toward the Y-axis drive motor 170y side.

Figure 24:
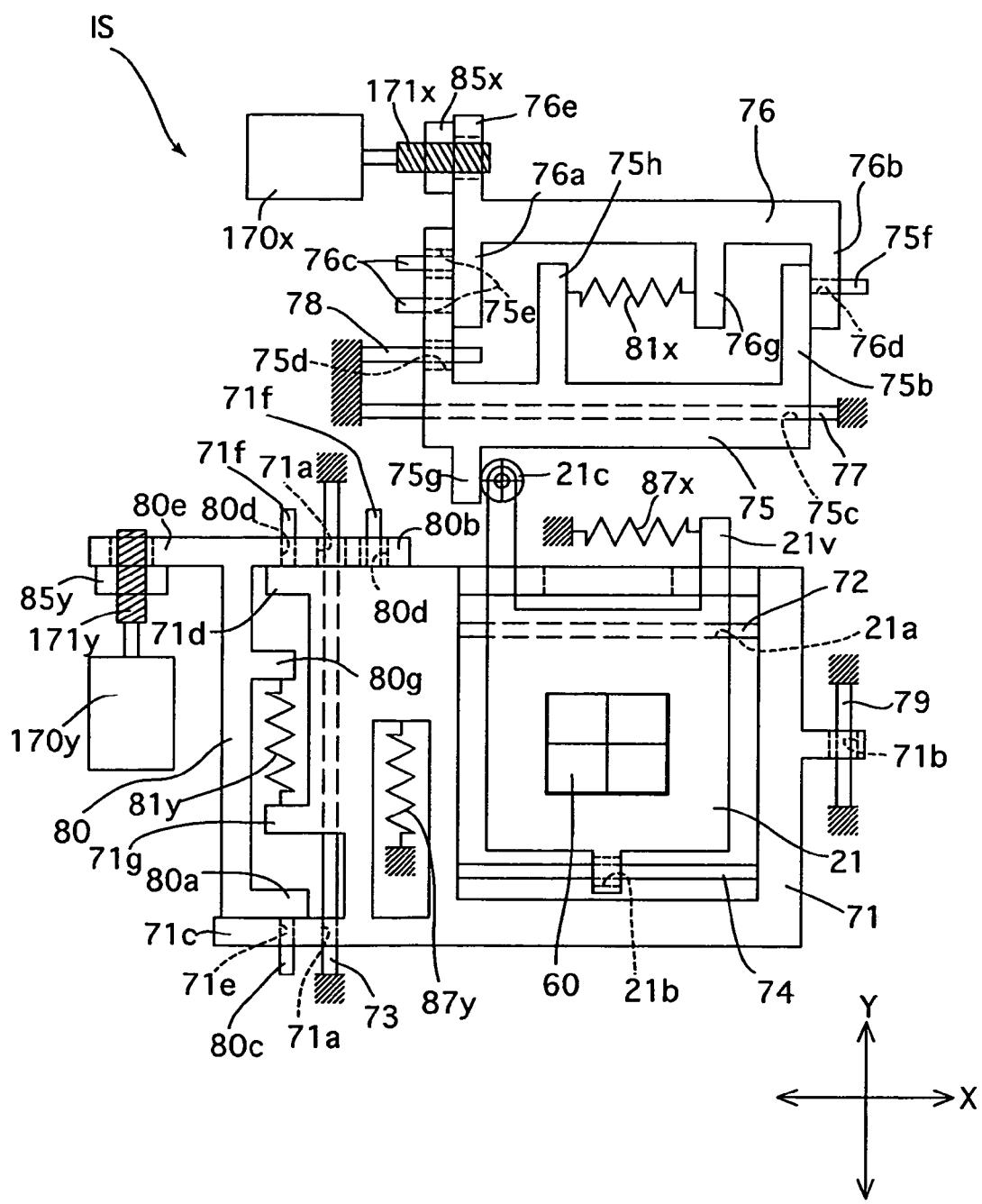
FIG. 24 is a diagrammatic illustration of the image stabilizing unit, showing the structure thereof.

FIG. 24 schematically shows the structure of the image stabilizing unit IS, viewed from the rear of the digital camera 200. Note that the relative position between the X-axis direction guide rod 78 and the pair of guide pins 76c, etc., are different from those shown in FIGS. 7 through 23 for the purpose of illustration. As can be understood from this schematic diagram, in the driving mechanism for driving the CCD image sensor 60 in the X-axis direction, the first X-axis direction moving member 75 and the second X-axis direction moving member 76 are coupled to each other resiliently by the biasing force of the extension joining spring 81x with the movement limit lug 75a and the movement limit lug 75b in contact with the movement limit lug 76a and the movement limit lug 76b, respectively. The biasing force of the X-axis direction stage biasing spring 87x is exerted on the first X-axis direction moving member 75 via the transfer roller 21c, which is in contact with the linkage projection 75g. Although the biasing force of the X-axis direction stage biasing spring 87x is exerted on the first X-axis direction moving member 75 leftward as viewed in FIG. 24, i.e., in a direction to disengage the movement limit lugs 75a and 75b from the movement limit lugs 76a and 76b, respectively, the biasing force (spring force) of the extension joining spring 81x is predetermined to be greater than that of the X-axis direction stage biasing spring 87x. Therefore, the first X-axis direction moving member 75 and the second X-axis direction moving member 76 are collectively biased leftward as viewed in FIG. 24 while maintaining the movement limit lugs 75a and 75b in resilient contact with the movement limit lugs 76a and 76b, respectively. Since the leftward movement of the second X-axis direction moving member 76 is limited by the engagement of the nut contacting portion 76e with the X-axis direction driven nut member 85x, the position of the X-axis direction driven nut member 85x serves as a reference position for each of the first X-axis direction moving member 75 and the second X-axis direction moving member 76 in the X-axis direction. As can be seen in FIG. 24, the end of the feed screw 171x extends through a through-hole (see FIGS. 14 and 15) formed on the nut contacting portion 76e so as not to interfere therewith.

Driving the X-axis drive motor 170x to rotate the drive shaft thereof (the feed screw 171x) causes the X-axis direction driven nut member 85x, that is screw-engaged with the feed screw 171x, to move linearly in the X-axis direction, thus causing the relative position between the first X-axis direction moving member 75 and the second X-axis direction moving member 76 in the X-axis direction to vary. For instance, if moved rightward with respect to the view shown in FIG. 24, the X-axis direction driven nut member 85x presses the nut contacting portion 76e in the same direction to thereby integrally move the first X-axis direction moving member 75 and the second X-axis direction moving member 76 rightward as viewed in FIG. 24 against the spring force of the X-axis direction stage biasing spring 87x. If the first X-axis direction moving member 75 is moved rightward with respect to the view shown in FIG. 24, the linkage projection 75g presses the transfer roller 21c in the same direction to thereby move the X-axis direction stage 21 rightward as viewed in FIG. 24. Conversely, if the X-axis direction driven nut member 85x is moved leftward as viewed in FIG. 24, the first X-axis direction moving member 75 and the second X-axis direction moving member 76 follow the X-axis direction driven nut member 85x to integrally move leftward as viewed in FIG. 24 by the biasing force of the X-axis direction stage biasing spring 87x. At this time, the X-axis direction stage 21 follows the first X-axis direction moving member 75 to move leftward as viewed in FIG. 24 by the biasing force of the X-axis direction stage biasing spring 87x. The linkage projection 75g and the transfer roller 21c are maintained in contact with each other at all times by the biasing force of the X-axis direction stage biasing spring 87x.

In the driving mechanism for driving the CCD image sensor 60 in the Y-axis direction, the Y-axis direction moving stage 71 and the Y-axis direction moving member 80 are resiliently coupled to each other via the extension joining spring 81y with the movement limit lugs 71c and 71d being in contact with the movement limit lugs 80a and 80b, respectively. Although the Y-axis direction moving stage 71 is biased downward as viewed in FIG. 24 by the spring force of the Y-axis direction stage biasing spring 87y, i.e., in a direction to disengage the movement limit lugs 71c and 71d from the movement limit lugs 80a and 80b, respectively, the biasing force (spring force) of the extension joining spring 81y is predetermined to be greater than that of the Y-axis direction stage biasing spring 87y. Therefore, the Y-axis direction moving stage 71 and the Y-axis direction moving member 80 are collectively biased downward while maintaining the movement limit lugs 71c and 71d in resilient contact with the movement limit lugs 80a and 80b, respectively. Since the downward movement of the Y-axis direction moving member 80 is limited by the engagement of the nut contacting portion 80e with the Y-axis direction driven nut member 85y, the position of the Y-axis direction driven nut member 85y serves as a reference position for each of the Y-axis direction moving stage 71 and the Y-axis direction moving member 80 in the Y-axis direction. As can be seen in FIG. 24, the end of the feed screw 171y extends through a through-hole (see FIGS. 16 and 17) formed on the nut contacting portion 80e so as not to interfere therewith.

Driving the Y-axis drive motor 170y to rotate the drive shaft thereof (the feed screw 171y) causes the Y-axis direction driven nut member 85y, that is screw-engaged with the feed screw 171y, to move linearly in the Y-axis direction, thus causing the relative position between the Y-axis direction moving stage 71 and the Y-axis direction moving member 80 in the Y-axis direction to vary. For instance, if the Y-axis direction driven nut member 85y is moved upward as viewed in FIG. 24, the Y-axis direction driven nut member 85y presses the nut contacting portion 80e in the same direction to thereby integrally move the Y-axis direction moving stage 71 and the Y-axis direction moving member 80 upward with respect to the view shown in FIG. 24 against the spring force of the Y-axis direction stage biasing spring 87y. Conversely, if the Y-axis direction driven nut member 85y is moved downward with respect to the view shown in FIG. 24, the Y-axis direction moving stage 71 and the Y-axis direction moving member 80 follow the Y-axis direction driven nut member 85y to integrally move downward by the biasing force of the Y-axis direction stage biasing spring 87y.

When the Y-axis direction moving stage 71 moves in the Y-axis direction, the X-axis direction stage 21 that is supported by the Y-axis direction moving stage 71 thereon moves together with the Y-axis direction moving stage 71. On the other hand, when the X-axis direction stage 21 moves together with the Y-axis direction moving stage 71 vertically in the Y-axis direction, the contacting point between the transfer roller 21c and the contacting surface of the linkage projection 75g varies because the first X-axis direction moving member 75, with which the transfer roller 21c is in contact, does not move in the Y-axis direction. At this time, the transfer roller 21c rolls on the contacting surface of the linkage projection 75g, so that the X-axis direction stage 21 can be moved in the Y-axis direction without exerting any driving force in the Y-axis direction to the first X-axis direction moving member 75.

According to the above described structure of the image stabilizing unit IS, the X-axis direction stage 21 can be moved forward and reverse in the X-axis direction by driving the X-axis drive motor 170x forward and reverse, respectively; and the Y-axis direction moving stage 71, together with the X-axis direction stage 21 that is supported by the Y-axis direction moving stage 71, can be moved forward and reverse in the Y-axis direction by driving the Y-axis drive motor 170y forward and reverse, respectively.

Figure 18:
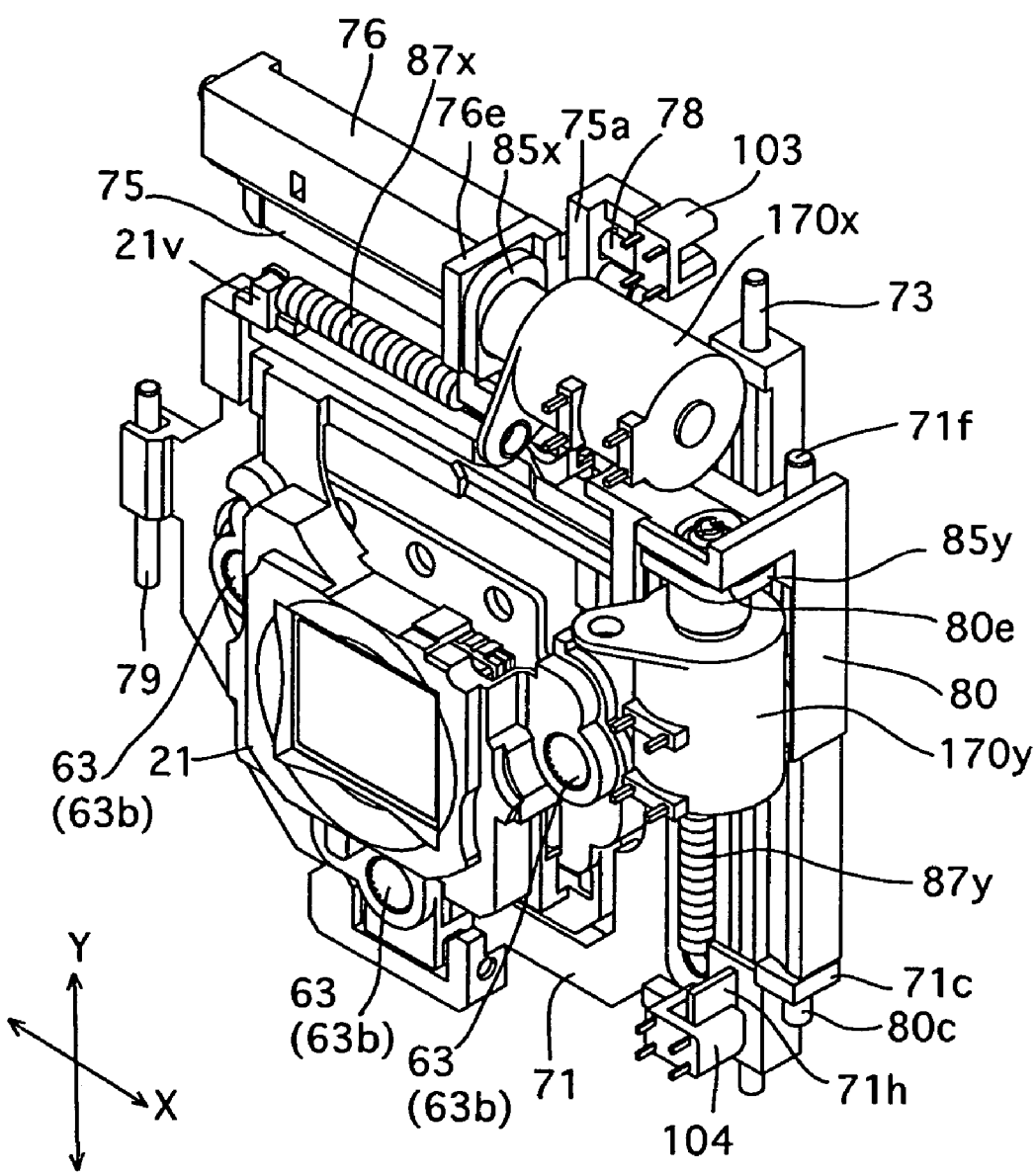
FIG. 18 is a front perspective view of the image stabilizing unit from which the stationary holder is removed.
Figure 19:
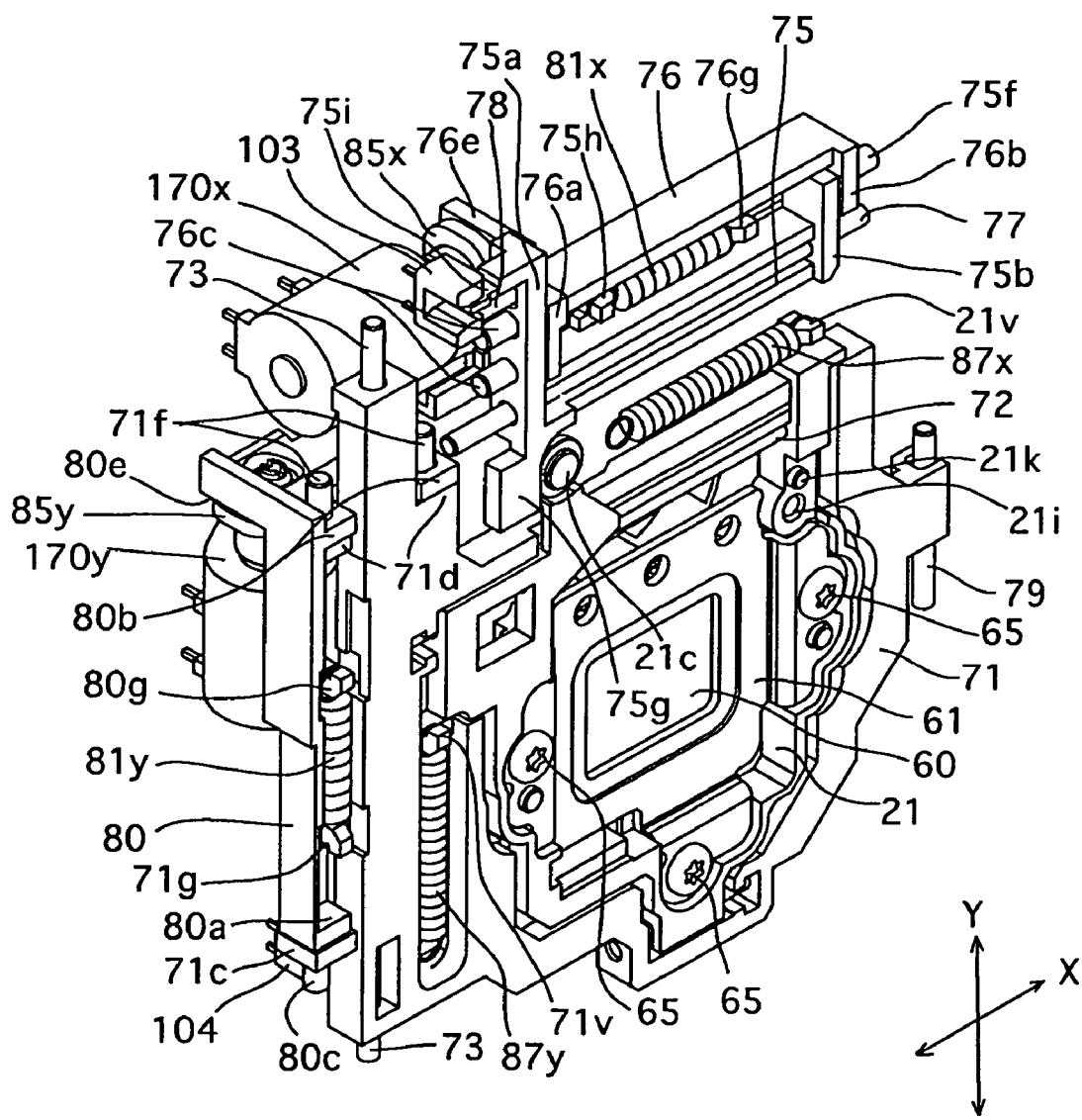
FIG. 19 is a rear perspective view of the elements of the image stabilizing unit shown in FIG. 18.
Figure 20:
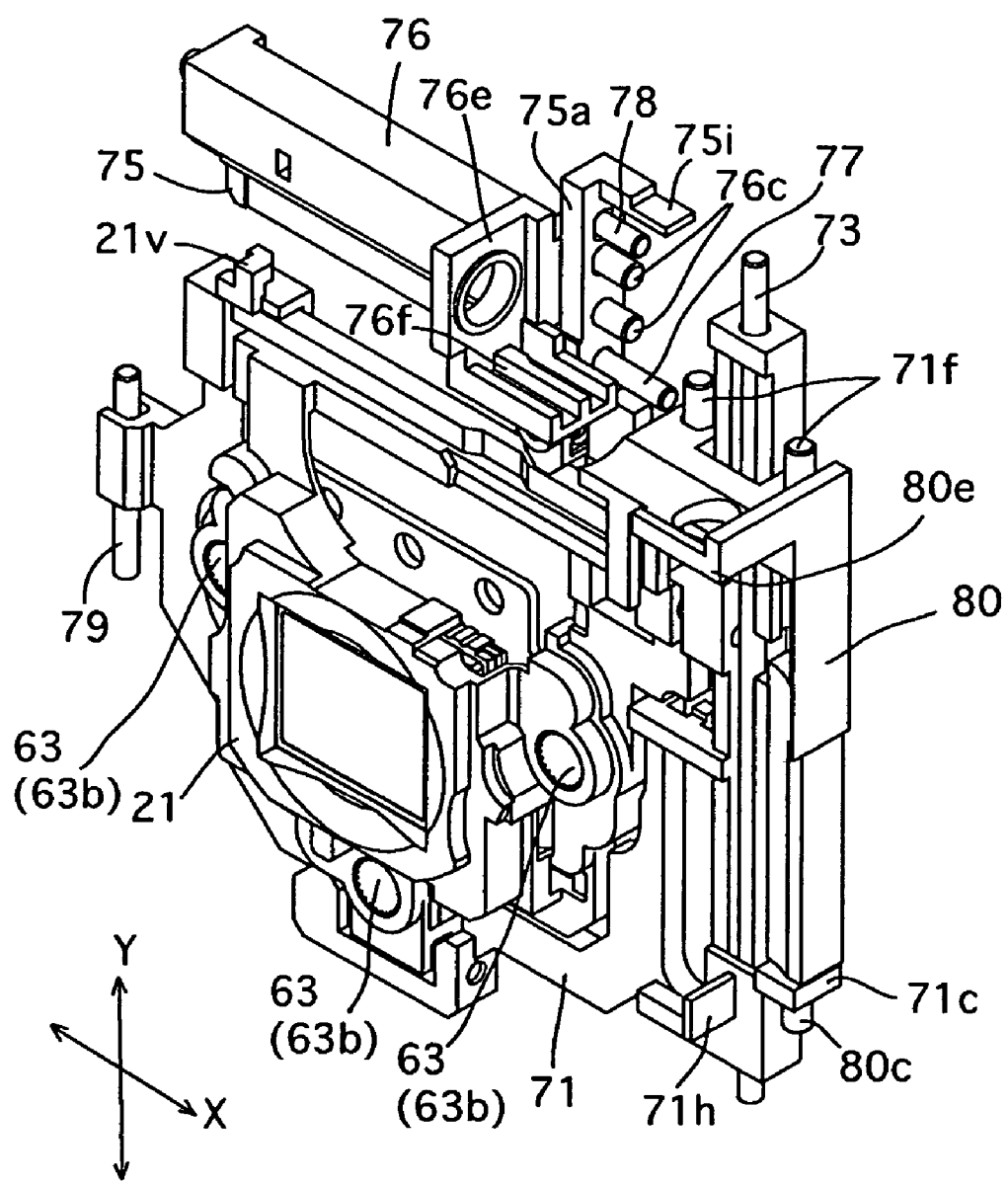
FIG. 20 is a front perspective view of the elements of the image stabilizing unit shown in FIGS. 18 and 19 from which drive motors, photo-interrupters and biasing springs are further removed.
Figure 21:
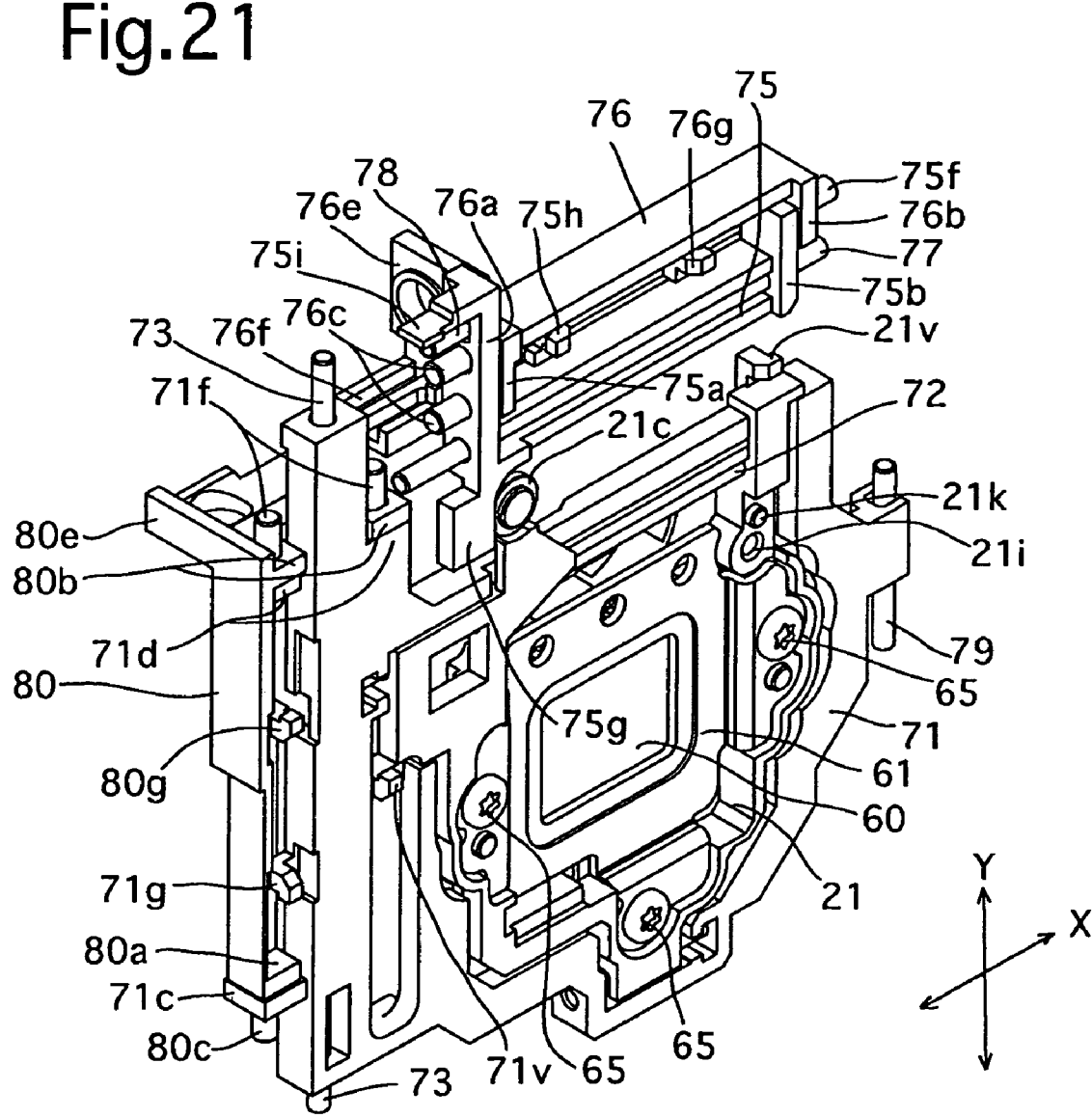
FIG. 21 is a rear perspective view of the elements of the image stabilizing unit shown in FIG. 20.
Figure 22:
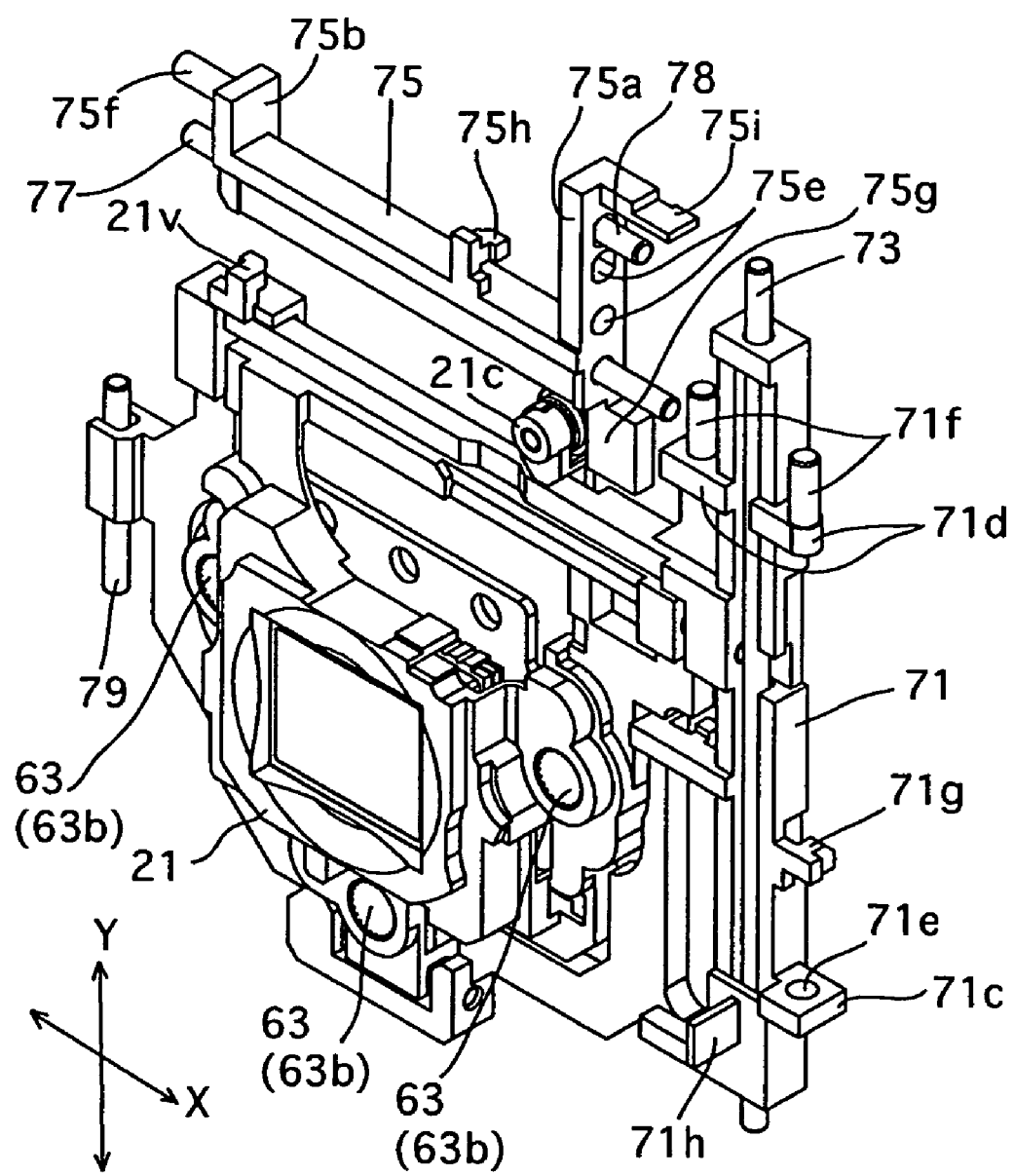
FIG. 22 is a front perspective view of the elements of the image stabilizing unit shown in FIGS. 20 and 21 from which the second X-axis direction moving member and the Y-axis direction moving member are further removed.
Figure 23:
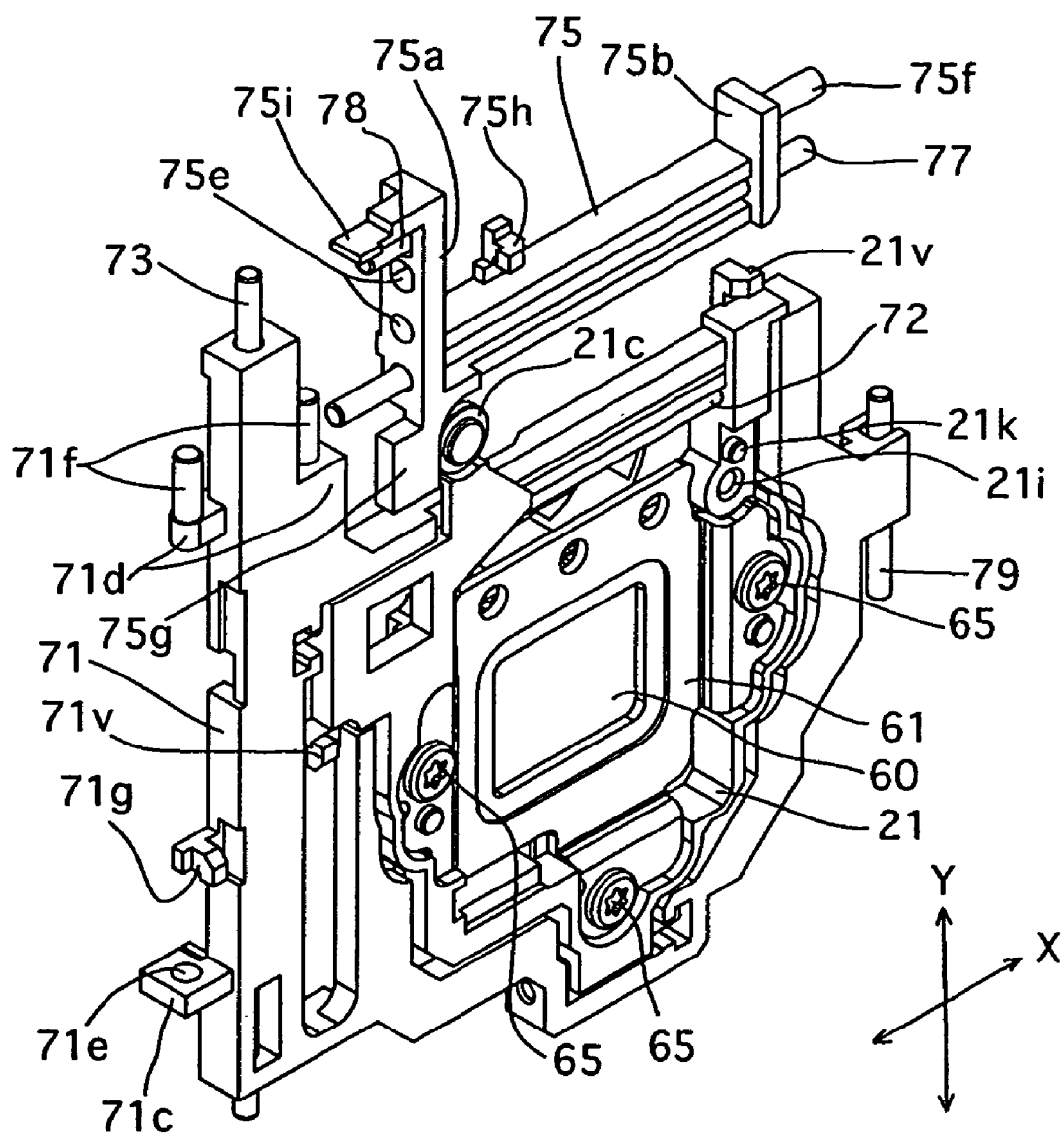
FIG. 23 is a rear perspective view of the elements of the image stabilizing unit shown in FIG. 22.

As shown in FIGS. 14 and 15, the first X-axis direction moving member 75 is provided in the vicinity of the movement limit lug 75a with a position detection lug 75i in the shape of a small thin plate. As shown in FIG. 16, the Y-axis direction moving stage 71 is provided in the vicinity of the movement limit lug 71c with a position detection lug 71h in the shape of a small thin plate. As shown in FIGS. 18 and 19, the image stabilizing unit IS is provided with a first photo-interrupter 103 and a second photo-interrupter 104. The first photo-interrupter 103 detects the presence of the position detection lug 75i of the first X-axis direction moving member 75 that passes between mutually facing emitter/receiver elements when the light beam is blocked by the position detection lug 75i. Likewise, the second photo-interrupter 104 detects the presence of the position detection lug 71h of the Y-axis direction moving stage 71 that passes between mutually facing emitter/receiver elements when the light beam is blocked by the position detection lug 71h. The initial position of the first X-axis direction moving member 75 (the X-axis direction stage 21) in the X-axis direction can be detected by detecting the presence of the position detection lug 75i by the first photo-interrupter 103, while the initial position of the Y-axis direction moving stage 71 in the Y-axis direction can be detected by detecting the presence of the position detection lug 71h by the second photo-interrupter 104.

As shown in the block diagram in FIG. 25, the digital camera 200 is provided with an X-axis direction gyro sensor (angular velocity sensor) 105 and a Y-axis direction gyro sensor (angular velocity sensor) 106 which detect the angular velocity (angular speed) about two axes (the X-axis and the Y-axis) orthogonal to each other. The magnitude and the direction of camera shake (vibrations) applied to the digital camera 200 are detected by these two gyro sensors 105 and 106. Subsequently, the control circuit 102 determines a moving angle by time-integrating the angular velocity of the camera shake in the two axial directions, detected by the two gyro sensors 105 and 106. Subsequently, the control circuit 102 calculates from the moving angle the moving amounts of the image on a focal plane (imaging surface of the CCD image sensor 60) in the X-axis direction and in the Y-axis direction. The control circuit 102 further calculates the driving amounts and the driving directions of the X-axis direction stage 21 (the first X-axis direction moving member 75 and the second X-axis direction moving member 76) and the Y-axis direction moving stage 71 (the Y-axis direction moving member 80) for the respective axial directions (driving pulses for the X-axis drive motor 170x and the Y-axis drive motor 170y) in order to counteract camera shake. Thereupon, the X-axis drive motor 170x and the Y-axis drive motor 170y are actuated and the operations thereof are controlled in accordance with the calculated values, which counteract image shake of an object image captured by the CCD image sensor 60. The digital camera 200 can be put into this image stabilization mode by turning on a photographing mode select switch 107 (see FIG. 25). If the photographing mode select switch 107 is in an off-state, the image stabilizing capability is deactivated so that a normal photographing operation is performed.

Additionally, by operating the photographing mode select switch 107, either a first tracking mode or a second tracking mode can be selected in the image stabilization mode. The image stabilizing capability remains activated by driving the X-axis drive motor 170x and the Y-axis drive motor 170y in the first tracking mode, while the image stabilizing capability is activated by driving the X-axis drive motor 170x and the Y-axis drive motor 170y only when a photometric switch 108 or a release switch 109 (see FIG. 25) provided in the digital camera 200 is turned ON in the second tracking mode. The photometric switch 108 is turned ON by depressing the shutter button 205 half way, and the release switch 109 is turned ON by fully depressing the shutter button 205.

The above illustrated image stabilizer of the digital camera 200 is provided with a damage-protection structure which absorbs loads and impacts on a driving force transfer mechanism from each of the X-axis drive motor 170x and the Y-axis drive motor 170y to the CCD image sensor 60 (the X-axis direction stage 21) to prevent damage to the feed screws 171x and 171y and other associated elements. This damage-protection structure is composed of two major components: a first component composed of the first X-axis direction moving member 75 and the second X-axis direction moving member 76 (which are resiliently coupled to each other by the extension joining spring 81x) in the driving mechanism for driving the CCD image sensor 60 in the X-axis direction and a second part composed of the Y-axis direction stage 71 and the Y-axis direction moving member 80 (which are resiliently coupled to each other by the extension joining spring 81y) in the driving mechanism for driving the CCD image sensor 60 in the Y-axis direction.

The driving mechanism for driving the CCD image sensor 60 in the X-axis direction has the capability of protecting itself from damage. This capability will be discussed hereinafter.

For instance, when the X-axis direction driven nut member 85x is moved rightward with respect to the view shown in FIG. 24 by the X-axis drive motor 170x, the first X-axis direction moving member 75 and the second X-axis direction moving member 76, which move integrally in a normal state, move relative to each other in the X-axis direction so as to disengage the movement limit lug 75a and the movement limit lug 76a (and also the movement limit lug 75b and the movement limit lug 76b) from each other against the biasing force of the extension joining spring 81x in the event of the X-axis direction stage 21 abutting against the Y-axis direction stage 71 upon reaching a mechanical limit of movement of the X-axis direction stage 21 or other causes which interfere with movement of the X-axis direction stage 21. Specifically, the second X-axis direction moving member 76 can solely move rightward in the X-axis direction relative to the first X-axis direction moving member 75 in the case where movement of the first X-axis direction moving member 75, together with the X-axis direction stage 21, is prevented for some reason. This structure makes it possible for the X-axis direction driven nut member 85x to move along the feed screw 171x even if the X-axis direction stage 21 becomes immobilized. This prevents excessive loads on the aforementioned driving force transfer mechanism, thus preventing thread jamming between the feed screw 71x and the X-axis direction driven nut member 85x and further preventing damage to other associated parts of the driving force transfer mechanism. When the X-axis direction driven nut member 85x is moved leftward with respect to the view shown in FIG. 24 by the X-axis drive motor 170x, the X-axis direction driven nut member 85x moves in a direction away from the nut contacting portion 76e, and accordingly, the driving force of the X-axis drive motor 170x does not act on either the first X-axis direction moving member 75 or the second X-axis direction moving member 76; hence, no undue loads are exerted on the driving force transfer mechanism even if movement of the X-axis direction stage 21 is prevented for some reason.

Similar to the driving mechanism for driving the CCD image sensor 60 in the X-axis direction, the driving mechanism for driving the CCD image sensor 60 in the Y-axis direction also has the capability of protecting itself from damage. This capability will be discussed hereinafter.

For instance, when the Y-axis direction driven nut member 85y is moved upward with respect to the view shown in FIG. 24 by the Y-axis drive motor 170y, the Y-axis direction moving member 80 and the Y-axis direction moving stage 71, which move integrally in a normal state, move relative to each other in the Y-axis direction to disengage the movement limit lug 71c and the movement limit lug 80a (and also the movement limit lug 71d and the movement limit lug 80b) away from each other against the biasing force of the extension joining spring 81y in the event of the Y-axis direction stage 71 abutting against the stationary holder 23 upon reaching a mechanical limit of movement of the Y-axis direction stage 71 or other causes which interfere with movement of the Y-axis direction stage 71 (or the X-axis direction stage 21). Specifically, the Y-axis direction moving member 80 can solely move upward in the Y-axis direction relative to the Y-axis direction moving stage 71 in the case where movement of the Y-axis direction stage 71 is prevented for some reason. This structure makes it possible for the Y-axis direction driven nut member 85$y$ to move along the feed screw 171$y$ even if the Y-axis direction stage 71 becomes immobilized. This prevents excessive loads on the aforementioned driving force transfer mechanism, thus preventing thread jamming between the feed screw 171$y$ and the Y-axis direction driven nut member 85$y$ and further preventing damage to other associated parts of the driving force transfer mechanism. When the Y-axis direction driven nut member 85$y$ is moved downward with respect to the view shown in FIG. 24 by the Y-axis drive motor 170$y$, the Y-axis direction driven nut member 85$y$ moves in a direction away from the nut contacting portion 80$e$, and accordingly, the driving force of the Y-axis drive motor 170$y$ does not act on either the Y-axis direction moving member 80 or the Y-axis direction moving stage 71; hence, no undue loads are exerted on the driving force transfer mechanism even if movement of the Y-axis direction stage 71 is prevented for some reason.

As mentioned above, the range of movement of the X-axis direction stage 21 is defined by inner peripheral surfaces of the Y-axis direction moving stage 71, while the range of movement of the Y-axis direction moving stage 71 is defined by inner peripheral surfaces of the stationary holder 23. Namely, the mechanical limits of movement of the X-axis direction stage 21 in the X-axis direction are defined by inner peripheral surfaces of the Y-axis direction moving stage 71, while the mechanical limits of movement of the Y-axis direction stage 71 in the Y-axis direction are defined by inner peripheral surfaces of the stationary holder 23. It is desirable that the driving force of the X-axis drive motor 170$x$ be stopped being transferred from the feed screw 171$x$ to the X-axis direction driven nut member 85$x$ upon the X-axis direction stage 21 reaching either of the right and left limits of movement thereof, and that the driving force of the Y-axis drive motor 170$y$ be stopped being transferred from the feed screw 171$y$ to the Y-axis direction driven nut member 85$y$ upon the Y-axis direction stage 71 reaching either of the upper and lower limits of movement thereof. However, taking manufacturing tolerances of the associated components into consideration, such an ideal correlation cannot be always achieved. For instance, if the X-axis direction driven nut member 85$x$ and the feed screw 171$x$ (or the Y-axis direction driven nut member 85$y$ and the feed screw 171$y$) are still screw-engaged with each other by a sufficient axial length in a state where the X-axis direction stage 21 (or the Y-axis direction stage 71) has reached a mechanical limit of movement thereof, there will be a possibility of jamming occurring between the feed screw 171$x$ and the X-axis direction driven nut member 85$x$ (or the feed screw 171$y$ and the Y-axis direction driven nut member 85$y$) due to loads placed on each of the X-axis direction driven nut member 85$x$ and the feed screw 171$x$ (or the Y-axis direction driven nut member 85$y$ and the feed screw 171$y$) by a further rotation of the X-axis drive motor 170$x$ (or the Y-axis drive motor 170$y$) if the image stabilizer of the digital camera 200 incorporates no damage-protection structure such as the above described damage-protection structure.

To prevent this problem from occurring, the image stabilizing mechanism can be considered to be constructed so that the X-axis direction driven nut member 85$x$ (the Y-axis direction driven nut member 85$y$) is disengaged from the feed screw 171$x$ (171$y$) to come off upon reaching either end of the feed screw 171$x$ (171$y$) after giving the X-axis direction driven nut member 85$x$ (the Y-axis direction driven nut member 85$y$) a sufficient range of movement on the feed screw 171$x$ (171$y$) so that the X-axis direction stage 21 (the Y-axis direction stage 71) may not reach a mechanical limit of movement thereof easily. However, according to this structure, the range of movement of each of the X-axis direction stage 21 and the Y-axis direction stage 71 is required to be increased more than necessary, which may undesirably increase the size of the whole image stabilizer. Additionally, if the X-axis direction stage 21 or the Y-axis direction stage 71 is jammed accidentally at some middle point in the range of movement thereof (i.e., not at either end of the range of movement thereof), heavy loads are put on the screw-engaged portion between the X-axis direction driven nut member 85$x$ (or the Y-axis direction driven nut member 85$y$) and the feed screw 171$x$ (or 171$y$), regardless of the range of movement of the X-axis direction stage 21 or the Y-axis direction stage 71.

Conversely, according to the above illustrated embodiment of the image stabilizer, a difference in amount of movement in the X-axis direction between the X-axis direction driven nut member 85$x$ and the X-axis direction stage 21 is absorbed by intermediate members (i.e., the first X-axis direction moving member 75 and the second X-axis direction moving member 76), while a difference in amount of movement in the Y-axis direction between the Y-axis direction driven nut member 85$y$ and the X-axis direction stage 21 is absorbed by intermediate members (i.e., the Y-axis direction stage 71 and the Y-axis direction moving member 80), and therefore, the range of movement of each of the X-axis direction stage 21 and the Y-axis direction stage 71 does not need to be increased more than necessary. Moreover, even if the X-axis direction stage 21 or the Y-axis direction stage 71 is jammed accidentally at some middle point in the range of movement thereof (i.e., not at either end of the range of movement thereof), no heavy loads are put on the screw-engaged portion between the X-axis direction driven nut member 85$x$ (or the Y-axis direction driven nut member 85$y$) and the feed screw 171$x$ (or 171$y$) because a difference in amount of movement in the X-axis direction between the X-axis direction driven nut member 85$x$ and the X-axis direction stage 21 (or a difference in amount of movement in the Y-axis direction between the X-axis direction driven nut member 85$y$ and the Y-axis direction stage 21) is absorbed by the aforementioned intermediate members (the first X-axis direction moving member 75 and the second X-axis direction moving member 76, or the Y-axis direction stage 71 and the Y-axis direction moving member 80).

In the present embodiment of the image stabilizer, the maximum amount of relative movement between the first X-axis direction moving member 75 and the second X-axis direction moving member 76 is predetermined to be capable of absorbing any difference in amount of movement between the X-axis direction driven nut member 85$x$ and the X-axis direction stage 21 wherever each of the X-axis direction driven nut member 85$x$ and the X-axis direction stage 21 may be positioned in the range of movement thereof. Likewise, the maximum amount of relative movement between the Y-axis direction stage 71 and the Y-axis direction moving member 80 is predetermined to be capable of absorbing any difference in amount of movement between the Y-axis direction driven nut member 85$y$ and the Y-axis direction stage 71 wherever each of the Y-axis direction driven nut member 85$y$ and the Y-axis direction stage 71 may be positioned in the range of movement thereof.

A restriction on movement on the X-axis direction stage 21 or the Y-axis direction stage 71 is not the only cause of imposing loads on the driving force transfer mechanism. Since the CCD image sensor 60, that serves as an optical element for counteracting image shake, is supported to be freely movable in the X-axis direction and the Y-axis direction, there is a possibility of the X-axis direction stage 21 (which holds the CCD image sensor 60) or the Y-axis direction stage 71 (which holds the X-axis direction stage 21) being subjected to a force which forces the X-axis direction stage 21 or the Y-axis direction stage 71 to move even though no driving force is applied thereto by the X-axis drive motor 170x or the Y-axis drive motor 170y, respectively, in the case where a shock or sudden impact is applied to the digital camera 200 when the digital camera 200 is, e.g., dropped to the ground. Even in such a case, such loads, shock or sudden impact can be securely absorbed in the present embodiment of the image stabilizer.

For instance, if the X-axis direction stage 21 is moved leftward with respect to the view shown in FIG. 24 by an external force other than the driving force of the X-axis drive motor 170x, the first X-axis direction moving member 75 is pressed in the same direction via the transfer roller 21c. Since this direction of pressing the first X-axis direction moving member 75 is a direction which disengages the movement limit lugs 75a and 75b from the movement limit lugs 76a and 76b, respectively, the first X-axis direction moving member 75 can solely move leftward relative to the second X-axis direction moving member 76 against the biasing force of the extension joining spring 81x. At this time, the first X-axis direction moving member 75 does not mechanically press the second X-axis direction moving member 76, so that only a resilient tensile force of the extension joining spring 81x acts on the second X-axis direction moving member 76, and accordingly, no excessive force is applied to the X-axis direction driven nut member 85x from the second X-axis direction moving member 76. If the X-axis direction stage 21 is moved rightward with respect to the view shown in FIG. 24 by an external force other than the driving force of the X-axis drive motor 170x, the X-axis direction stage 21 moves in a direction to disengage the transfer roller 21c from the linkage projection 75g, either the first X-axis direction moving member 75 or the second X-axis direction moving member 76 is subjected to the moving force of the X-axis direction stage 21. Namely, even if the X-axis direction stage 21 is forced to move forward or reverse in the X-axis direction by an external force or the like when the X-axis drive motor 170x is not in operation, no undue loads are exerted on the screw-engaged portion between the X-axis direction driven nut member 85x and the feed screw 171x.

On the other hand, if the Y-axis direction stage 71 is moved downward with respect to the view shown in FIG. 24 by an external force other than the driving force of the Y-axis drive motor 170y, this moving direction of the Y-axis direction stage 71 is a direction which disengages the movement limit lugs 80a and 80b from the movement limit lugs 71c and 71d, respectively, and accordingly, the Y-axis direction stage 71 can solely move downward relative to the Y-axis direction moving member 80 against the biasing force of the extension joining spring 81y. At this time, the Y-axis direction stage 71 does not mechanically press the Y-axis direction moving member 80, so that only a resilient tensile force of the extension joining spring 81y acts on the Y-axis direction moving member 80, and accordingly, no excessive force is applied to the Y-axis direction driven nut member 85y from the Y-axis direction moving member 80. If the X-axis direction stage 21 is moved upward with respect to the view shown in FIG. 24 by an external force other than the driving force of the X-axis drive motor 170x, the Y-axis direction moving member 80 is pressed upward via the engagement between the movement limit lug 80a and the movement limit lug 71c and the engagement between the movement limit lug 80b and the movement limit lug 71d. At this time, the moving force of the Y-axis direction moving member 80 does not act on the Y-axis direction driven nut member 85y because this direction of movement of the Y-axis direction moving member 80 is a direction to disengage the nut contacting portion 80e from the Y-axis direction driven nut member 85y. Namely, even if the Y-axis direction stage 71 is forced to move forward or reverse in the Y-axis direction by an external force or the like when the Y-axis drive motor 170y is not in operation, no undue loads are exerted on the screw-engaged portion between the X-axis direction driven nut member 85y and the feed screw 171y.

As can be understood from the above description, according to the above illustrated embodiment of the image stabilizer, in either of the following two cases, i.e., the case where a malfunction occurs in the moving operation of the X-axis direction stage 21 and/or the Y-axis direction stage 71 when it is driven by the X-axis drive motor 170x or the Y-axis drive motor 170y; and the case where the X-axis direction stage 21 and/or the Y-axis direction stage 71 is forced to move unexpectedly by an external force or the like, such an accidental movement can be absorbed to thereby prevent the driving mechanism for the image-stabilizing optical element from being damaged. Specifically, the image stabilizer is designed so that no heavy loads are put on either of the two screw-engaged portions between the X-axis direction driven nut member 85x and the feed screw 171x and between the Y-axis direction driven nut member 85y and the feed screw 171y, which produces a high degree of effectiveness of preventing each of these two screw-engaged portions from being damaged. Although it is possible to drive the X-axis direction stage 21 and the Y-axis direction stage 71 with a high degree of precision by narrowing the lead angles of the feed screws 171x and 171y, respectively, a narrowing of the lead angle of either feed screw disadvantageously reduces the strength of the feed screw mechanism. However, according to the above illustrated embodiment of the image stabilizer, the lead angle of each feed screw can be narrowed since no heavy loads are applied on either of the aforementioned two screw-engaged portions.

Figure 26:
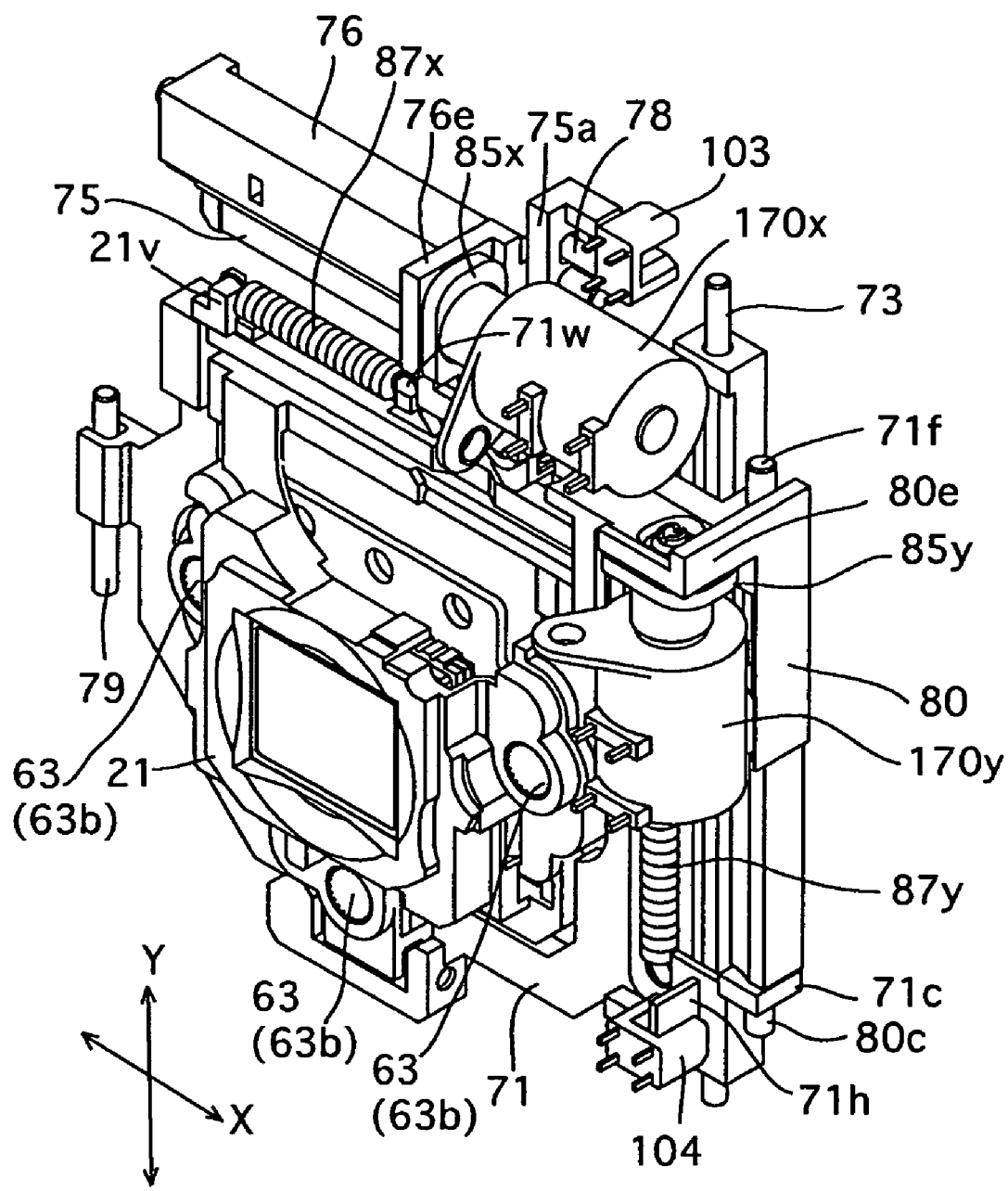
FIG. 26 is a view similar to that of FIG. 18, showing another embodiment (second embodiment) of the image stabilizing unit from which the stationary holder is removed.
Figure 27:
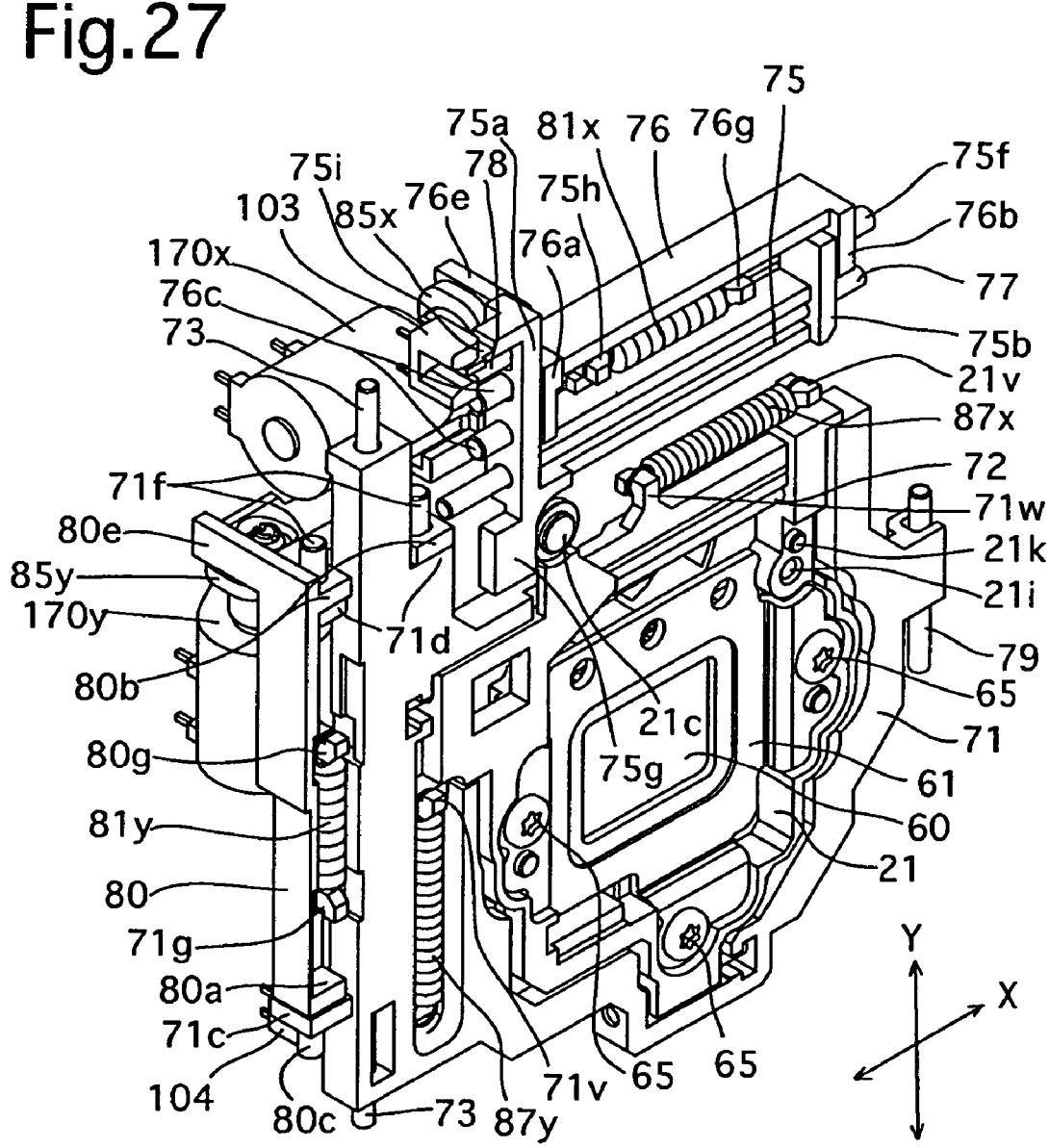
FIG. 27 is a rear perspective view of the elements of the image stabilizing unit shown in FIG. 26.
Figure 28:
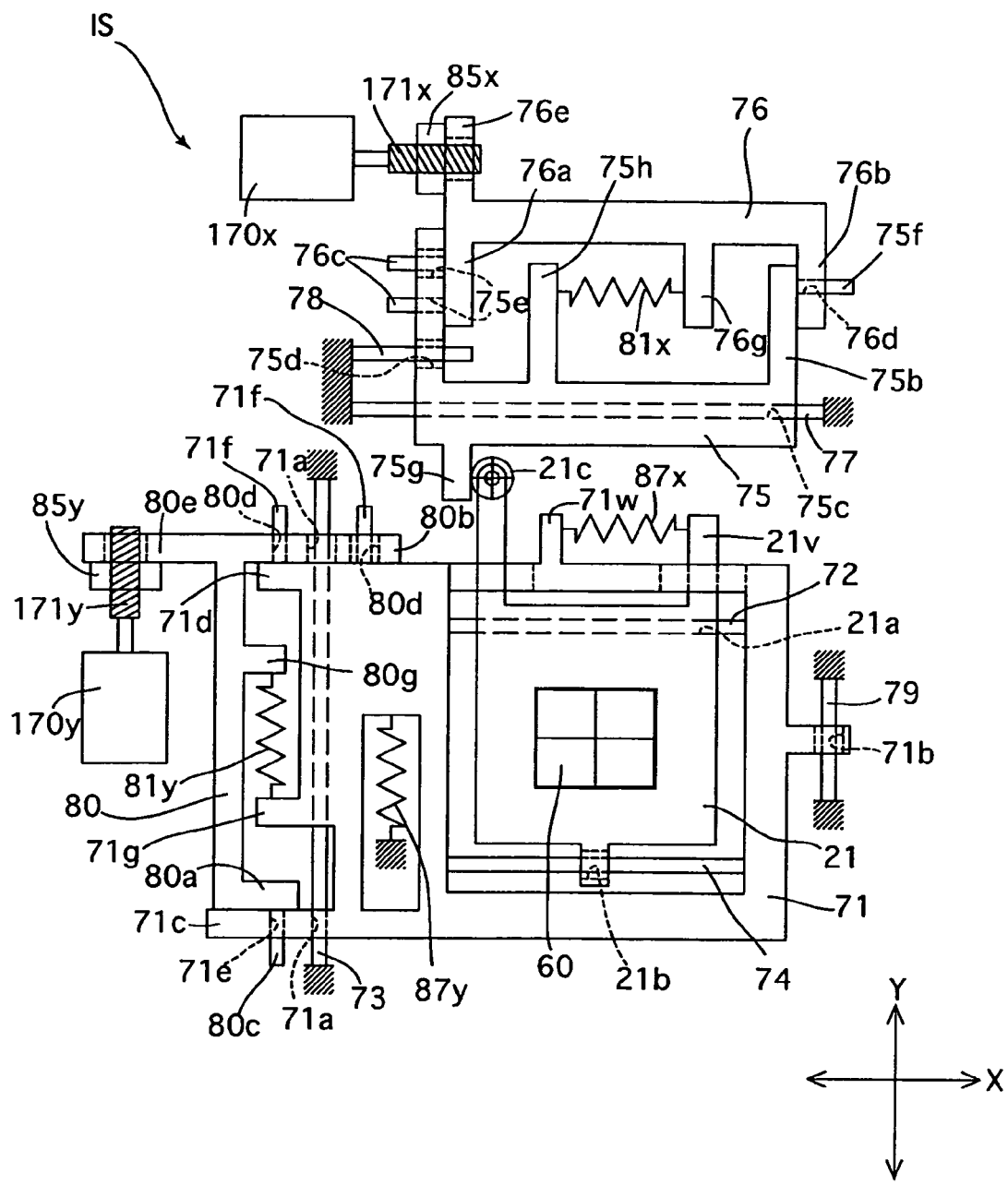
FIG. 28 is a diagrammatic illustration of the second embodiment of the image stabilizing unit, showing the structure thereof.

FIGS. 26 through 28 show another embodiment (second embodiment) of the image stabilizing unit IS. In this embodiment, the elements corresponding to those in the previous embodiment (first embodiment) of the image stabilizer IS are designated with like reference numerals. The second embodiment of the image stabilizing unit is the same as the first embodiment of the image stabilizing unit except that one end (left end as viewed in FIG. 28) of the X-axis direction stage biasing spring 87x is hooked on the Y-axis direction stage 71, not on the stationary holder 23. More specifically, the X-axis direction stage biasing spring 87x is extended and installed between a spring hook 71w formed on the Y-axis direction stage 71 and the spring hook 21v of the X-axis direction stage 21. The same effect as that of the first embodiment of the image stabilizing unit can be obtained in the second embodiment of the image stabilizing unit.

In the above illustrated embodiments, the CCD image sensor 60, the low-pass filter 25 and other associated elements are unitized and this unit (CCD unit) is driven when image shake is counteracted. The structure of this CCD unit will be discussed in detail with reference to FIGS. 29 through 41.

As shown in FIGS. 29 through 34, the low-pass filter 25 and the CCD image sensor 60 are held between the X-axis direction moving stage 21 and a CCD retaining plate 61. More specifically, the low-pass filter 25 is in contact with an inner surface of the X-axis direction moving stage 21 at the front opening thereof and the imaging surface of the CCD image sensor 60 is positioned behind the low-pass filter 25 with an annular sealing member 26 held between the low-pass filter 25 and the CCD image sensor 60. The sealing member 26 is made of a resilient material. The CCD image sensor 60, together with a CCD substrate 62, is fixed to a front surface of the CCD retaining plate 61. The CCD substrate 62 is extended to the back of the CCD retaining plate 61 to be connected to one end of a flexible printed wiring board (hereinafter referred to as a flexible PWB) 90 adopted for image signal transmission. Another end of the flexible PWB 90 is connected to a stationary circuit board 102a (shown in FIG. 29) on which the control circuit 102 is mounted. The CCD substrate 62 and the flexible PWB 90 are formed integral with each other.

The CCD retaining plate 61 is provided with a front flat portion 61a and three support lugs 61b. The front flat portion 61a is configured to support the CCD image sensor 60 and the CCD substrate 62. Two of the three support lugs 61b project horizontally in opposite directions while the remaining support lug 61b projects downwards. The X-axis direction moving stage 21 is provided with three recesses 21d which are shaped to allow the three support lugs 61b to be fitted therein, respectively. The three support lugs 61b are provided with three circular through-holes (elements of an inclination angle adjusting mechanism) 61c which extend through the three support lugs 61b in a forward/rearward direction, respectively. Three nuts (elements of an inclination angle adjusting mechanism) 63 are fixed to the X-axis direction moving stage 21 inside the three recesses 21d to face the through-holes 61c, respectively. The X-axis direction moving stage 21 is provided in the vicinity of the three nuts 63 with three spring accommodation recesses 21e in which three compression coil springs (elements of the inclination angle adjusting mechanism) 64 are accommodated, respectively. The two side support lugs 61b of the front flat portion 61a are provided below the associated two through-holes 61c with two positioning holes 61d, respectively. The X-axis direction moving stage 21 is provided in two of the three recesses 21d with two positioning projections 21f which can be engaged in the two positioning holes 61d, respectively.

Figure 35:
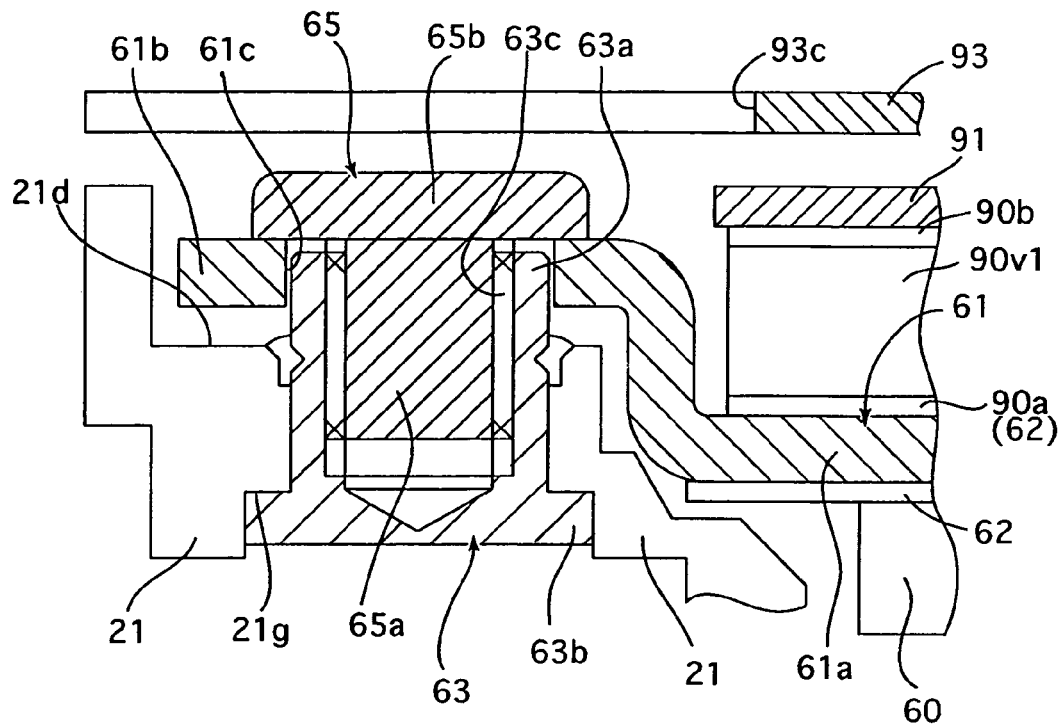
FIG. 35 is an enlarged cross sectional view of a portion of the image stabilizing unit in the vicinity of one of the two adjusting screws shown in FIG. 33.
Figure 36:
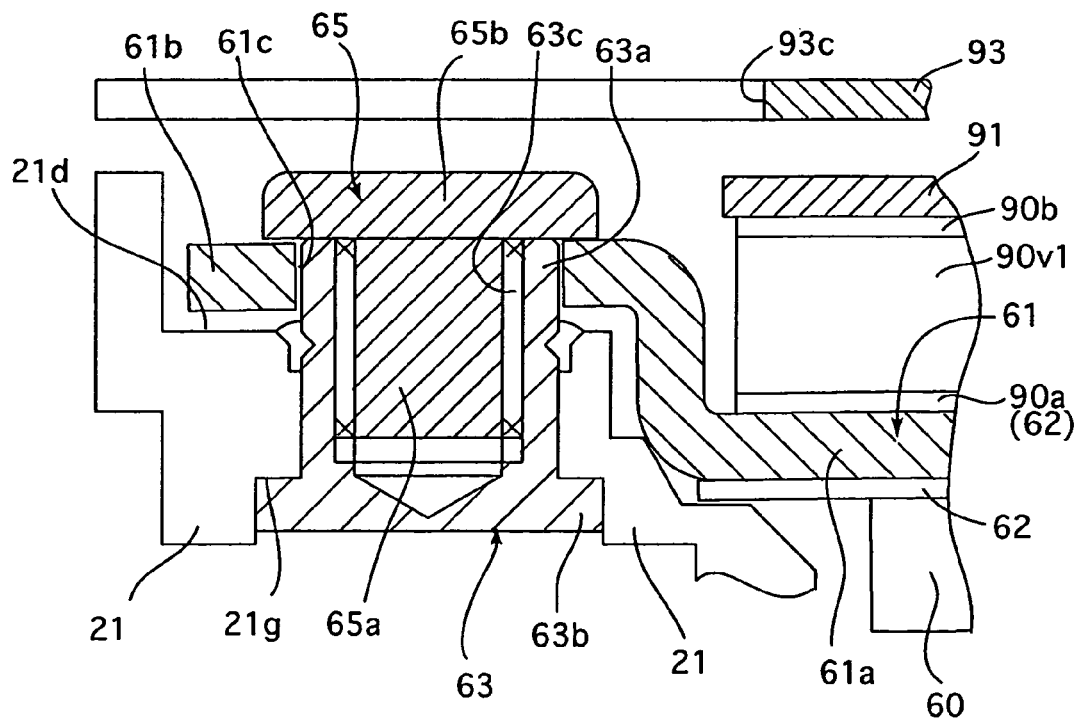
FIG. 36 is an enlarged cross sectional view of a portion of the image stabilizing unit in the vicinity of one of the two adjusting screws shown in FIG. 34.
Figure 37:
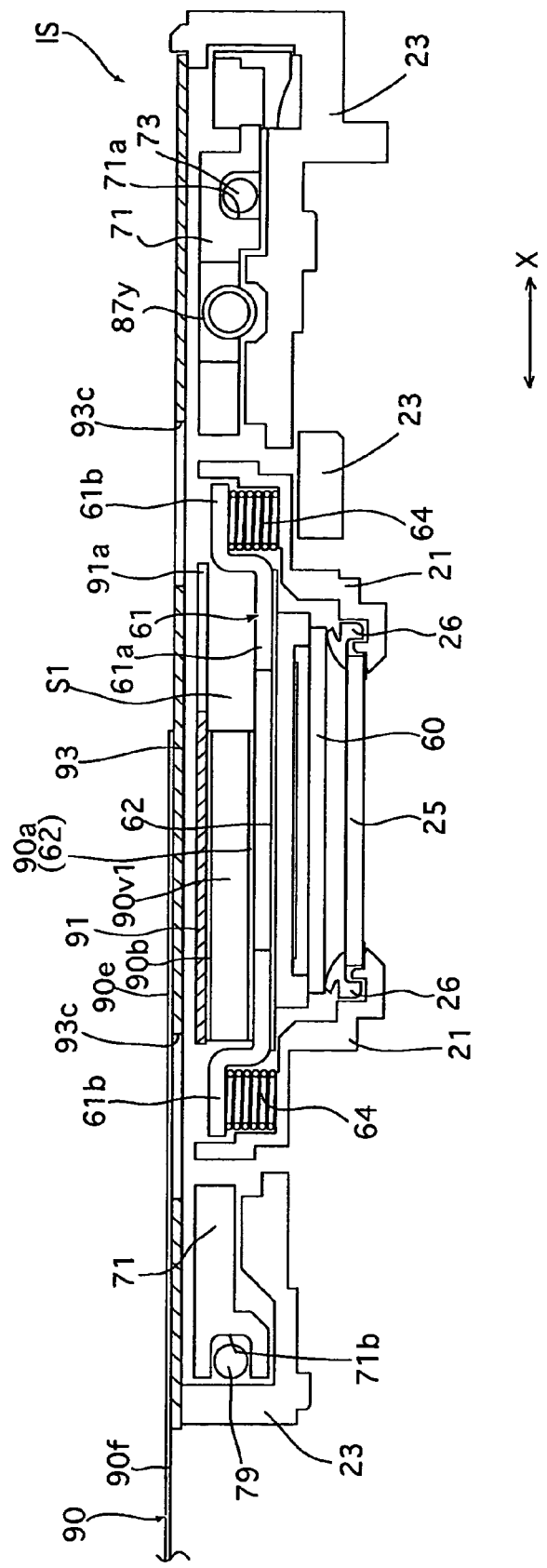
FIG. 37 is a cross sectional view of the image stabilizing unit, taken along a plane in which two compression coil springs of the CCD unit are positioned.

The three nuts 63 are made of metal which is a different material from the X-axis direction moving stage 21. Each nut 63 is provided with a hollow cylinder portion 63a and is further provided at one end of the cylinder portion (cylindrical shaft portion) 63a with a flange portion 63b. The three nuts 63 are fixed to the X-axis direction moving stage 21 with the three flange portions 63b being engaged in three large-diameter holes 21g formed on the front of the X-axis direction moving stage 21, respectively. The cylinder portion 63a of each nut 63 extends through the bottom of the associated large-diameter portion 21g to project rearward therefrom in the optical axis direction. As shown in FIGS. 35 and 36, the outer diameter of the cylinder portion 63a of each nut 63 is predetermined to be slightly smaller than the inner diameter (opening diameter) of the associated through-hole 61c of the CCD retaining plate 61. Each nut 63 is provided along the axis of the cylindrical portion 63a thereof with a female screw hole 63c so that three CCD adjustment screws (elements of the inclination angle adjusting mechanism) 65 are screwed into the three female screw holes 63c from the ends thereof (from the rear ends thereof in the optical axis direction), respectively. Each CCD adjustment screw 65 is provided with a shaft portion (screw shaft portion) 65a including a male thread portion thereon which is screw-engaged with the associated female screw hole 63c, and a head portion 65b which is greater in diameter than the shaft portion 65a. Unlike the cylinder portion 63a, the outer diameter of the head portion 65b is predetermined to be greater than the inner diameter (opening diameter) of the associated through-hole 61c.

When assembling the CCD unit, the CCD retaining plate 61 and the X-axis direction moving stage 21 are brought to approach each other so that the three support lugs 61b enter the corresponding three recesses 21d, respectively, with the three compression coil springs 64 inserted into the three spring accommodation recesses 21e in a compressed state, respectively. Thereupon, the two positioning projections 21f engage in the two positioning holes 61d, respectively, which determines the relative position between the X-axis direction moving stage 21 and the CCD image sensor 60. Additionally, bringing the CCD retaining plate 61 and the X-axis direction moving stage 21 closer to each other to some extent causes the ends of the hollow cylinder portions 63a of the three nuts 63 to enter the three circular through-holes 61c, respectively, since the outer diameter of the cylinder portion 63a of each nut 63 is smaller than the inner diameter (opening diameter) of the associated through-hole 61c as mentioned above.

Subsequently, the shaft portions 65a of the three CCD adjustment screws 65 are screwed into the female screw holes 63c of the three nuts 63, respectively. Bringing the X-axis direction moving stage 21 and the CCD retaining plate 61 closer to each other causes the compressed coil springs 64, which are inserted in the three recesses 21d, to be compressed between the X-axis direction moving stage 21 and the three support lugs 61b. Due to the resilient force of the three support lugs 61b thus compressed, the CCD retaining plate 61 is biased in a direction away from the X-axis direction moving stage 21 (rearwards in the optical axis direction) (see FIG. 37). However, the back surfaces of the head portions 65b of the three CCD adjustment screws 65 prevent the CCD retaining plate 61 from moving rearward, thus defining the position of the CCD retaining plate 61 in the optical axis direction. Accordingly, the X-axis direction moving stage 21 and the CCD retaining plate 61 are joined together with the CCD image sensor 60 and the low-pass filter 25 held therebetween.

In the CCD unit, in which the X-axis direction moving stage 21 and the CCD retaining plate 61 are thus joined together, the three CCD adjustment screws 65 are arranged dispersively at three different points about the center of the imaging surface of the CCD image sensor 60, and accordingly, the angle (inclination angle/setting angle) of the CCD retaining plate 61 relative to the photographing optical axis Z1, i.e., the angle (inclination angle/setting angle) of the imaging surface of the CCD image sensor 60 relative to the photographing optical axis Z1 can be adjusted by adjusting the tightening amount of each CCD adjustment screw 65. For instance, if the tightening amount of one CCD adjustment screw 65 is increased, the associated head portion 65b that defines the position of the CCD retaining plate 61 in the optical axis direction moves forward in the optical axis direction. This forward movement of the head portion 65b causes the associated support lug 61b which is in contact with the one CCD adjustment screw 65 to be pushed forward. Conversely, if the tightening amount of one CCD adjustment screw 65 is decreased, the associated head portion 65b moves rearward in the optical axis direction. This rearward movement of the head portion 65b causes the associated support lug 61b which is in contact with the one CCD adjustment screw 65 to be pushed rearward by the biasing force of the associated compression coil springs 64. The inclination angle of the CCD image sensor 60 relative to the photographing optical axis Z1 can be adjusted by changing the balance among the tightening amounts of the three CCD adjustment screws 65.

Figure 33:
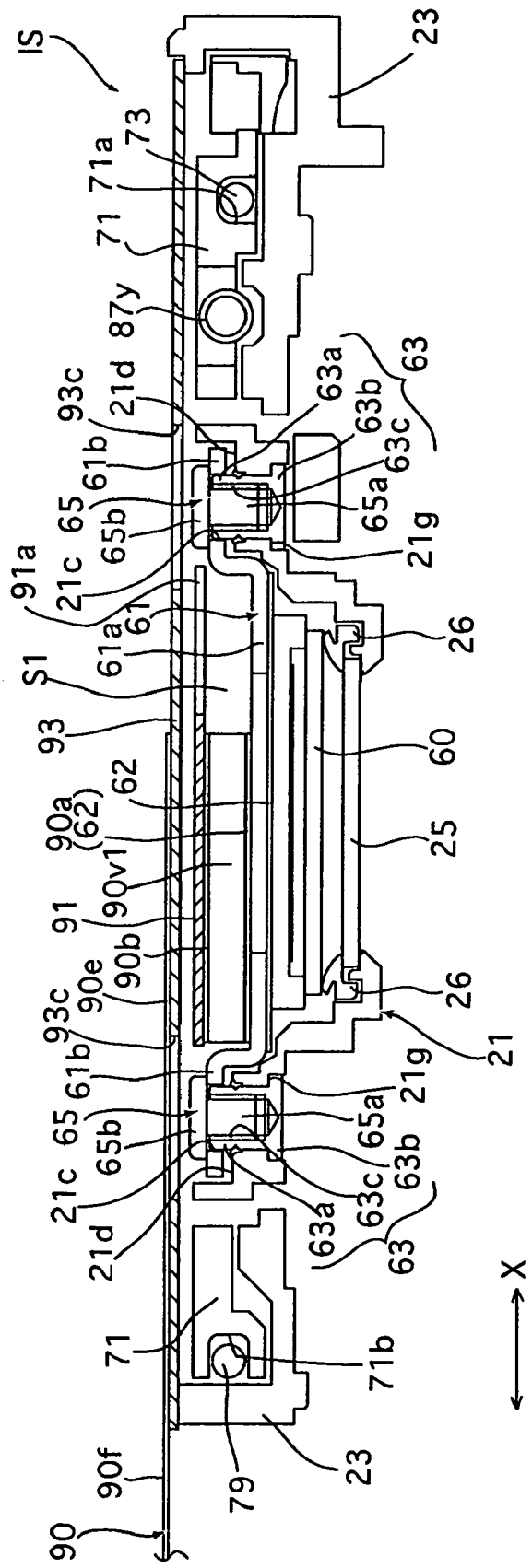
FIG. 33 is a cross sectional view of the image stabilizing unit in a state before an inclination angle adjustment is made to the CCD image sensor.
Figure 34:
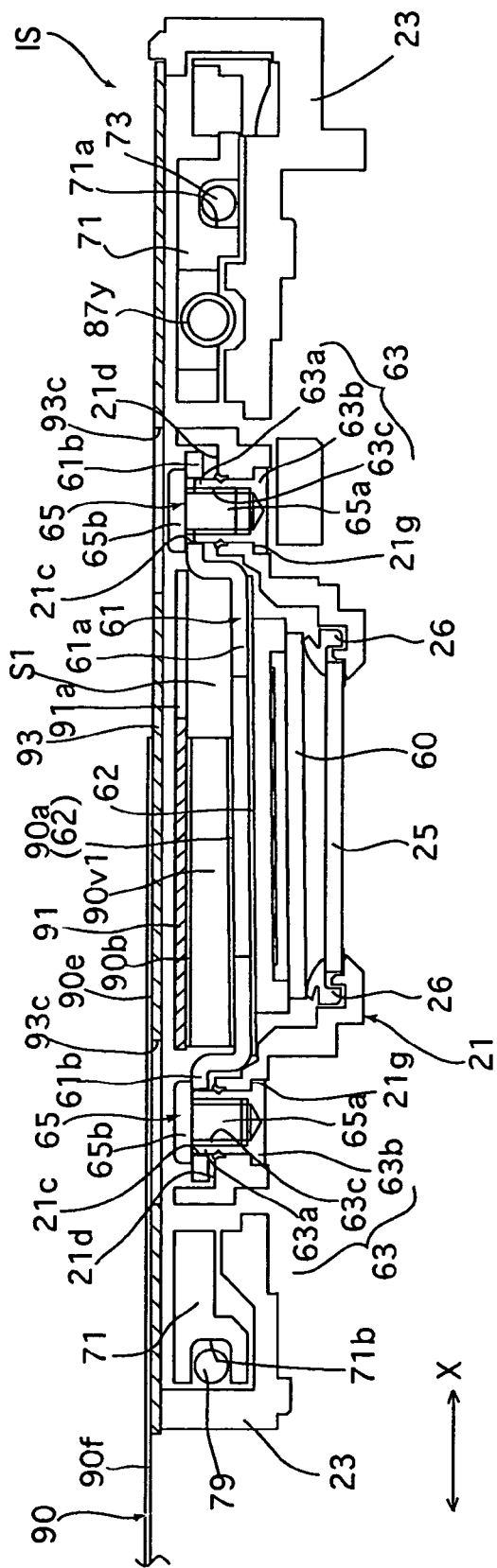
FIG. 34 is a cross sectional view of the image stabilizing unit in a state after the inclination angle adjustment has been made to the CCD image sensor.

FIGS. 33 and 34 are cross sectional views of the image stabilizing unit IS, respectively showing two different states before and after making adjustments to specific two of the three CCD adjustment screws 65 which are positioned on the horizontally opposite sides of the front flat portion 61a. In the state shown in FIG. 33, the tightening amounts of these two CCD adjustment screws 65 (the right and left CCD adjustment screws 65) are substantially identical and are not tightened to the maximum (to the limit) relative to the female screw holes 63c of the associated two nuts 63. FIG. 35 is an enlarged view of one of the right and left CCD adjustment screws 65 (the left CCD adjustment screw 65 as viewed in FIG. 34) and adjacent elements thereof in the state shown in FIG. 33. As can be seen from FIG. 35, the associated support lug 61b abuts against the back surface of the head portion 65b of the CCD adjustment screw 65 by the biasing force of the associated compression coil spring 64; however, there is room for the head portion 65b and the support lug 61b to be moved forward (downwards as viewed in FIG. 35) by further tightening the CCD adjustment screw 65 since there is still a space between the end of the cylinder portion 63a and the head portion 65b.

FIG. 34 illustrates a state in which the left CCD adjustment screw 65 has been tightened to the maximum. As can be seen in the enlarged view of the left CCD adjustment screw 65 and adjacent elements thereof in FIG. 36, the support lug 61b, which is in contact with the left CCD adjustment screw 65, has been pushed forward from the position shown in FIG. 35 against the biasing force of the compression coil spring 64 to thereby cause the CCD retaining plate 61 and the CCD image sensor 60 to tilt relative to the X-axis direction moving stage 21 (relative to the optical axis direction). In this state, the X-axis direction moving stage 21 is not tilted by the tilting of the CCD image sensor 60, however, the resilient sealing member 26, which is held between the low-pass filter 25 and the CCD image sensor 60, is resiliently deformed by the tilting of the CCD image sensor 60 (see FIG. 34).

As shown in FIG. 36, each CCD adjustment screw 65 can be tightened up until the head portion 65b comes into contact with the end of the cylinder portion 63a of the associated nut 63 because the cylinder portions 63a of the three nuts 63 are inserted in the three circular through-holes 61c, respectively. In this state, the support lug 61b is not held so as to be attached between the head portion 65b of the associated CCD adjustment screw 65 and the bottom of the associated recess 21d of the X-axis direction moving stage 21, but rather is held without making contact with the bottom of the recess 21d. Since the support lug 61b is not held so as to be attached between the head portion 65b of the associated CCD adjustment screw 65 and the bottom of the associated recess 21d, the CCD retaining plate 61 is not prevented from tilting even if the CCD adjustment screw 65 is tightened to the maximum when the tightening amount of either of the remaining two CCD adjustment screws 65 is changed. Accordingly, the entire range of axial movement of the shaft portion 65a of each CCD adjustment screw 65 relative to the associated nut 63 (the female screw hole 63c thereof) can be used for making an adjustment (inclination angle adjustment) to the angle of the CCD retaining plate 61 relative to the photographing optical axis Z1.

Figure 31:
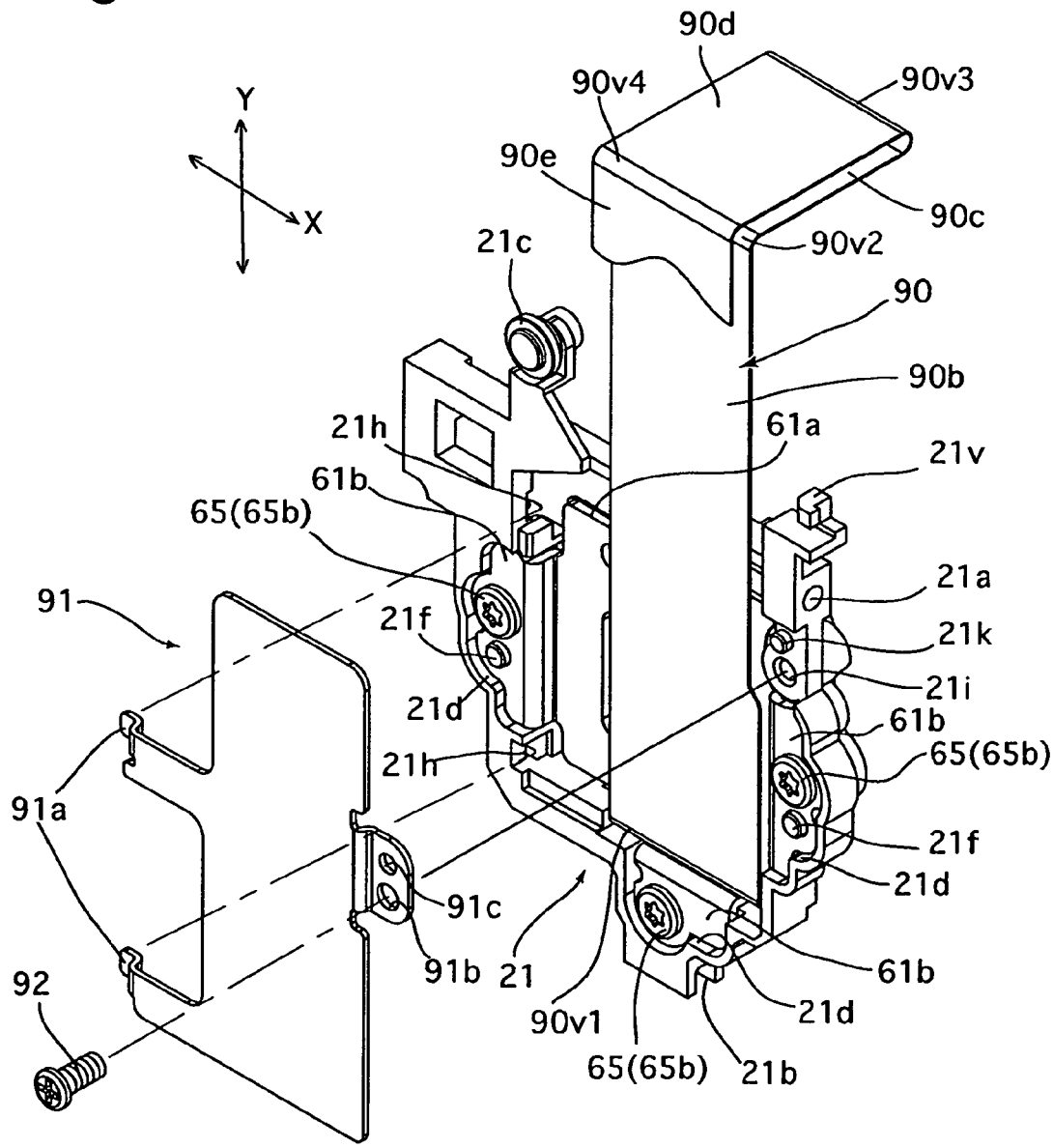
FIG. 31 is an exploded rear perspective view of the CCD unit, showing a state where the CCD retaining plate is fixed to the X-axis direction moving stage.
Figure 32:
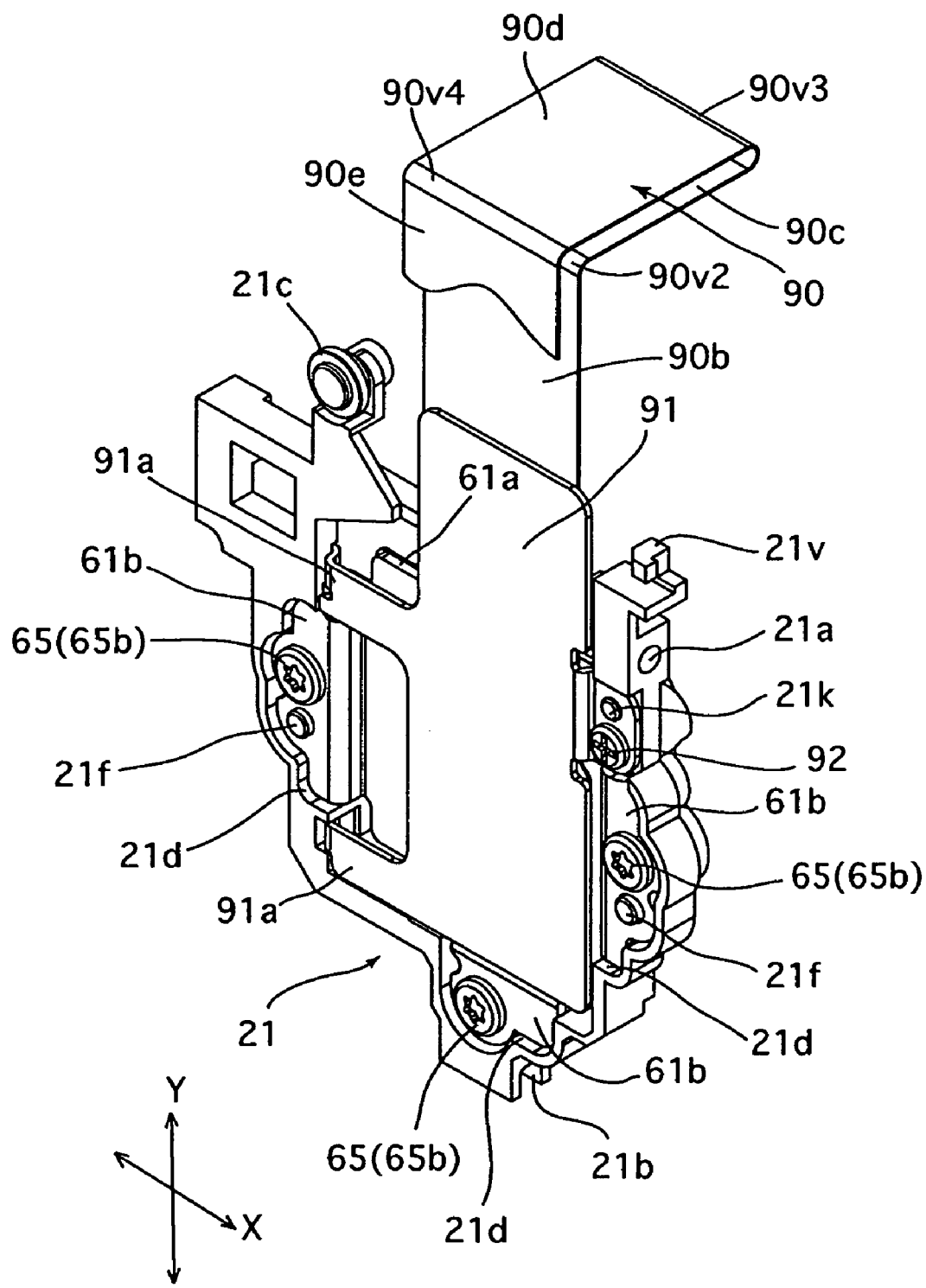
FIG. 32 is a rear perspective view of the CCD unit in an assembled state thereof.

The CCD unit is completed by fixing a movable plate (movable support member which supports the flexible printed wiring board 90/bending resistance device) 91 to the back of the X-axis direction moving stage 21 after the X-axis direction moving stage (holding member) 21 and the CCD retaining plate (image pickup device fixing member) 61 are joined together (see FIGS. 31 and 32). The movable plate 91 is a flat plate member which lies in a plane substantially parallel to a plane in which the CCD image sensor (image pickup device) 60 is driven, i.e., substantially parallel to an X-axis and Y-axis plane defined by both the X-axis direction and the Y-axis direction. The X-axis direction moving stage 21 is provided with a pair of engaging holes 21h, a screw hole 21i and a positioning projection 21k. The movable plate 91 is provided with a pair of locking lugs 91a, a through-hole 91b and a positioning hole 91c which are engaged in the pair of engaging holes 21h, the screw hole 21i and the positioning projection 21k of the X-axis direction moving stage 21, respectively. The movable plate 91 is secured to the X-axis direction moving stage 21 by a set screw 92 which is screwed into the screw hole 21i of the X-axis direction moving stage 21 in a state where the ends of the pair of locking lugs 91a have been engaged in the pair of engaging holes 21h and where the positioning projection 21k has been engaged in the positioning hole 91c (see FIG. 32).

Figure 29:
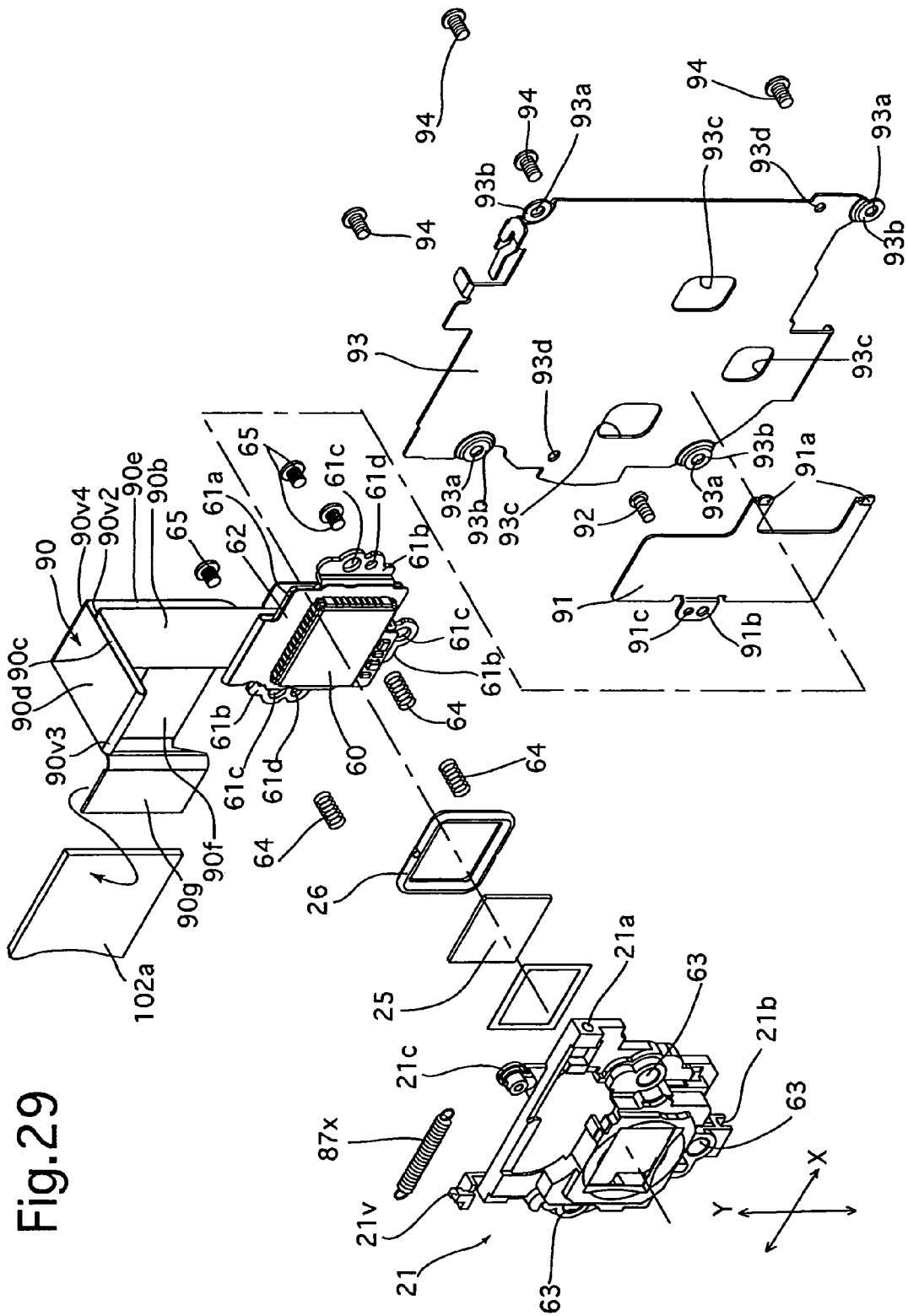
FIG. 29 is an exploded front perspective view of a CCD unit and a stationary cover shown in FIG. 10.
Figure 30:
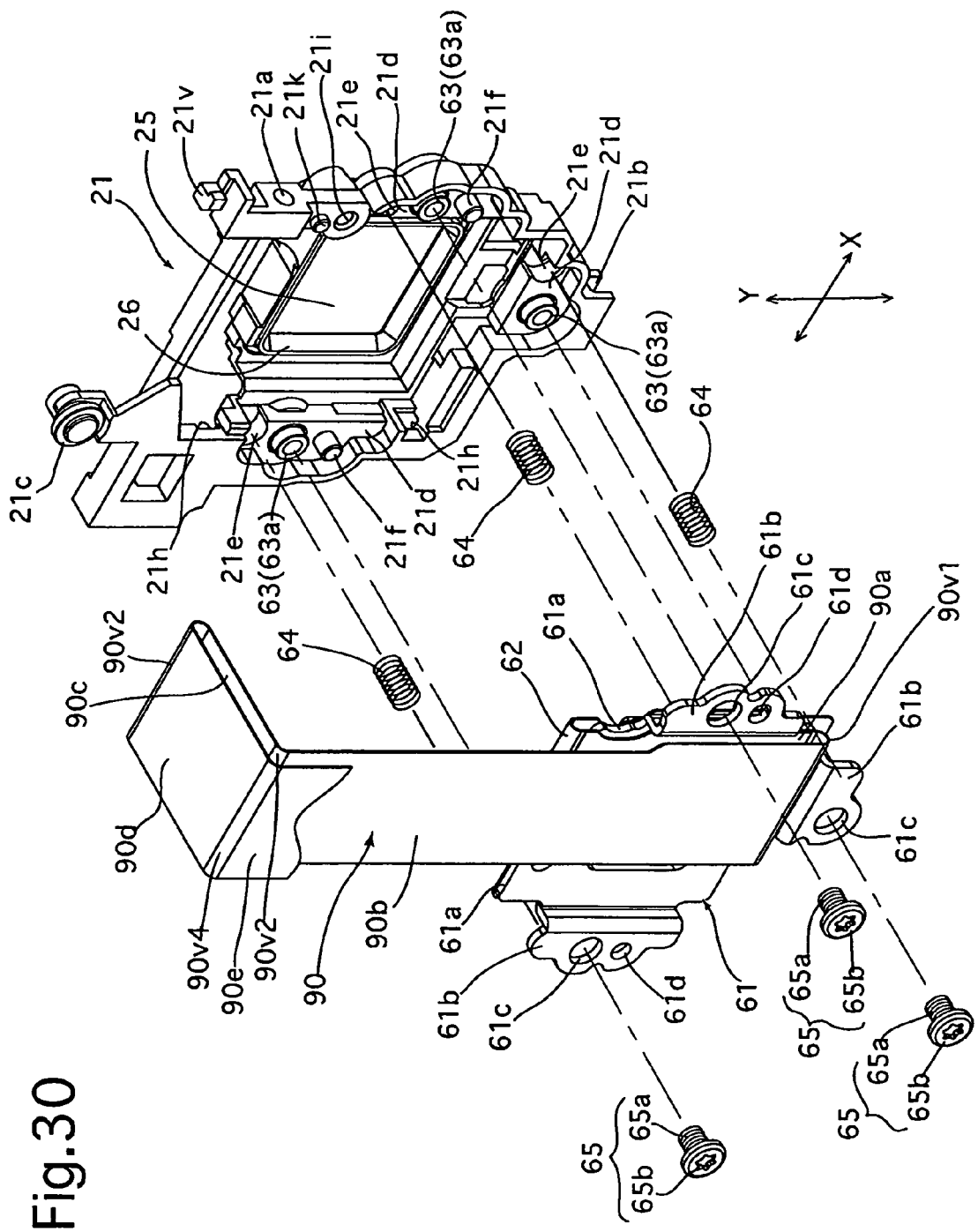
FIG. 30 is an exploded rear perspective view of the CCD unit.

The CCD unit is supported by the above described driving mechanisms for driving the CCD image sensor 60 in the X-axis direction and the Y-axis direction constituting the image stabilizing unit IS. The image stabilizing unit IS is provided with a stationary cover (rear protection cover) 93 which covers the back of the image stabilizing unit IS for projection thereof. The stationary cover 93 is a flat plate member which lies in a plane substantially parallel to a plane in which the CCD image sensor (image pickup device) 60 is driven, i.e., substantially parallel to an X-axis and Y-axis plane defined by both the X-axis direction and the Y-axis direction, and accordingly, the stationary cover 93 is substantially parallel to the moving plate 91. As shown in FIG. 29, the stationary cover 93 is provided with four through-holes 93a arranged dispersively in the vicinity of the outer edge of the stationary cover 93, and is further provided around the four through-holes 93a with four ring-shaped abutting surfaces 93b, respectively. The four ring-shaped abutting surfaces 93b substantially lie in a common plane. The stationary cover 93 is further provided with three access holes (through-holes) 93c and two positioning holes (through-holes) 93d.

FIGS. 8 and 9 show the image stabilizing unit IS from which the movable plate 91 and the stationary cover 93 are removed. As can be understood from FIGS. 8 and 9, the stationary holder 23 is provided, on the back thereof at four positions corresponding to the four through-holes 93a of the stationary cover 93, with four screw holes 23c, respectively, and is further provided around the four screw holes 23c with four abutting surfaces 23c with which the four abutting surfaces 93b of the stationary cover 93 are in contact, respectively. The stationary holder 23 is provided with two positioning projections 23e which are engageable in the two positioning holes 93d, respectively.

Figure 38:
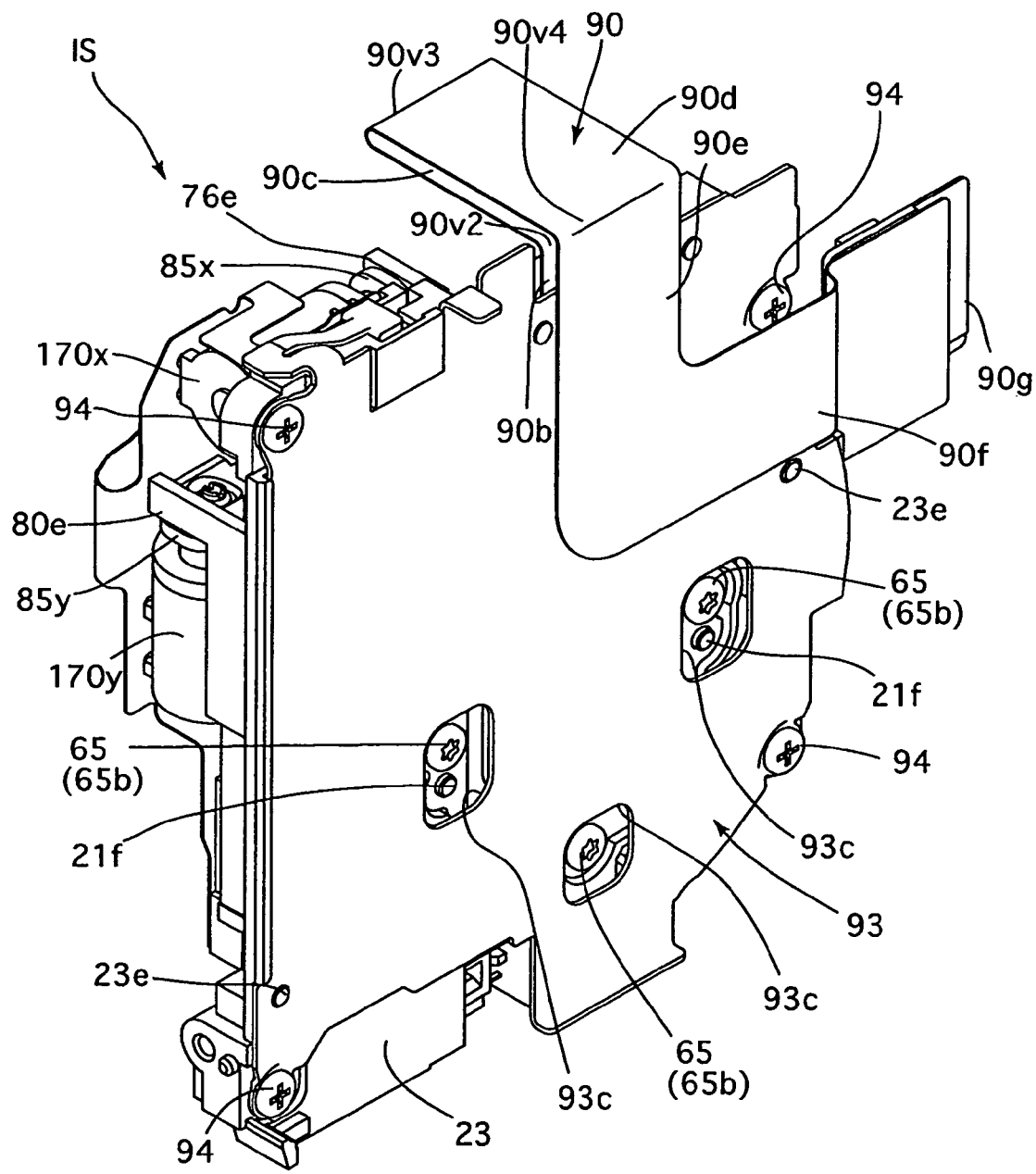
FIG. 38 is a rear perspective view of the image stabilizing unit in a state where the movable plate and the stationary cover are installed.
Figure 39:
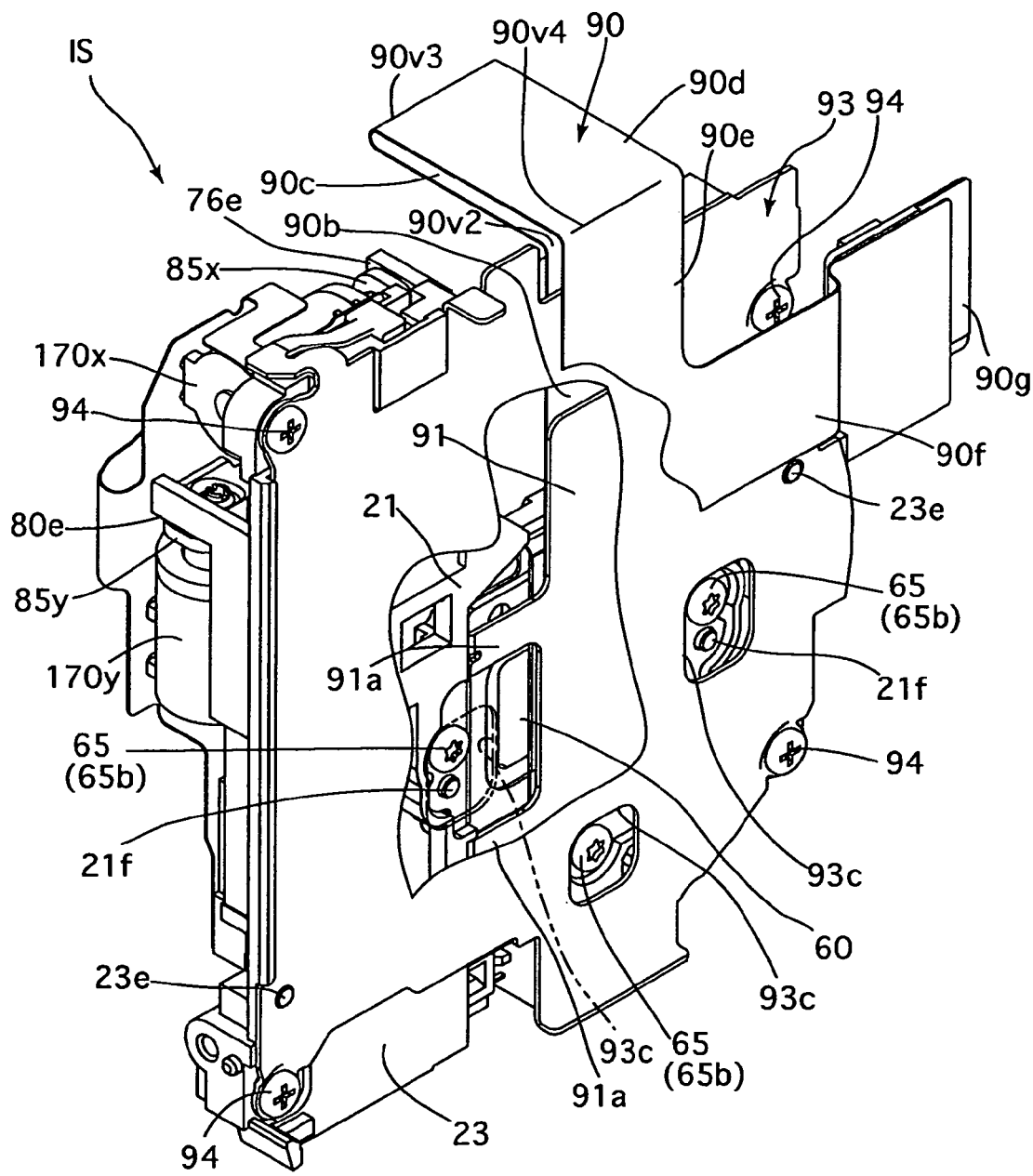
FIG. 39 is a rear perspective view of the image stabilizing unit with the stationary cover partly cut away for clarity.

When mounting the stationary cover 93 to the stationary holder 23, the two positioning projections 23e are brought into engagement with the two positioning holes 93d, respectively. Thereupon, the four abutting surfaces 93b of the stationary cover 93 come in contact with the corresponding four abutting surfaces 23d of the stationary holder 23, respectively, so that the four through-holes 93a and the four screw holes 23c are aligned. Thereafter, as shown in FIG. 38, the stationary cover 93 is fastened to the stationary holder 23 using four set screws 94 which are screwed into the screw holes 23c of the stationary holder 23 through the through-holes 93a of the stationary cover 93. As shown FIG. 38, the head portions 65b of the three CCD adjustment screws 65 are exposed through the three access holes 93c of the stationary cover 93 in a state where the movable plate 91 and the stationary cover 93 are mounted, and accordingly, the above described inclination angle adjustment operation for adjusting the angle of the CCD image sensor 60 relative to the photographing optical axis Z1 can be carried out without dismounting the movable plate 91 or the stationary plate 93.

The control circuit 102 is mounted on the stationary circuit board 102a provided in the camera body 202 and the stationary circuit board 102a and the CCD substrate 62 are electrically connected to each other via the flexible PWB 90 as mentioned above. As shown in FIGS. 2, 3, 12 and 40, the flexible PWB 90 is provided with a stationary CCD-connecting portion 90a, a U-shaped folded portion 90v1, a first vertical flat portion 90b, a bent portion 90v2, a first horizontal flat portion 90c, a U-shaped folded portion 90v3, a second horizontal flat portion 90d, a bent portion 90v4, a second vertical flat portion 90e, a laterally elongated portion 90f and a connector portion 90g. The stationary CCD-connecting portion 90a is formed integral with the CCD substrate 62 in the back of the CCD retaining plate 61. A bottom end portion of the stationary CCD-connecting portion 90a is folded back upon itself to extend upward to form the U-shaped folded portion 90v1. The first vertical flat portion 90b is elongated upward in the Y-axis direction from the U-shaped folded portion 90v1. An upper end of the first vertical flat portion 90b is bent forward at a substantially right angle to form the bent portion 90v2. The first horizontal flat portion 90c is elongated forward from the bent portion 90v2 above the zoom motor 150. A front end of the first horizontal flat portion 90c is folded over upon itself by substantially 180 degrees to extend rearward to form the U-shaped folded portion 90v3. The second horizontal flat portion 90d is elongated rearward from the U-shaped folded portion 90v3. A rear end portion of the second horizontal flat portion 90d is bent downward at a substantially right angle to form the bent portion 90v4. The second vertical flat portion 90e is elongated downward in the Y-axis direction from the bent portion 90v4. The laterally elongated portion 90f is laterally elongated in the X-axis direction from the lower end of the second vertical flat portion 90e. The connector portion 90g is formed at one end (right end as viewed in FIG. 38) of the laterally elongated portion 90f to be attached to the stationary circuit board 102a on which the control circuit 102 is mounted. The first vertical flat portion 90b and the second vertical flat portion 90e are substantially parallel to each other and the lengthwise direction of each of the first vertical flat portion 90b and the second vertical flat portion 90e is substantially parallel to the Y-axis direction. The first horizontal flat portion 90c and the second horizontal flat portion 90d are substantially parallel to each other and the lengthwise direction of each of the first horizontal flat portion 90c and the second horizontal flat portion 90d is substantially parallel to the photographing optical axis Z1. Note that the flexible PWB 90 and the CCD substrate 62 are not shown in FIGS. 8, 9, 19, 21 and 23 to expose the back of the front flat portion 61a.

Figure 40:
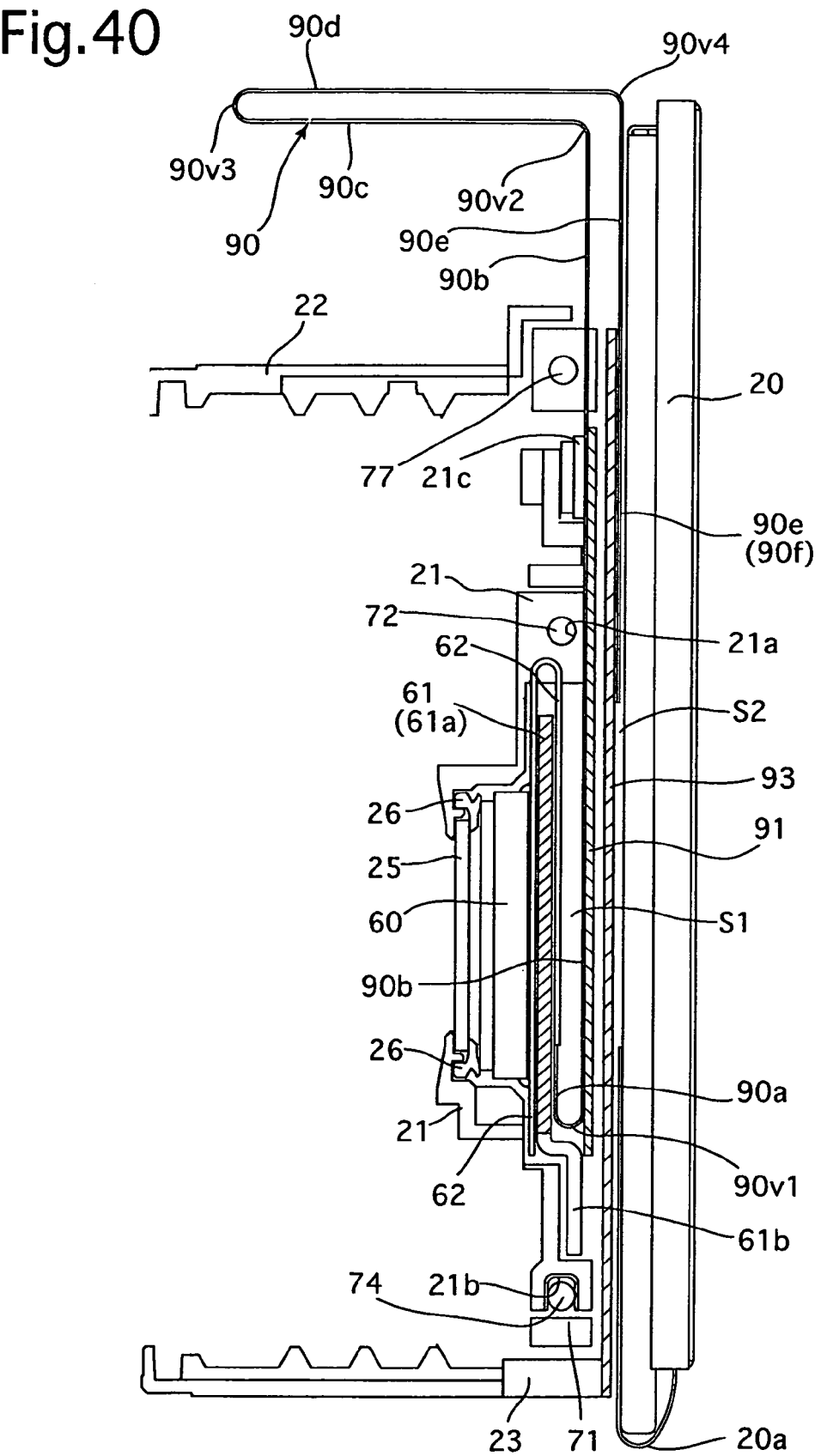
FIG. 40 is a longitudinal sectional view of a portion of the image stabilizing unit, showing the arrangement of the flexible printed wiring board that extends from the CCD image sensor.

As shown in FIG. 40, the movable plate 91 is fixed to the X-axis direction moving stage 21 to be spaced from the front flat portion 61a of the CCD retaining plate 61 in the optical axis direction to form a flexible PWB insertion space S1 between the CCD retaining plate 61 and the movable plate 91. In addition, another flexible PWB insertion space S2 is formed between the stationary cover 93 and the LCD panel 20 that is positioned behind the stationary cover 93. The U-shaped folded portion 90v1 of flexible PWB 90, which has a U-shape in cross section, is positioned in the flexible PWB insertion space S1 so that the stationary CCD-connecting portion 90a and the first vertical flat portion 90b are positioned at the front and the rear of the flexible PWB insertion space S1, respectively. The stationary CCD-connecting portion 90a is fixed to the back of the CCD retaining plate 61. On the other hand, the first vertical flat portion 90b is in contact (surface contact) with a front surface of the movable plate 91 and guided by the movable plate 91 in a direction to extend from the U-shaped folded portion 90v1 to the bent portion 90v2. The second vertical flat portion 90e and the laterally elongated portion 90f, which extend behind the first vertical flat portion 90b via the first horizontal flat portion 90c and the second horizontal flat portion 90d, extend in the flexible PWB insertion space S2 and are supported by a back surface of the stationary cover 93. Each of the second vertical flat portion 90e and the laterally elongated portion 90f is partly fixed to the back of the stationary cover 93 using a fixing device such as an adhesive double coated tape.

In this flexible printed wiring board arrangement, the movable plate 91 is arranged at a position in the optical axis direction between the CCD retaining plate 61, which supports one end of the flexible PWB 90 (the CCD substrate 62), and the stationary cover 93 that serves as a stationary support portion. As shown in FIG. 40, a part (stationary part) of the flexible PWB 90 which includes the second vertical flat portion 90e, the laterally elongated portion 90f and the connector portion 90g is fixed and supported by the back of the stationary cover 93 in the optical axis direction, and the movable plate 91 is positioned so as to cover another part (movable part) of the flexible PWB 90 which extends vertically in front of the stationary cover 23, thus preventing the other part of the flexible printed PWB 90 and the stationary cover 93 from touching each other. Accordingly, the movable plate 91 serves as a protective member which prevents the flexible PWB 90 (except the aforementioned stationary portion thereof that is positioned behind the stationary cover 93) from touching adjacent stationary members such as the stationary cover 93 and the stationary holder 23. In general, if a flexible PWB (90) comes in contact with any adjacent stationary members when following movements of a movable member while being elastically deformed, friction occurs between the flexible PWB (90) and such adjacent members, and this friction may cause resistance to movements of the movable member. However, according to the present embodiment of the flexible printed wiring board arrangement, providing the image stabilizing unit IS with the movable plate 91 makes it possible to prevent the aforementioned movable part of the flexible PWB 90 from touching adjacent stationary members to thereby prevent such friction from occurring.

Additionally, a part of the first vertical flat portion 90b of the flexible PWB 90 is in surface contact with the front surface of the movable plate 91. Since the movable plate 91 is a movable member which is driven integrally with the CCD image sensor 60 in the X-axis direction and the Y-axis direction, no excessive friction occurs between the first vertical flat portion 90b and the movable plate 91 in the range of this surface contact when the CCD image sensor 60 is driven to counteract image shake. In this manner, the movable plate 91 serves as a protective member which prevents the aforementioned movable part of the flexible PWB 90 from touching adjacent stationary members and also serves as a movable support member which provides a bending-resistance property to the flexible PWB 90 while preventing excessive friction from occurring. Accordingly, the stability of the flexible PWB 90 is improved and it is possible to drive the CCD image sensor 60 with a higher degree of precision under less load.

In the above described inclination angle adjustment operation for adjusting the angle of the CCD image sensor 60, the CCD retaining plate 61 is tilted relative to the X-axis direction moving stage 21 and the movable plate 91. A variation of the holding angle of the CCD retaining plate 61 produces a force which twists the flexible PWB 90 via the portion of thereof fixed to the CCD retaining plate 61. Since the flexible PWB 90 itself has elasticity, the flexible PWB 90 can keep up with such twisting force by being elastically deformed. However, in the case where this elastically deformed portion of the flexible PWB 90 touches an adjacent stationary member, there is a possibility of excessive loads on movements of the CCD image sensor 60 being produced when the flexible PWB 90 follows movements of the CCD image sensor 60 in the image stabilizing operation. In the present embodiment of the flexible printed wiring board arrangement, although the U-shaped folded portion 90v1, which is positioned in the flexible PWB insertion space S1 between the CCD retaining plate 61 and the movable plate 91, is twisted to be elastically deformed when the angle of the CCD image sensor 60 relative to the photographing optical axis Z1 is adjusted as shown in FIG. 34, the twisted portion of the flexible PWB 90 which extends from the first vertical flat portion 90b onward is restrained because the first vertical flat portion 90b that follows the folded portion 90v1 is in surface contact with a front surface of the movable plate 91 to be supported thereby. In other words, the angle of the CCD retaining plate 61 relative to the photographing optical axis Z1 is adjusted in the space (the flexible PWB insertion space S1) between the X-axis direction moving stage 21 and the movable plate 91, while the flexible PWB 90 that extends from the CCD image sensor 60 is supported by a surface of the movable plate 91 which faces the CCD retaining plate 61. Consequently, the twist of the flexible PWB 90 which is produced by an inclination angle adjustment made to the CCD image sensor 60 is absorbed within the CCD unit (at the folded portion 90v1) that is held between the X-axis direction moving stage 21 and the movable plate 91, so that no deformation of the flexible PWB 90, which may cause an increase in load on the movement of the CCD image sensor 60, remains in the portion thereof that extends outwards from the CCD unit. Namely, making an adjustment to the angle of the CCD image sensor 60 relative to the photographing optical axis Z1 has no adverse influence on the driving accuracy of the CCD unit.

Figure 41:
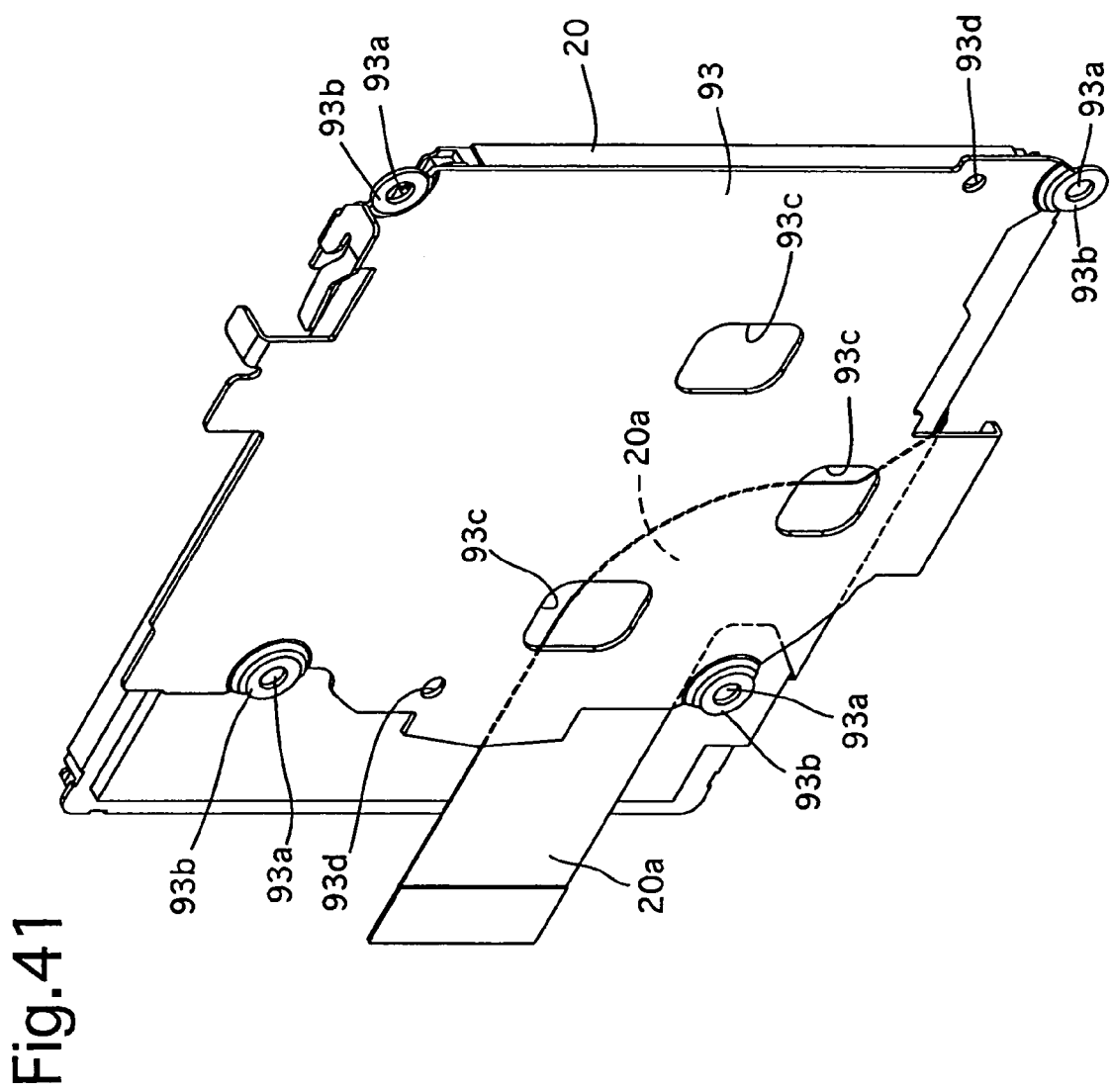
FIG. 41 is a perspective view of an LCD panel, the stationary cover and a flexible printed wiring board which extends from the LCD panel.

The stationary cover 93 also protects a flexible PWB 20a that extends from the LCD panel 20 from the movable image stabilizing unit IS. The flexible PWB 20a is provided independently of the flexible PWB 90. As shown in FIG. 40, the flexible PWB 20a that extends from the bottom of the LCD panel 20 is bent to extend upwards to be positioned in the flexible PWB insertion space S2 between the stationary cover 93 and the LCD panel 20. As shown in FIG. 41, the flexible PWB 20a is arranged to extend in a lateral direction along the back of the stationary cover 93 so that the end of this lateral extending portion of the flexible PWB 20a is connected to the control circuit 102 (the structure of this connected portion is not shown in the drawings). This arrangement can prevent the flexible PWB 20a from interfering with moving parts of the image stabilizing unit IS when the image stabilizing unit IS is driven in the X-axis direction and the Y-axis direction in the image stabilizing operation.

Figure 42:
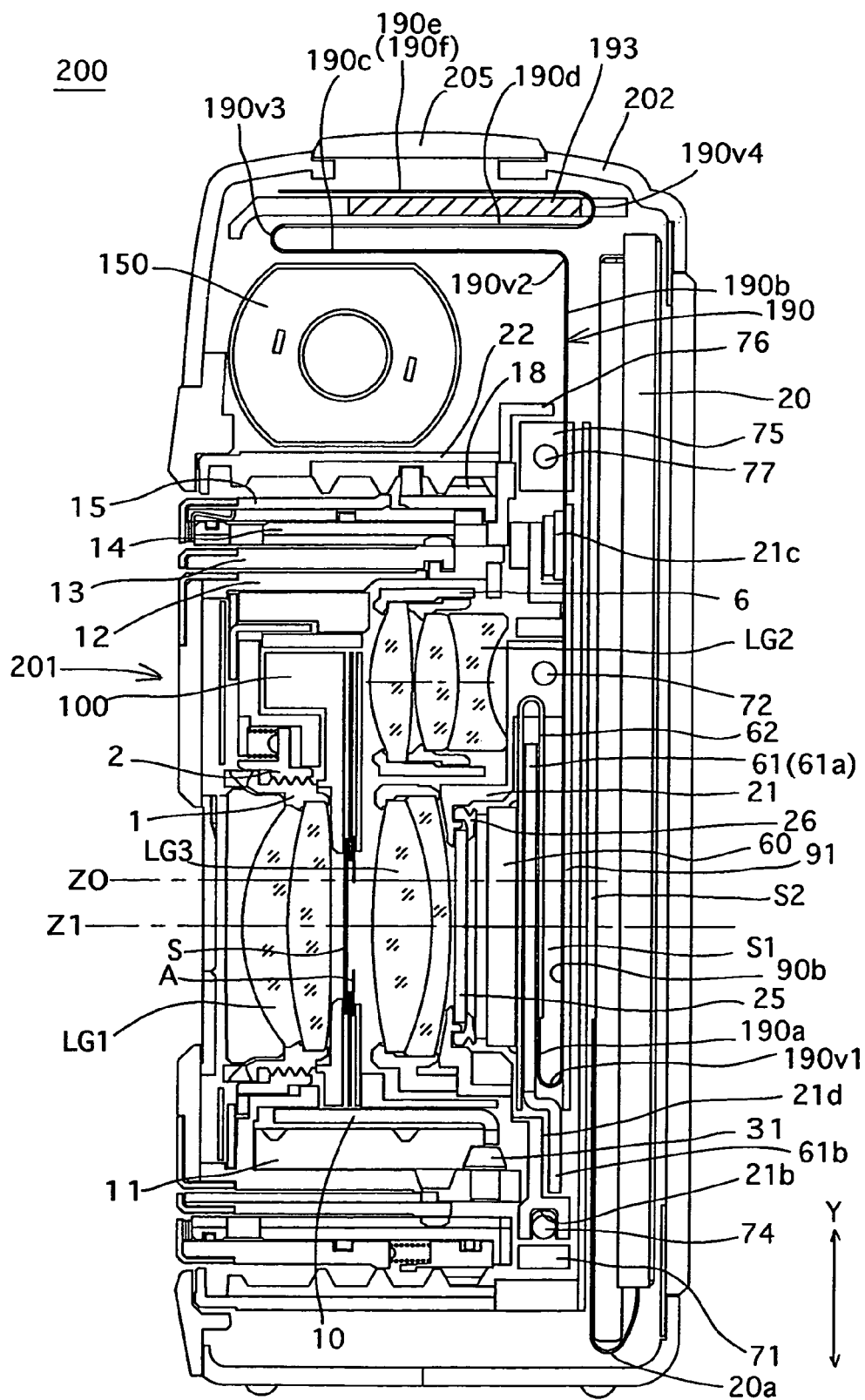
FIG. 42 is a longitudinal sectional view of the digital camera shown in FIG. 1 in the fully-retracted state of the zoom lens, showing another embodiment of the flexible printed wiring board arrangement according to the present invention.
Figure 43:
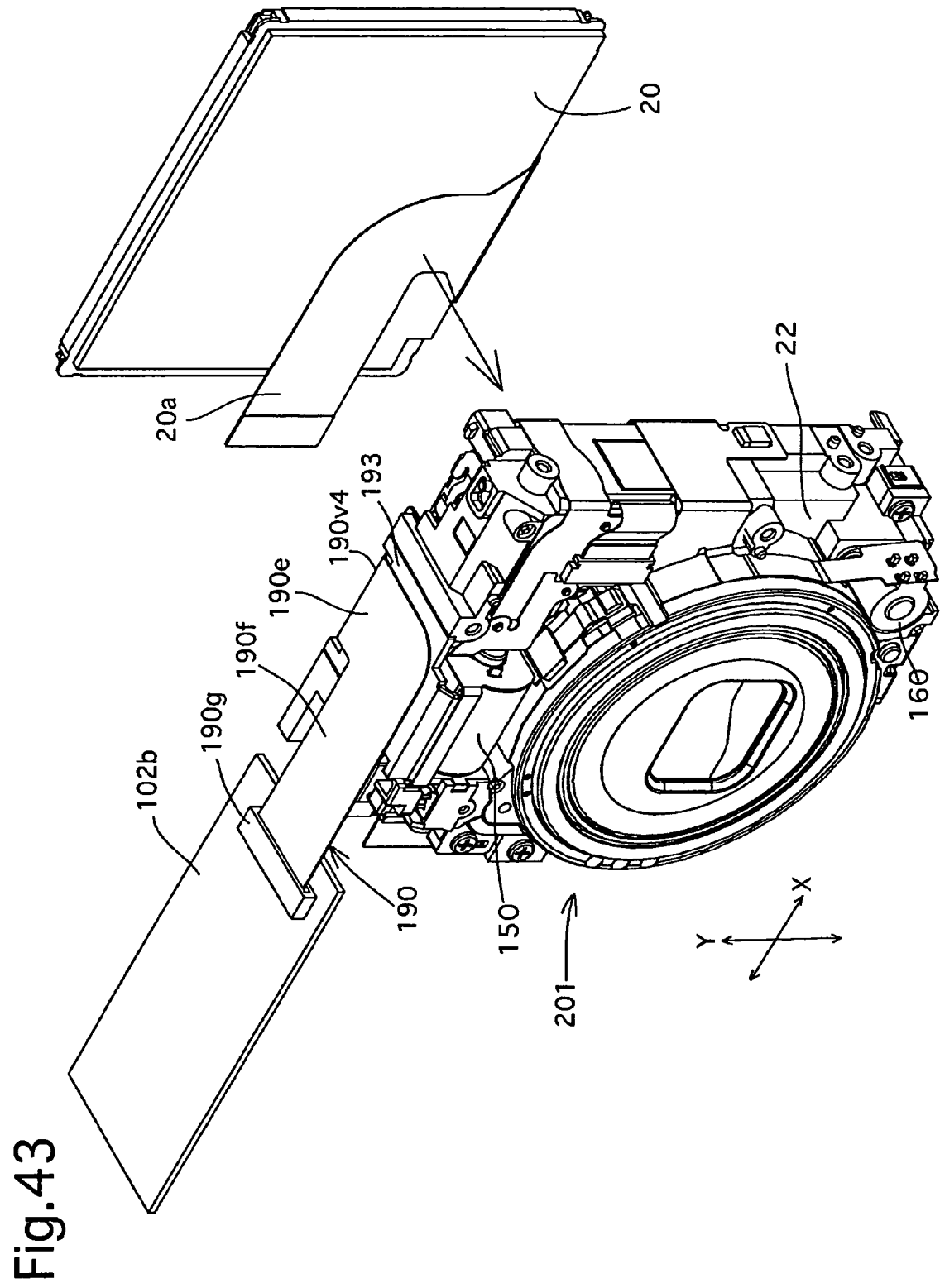
FIG. 43 is a perspective view of the zoom lens of the digital camera shown in FIG. 42 and an LCD unit.

FIGS. 42 and 43 show another embodiment (second embodiment) of the flexible printed wiring board arrangement according to the present invention. This embodiment of the flexible printed wiring board arrangement using a flexible PWB 190 (which corresponds to the flexible PWB 90) is partially different from the previous embodiment (first embodiment) of the flexible printed wiring board arrangement. Accordingly, elements and portions similar to those in the previous embodiment of the flexible printed wiring board arrangement are designated by the same reference numerals in the second embodiment of the flexible printed wiring board arrangement and the descriptions of such similar elements and portions are omitted from the following description.

As shown in FIG. 42, the flexible PWB 190 is provided with a stationary CCD-connecting portion 190a, a U-shaped folded portion 190v1, a first vertical flat portion 190b, a bent portion 190v2, a first horizontal flat portion 190c, a U-shaped folded portion 190v3 and a second horizontal flat portion 190d. The stationary CCD-connecting portion 190a is formed integral with the CCD substrate 62 behind the CCD retaining plate 61. A bottom end portion of the stationary CCD-connecting portion 190a is folded back upon itself to extend upward to form the U-shaped folded portion 190v1. The first vertical flat portion 190b is elongated upward in the Y-axis direction from the U-shaped folded portion 190v1. An upper end of the first vertical flat portion 190b is bent forward at a substantially right angle to form the bent portion 190v2. The first horizontal flat portion 190c is elongated forward from the bent portion 190v2 above the zoom motor 150. A front end of the first horizontal flat portion 190c is folded over upon itself at a substantially 180 degrees to extend rearward to form the U-shaped folded portion 190v3. The second horizontal flat portion 190d is elongated rearward from the U-shaped folded portion 190v3. Although the portion of the flexible PWB 190 which extends from the stationary CCD-connecting portion 190a to the second horizontal flat portion 190d is identical to the portion of the flexible PWB 90 which extends from the stationary CCD-connecting portion 90a to the second horizontal flat portion 90d, the remaining portion of the flexible PWB 190 which extends from the second horizontal flat portion 190d onward is different from the portion of the flexible PWB 90 which extends from the second horizontal flat portion 90d onward. The flexible PWB 190 is further provided with a bent portion 190v4, a top supported portion 190e, a laterally elongated portion 190f and a connector portion 190g. The image stabilizing unit IS is provided above the zoom motor 150 with a stationary support plate 193, and a rear end portion of the second horizontal flat portion 190d is folded back at a substantially 180 degrees around a rear end of the support plate 193 to extend along the top surface of the support plate 193 to form the bent portion 190v4. The top supported portion 190e is formed to extend forward from the bent portion 190v4 and is supported by the top surface of the support plate 193. As shown in FIG. 43, the laterally elongated portion 190f is laterally elongated in the X-axis direction from the top supported portion 190e. The connector portion 190g is formed at one end (left end as viewed in FIG. 43) of the laterally elongated portion 190f to be attached to a stationary circuit board 102b on which the control circuit 102 is mounted. At least a part of the top supported portion 190e and at least a part of the laterally elongated portion 190f are fixed to the support plate 193 using a fixing device such as an adhesive double coated tape.

The flexible PWB 190 is different from the flexible PWB 90 in that the flexible PWB 190 extends to the side of the support plate 193 without being fixed to a stationary member corresponding to the stationary cover 93 that is positioned in the back of the image stabilizing unit IS. However, the second embodiment of the flexible printed wiring board arrangement is the same as the first embodiment of the flexible printed wiring board arrangement in that the movable plate 91 serves as a protective member which prevents a movable part of the flexible PWB 190 which is not supported by the support plate 193 from touching adjacent stationary members such as the stationary holder 23. Accordingly, providing the image stabilizing unit IS with the movable plate 91 makes it possible to prevent the aforementioned movable part of the flexible PWB 190 from touching adjacent stationary members to thereby prevent harmful friction from occurring between the flexible PWB and adjacent stationary members.

Although the present invention has been described based on the above illustrated embodiments, the present invention is not limited solely to these particular embodiments. For instance, although each of the flexible PWBs 90 and 190 includes a forward-extending portion which is composed of the first horizontal flat portion (90c or 190c), the U-shaped folded portion 90v3 and the second horizontal flat portion (90d or 190d) so that the forward-extending portion contributes to a reduction of a resistance to movements of the flexible PWB when the CCD image sensor 60 is driven, it is possible that this forward-extending portion be omitted in the flexible printed wiring board arrangement according to the present invention.

Although the movable plate 91, which is provided separately from the flexible PWB 90 or 190, supports the flexible PWB 90 or 190 in the above illustrated embodiments of the flexible printed wiring board arrangements, a similar effect can be obtained without the movable plate 91 if the hardness (bending-resistance property) of a corresponding part of the flexible PWB is enhanced by backing or the like.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A flexible printed wiring board arrangement of an imaging device, comprising:
    an image sensor movable in a plane orthogonal to an optical axis;
    a flexible printed wiring board extending from said image sensor; and
    a movable support member which is positioned behind said image sensor in said optical axis direction to support said flexible printed wiring board, wherein said movable support member moves with said image sensor in directions orthogonal to said optical axis when said image sensor is moved, a part of said flexible printed wiring board being disposed along a front surface of said movable support member behind said image sensor.

2. The flexible printed wiring board arrangement according to claim 1, wherein said movable support member comprises a plate which is arranged substantially parallel to said plane in which said image sensor is movable, and
    wherein said flexible printed wiring board is in surface contact with said front surface of said movable support member.

3. The flexible printed wiring board arrangement according to claim 1, further comprising a rear protection member positioned behind said movable support member in said optical axis direction to cover the back of said image sensor.

4. The flexible printed wiring board arrangement according to claim 3, wherein a part of said flexible printed wiring board is fixed to said rear protection member.

5. The flexible printed wiring board arrangement according to claim 4, wherein said rear protection member comprises a plate provided substantially parallel to said plane in which said image sensor is movable,
    wherein said part of said flexible printed wiring board is fixed to a rear surface of said rear projection member, and
    wherein said movable support member prevents said flexible printed wiring board, except said part thereof that is fixed to said rear protection member, from touching said rear protection member.

6. The flexible printed wiring board arrangement according to claim 3, wherein said rear protection member is fixed to a body of said imaging device so as to be immovable with respect thereto.

7. The flexible printed wiring board arrangement according to claim 3, further comprising:
    an external display device positioned behind said rear protection member to be exposed to the outside of said imaging device; and
    a second flexible printed wiring board which extends from said external display device and provided separately from said flexible printed wiring board that extends from said image sensor;
    wherein said second flexible printed wiring board is positioned in a space between said external display device and said rear protection member.

8. The flexible printed wiring board arrangement according to claim 1, further comprising:
    an image sensor fixing member to which said image sensor is fixed;
    a holding member which holds said image sensor fixing member and is supported to be movable along said plane orthogonal to said optical axis; and
    an inclination angle adjusting mechanism for changing an inclination angle of said image sensor fixing member relative to said holding member,
    wherein said movable support member is fixed to said holding member.

9. The flexible printed wiring board arrangement according to claim 8, wherein said inclination angle adjusting mechanism comprises:
    a plurality of screw holes provided on said holding member;
    a plurality of adjusting screws which pass through a plurality of through-holes formed in said image sensor fixing member to be screwed into corresponding said screw holes, respectively; and
    a plurality of compression coil springs positioned between said holding member and said image sensor fixing member in a compressed state.

10. The flexible printed wiring board arrangement according to claim 9, further comprising a rear protection member positioned behind said movable support member in said optical axis direction to cover the back of said image image sensor,
    wherein a plurality of through-holes are formed in said rear protection member so that said adjusting screws are accessible from the rear of said rear protection member through said through-holes, respectively.

11. The flexible printed wiring board arrangement according to claim 1, wherein said imaging device comprises a digital camera.

12. A flexible printed wiring board arrangement of an imaging device, comprising:
    an image sensor movable in a plane orthogonal to an optical axis;
    a flexible printed wiring board extending from said image sensor; and
    a bending resistance device which is positioned behind said image sensor in said optical axis direction so as to provide a bending-resistance property to said flexible printed wiring board, wherein said bending resistance device moves with said image sensor in directions orthogonal to said optical axis when said image sensor is moved.

13. The flexible printed wiring board arrangement according to claim 12, wherein said bending resistance device comprises a plate lying in a plane substantially parallel to said plane orthogonal to said optical axis.

14. A flexible printed wiring board arrangement including an image pickup device movable in a plane orthogonal to an optical axis, a stationary circuit board, and a flexible printed wiring board which is wired to connect said image pickup device to said stationary circuit board, said flexible printed wiring board arrangement comprising:
   a rear protection member positioned behind said image pickup device in said optical axis direction to protect the back of said image pickup device, a part of said flexible printed wiring board being fixed to said rear protection member; and
   a movable support member which is positioned between said rear protection member and said image pickup device in said optical axis direction to support said flexible printed wiring board, wherein said movable support member moves with said image pickup device in directions orthogonal to said optical axis when said image pickup device is moved, a part of said flexible printed wiring board being disposed along a front surface of said movable support member behind said image pickup device.

15. The flexible printed wiring board arrangement according to claim 14, wherein said movable support member comprises a plate which is arranged substantially parallel to said plane orthogonal to said optical axis, and
   wherein said rear protection member comprises a plate which is arranged substantially parallel to said plane orthogonal to said optical axis, 16. The flexible printed wiring board arrangement according to claim 1, wherein said movable support member integrally moves with said image sensor in directions generally orthogonal to said optical axis when said image sensor is moved.

17. The flexible printed wiring board arrangement according to claim 12, wherein said bending resistance device integrally moves with said image sensor in directions generally orthogonal to said optical axis when said image sensor is moved.

* * * * *